(12) United States Patent
Yang et al.

(10) Patent No.: US 12,436,656 B2
(45) Date of Patent: Oct. 7, 2025

(54) NOTIFICATION DISPLAY METHOD AND ELECTRONIC DEVICE

(71) Applicant: Honor Device Co., Ltd., Shenzhen (CN)

(72) Inventors: Shishu Yang, Shenzhen (CN); Xintong Bao, Shenzhen (CN); Yiyan Ding, Shenzhen (CN); Taolin Zhang, Shenzhen (CN); Liwei Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/928,732

(22) PCT Filed: May 25, 2022

(86) PCT No.: PCT/CN2022/095046
§ 371 (c)(1),
(2) Date: Nov. 30, 2022

(87) PCT Pub. No.: WO2022/262541
PCT Pub. Date: Dec. 22, 2022

(65) Prior Publication Data

US 2024/0134491 A1   Apr. 25, 2024
US 2024/0231556 A9   Jul. 11, 2024

(30) Foreign Application Priority Data

Jun. 15, 2021 (CN) .......................... 202110663165.7
Jun. 16, 2021 (CN) .......................... 202110668346.7

(51) Int. Cl.
G06F 3/0482 (2013.01)
G06F 3/0481 (2022.01)
G06F 3/04817 (2022.01)

(52) U.S. Cl.
CPC ........ *G06F 3/0481* (2013.01); *G06F 3/04817* (2013.01)

(58) Field of Classification Search
None
See application file for complete search history.

(56) References Cited

U.S. PATENT DOCUMENTS 9,253,631 B1* 2/2016 White ............... H04M 1/72457
9,292,310 B2* 3/2016 Chaudhri ............... G06F 9/451
(Continued)

FOREIGN PATENT DOCUMENTS

CN     102903256 A    1/2013
CN     103582873 A    2/2014
(Continued)

*Primary Examiner* — Henry Orr
(74) *Attorney, Agent, or Firm* — Conley Rose, P.C.

(57) ABSTRACT

A notification display method includes obtaining, by an electronic device, notification information delivered by a first application, and displaying different display content based on the notification information and different types of display screens. Display screen types may include an always on display screen, a lock screen, a drop-down screen, a desktop screen, an immersive application screen, and the like. In addition, the electronic device may display a card including the notification information on a desktop screen. The card is viewable by a user, and thus may improve efficiency of viewing such notification information by the user.

20 Claims, 42 Drawing Sheets

(56) References Cited

U.S. PATENT DOCUMENTS

| | | | |
|---|---|---|---|
| 10,979,551 B2 | 4/2021 | Zhu et al. | |
| 11,010,028 B2 | 5/2021 | Lu | |
| 2006/0010394 A1* | 1/2006 | Chaudhri | G06F 9/451 715/779 |
| 2012/0289147 A1* | 11/2012 | Raleigh | H04N 21/25808 455/3.06 |
| 2014/0136993 A1 | 5/2014 | Luu et al. | |
| 2017/0060359 A1* | 3/2017 | Chaudhri | G06F 3/04845 |
| 2017/0302747 A1 | 10/2017 | Luo et al. | |
| 2018/0097764 A1 | 4/2018 | Lutsenko et al. | |
| 2019/0342519 A1* | 11/2019 | Van Os | H04N 7/152 |
| 2020/0401298 A1* | 12/2020 | Lu | H04M 1/67 |
| 2021/0018958 A1 | 1/2021 | Xia et al. | |
| 2021/0209206 A1 | 7/2021 | Li et al. | |
| 2023/0039353 A1 | 2/2023 | Li et al. | |
| 2023/0221861 A1 | 7/2023 | Chen et al. | |
| 2023/0350535 A1* | 11/2023 | Zhang | G06F 1/3231 |
| 2024/0077987 A1* | 3/2024 | Zhang | G06F 3/04847 |
| 2024/0126572 A1* | 4/2024 | Chen | H04L 12/1859 |
| 2024/0231556 A9* | 7/2024 | Yang | G06F 9/451 |

FOREIGN PATENT DOCUMENTS

| | | |
|---|---|---|
| CN | 105808277 A | 7/2016 |
| CN | 107526492 A | 12/2017 |
| CN | 107704303 A | 2/2018 |
| CN | 107809531 A | 3/2018 |
| CN | 108629548 A | 10/2018 |
| CN | 108647067 A | 10/2018 |
| CN | 109691072 A | 4/2019 |
| CN | 109917956 A | 6/2019 |
| CN | 111638821 A | 9/2020 |
| CN | 112114721 A | 12/2020 |
| CN | 112148400 A | 12/2020 |
| CN | 112214145 A | 1/2021 |
| CN | 112241867 A | 1/2021 |
| CN | 112416492 A | 2/2021 |
| CN | 113741781 A | 12/2021 |
| WO | 2019227488 A1 | 12/2019 |
| WO | 2020156308 A1 | 8/2020 |

* cited by examiner

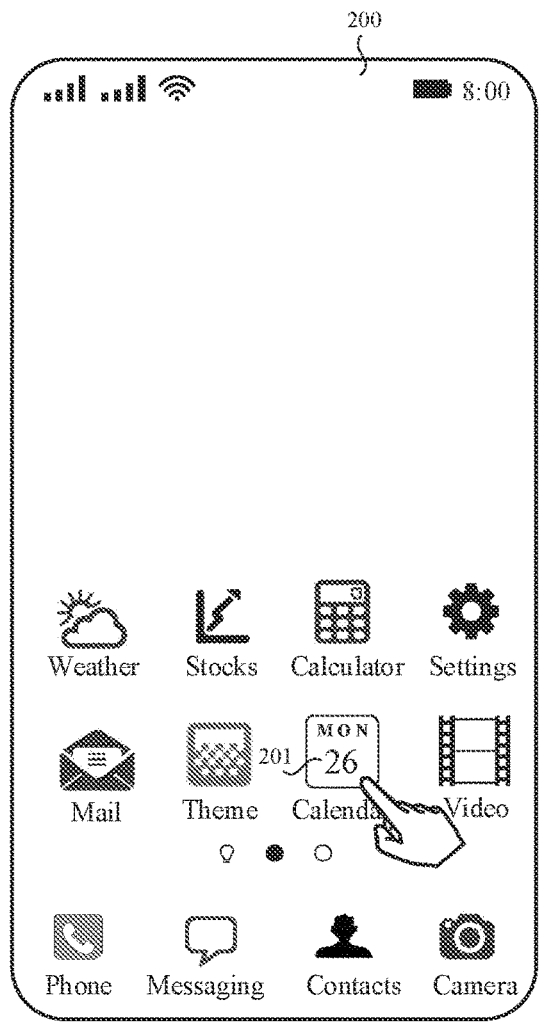
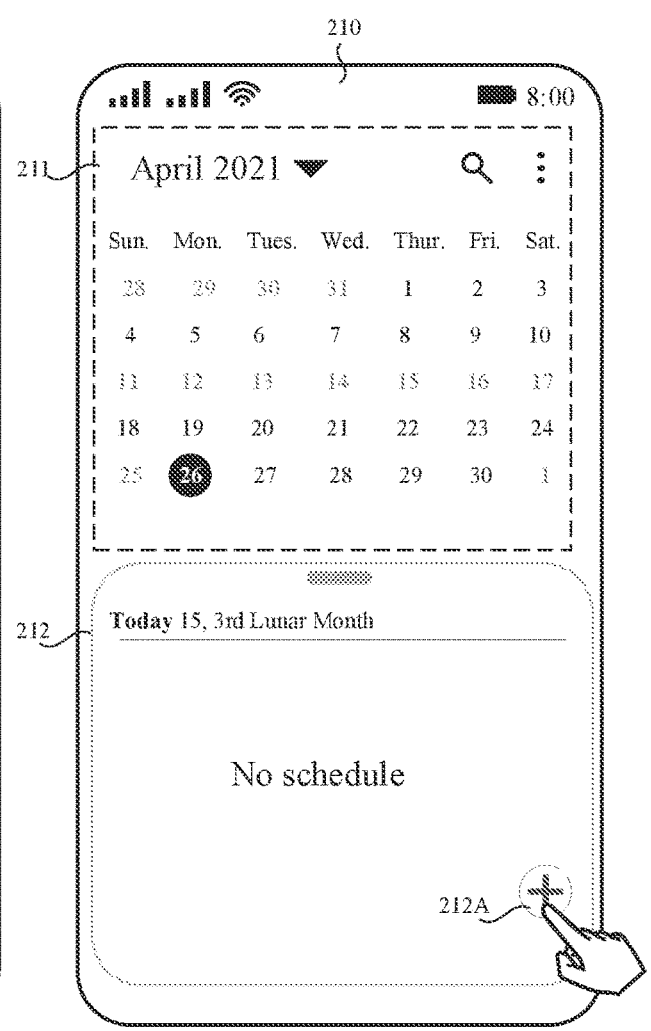
FIG. 2A
FIG. 2B

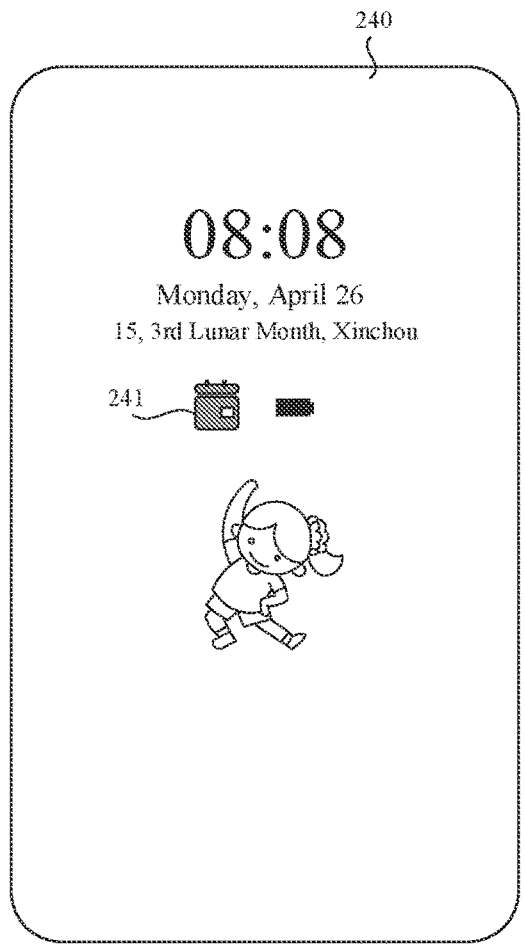
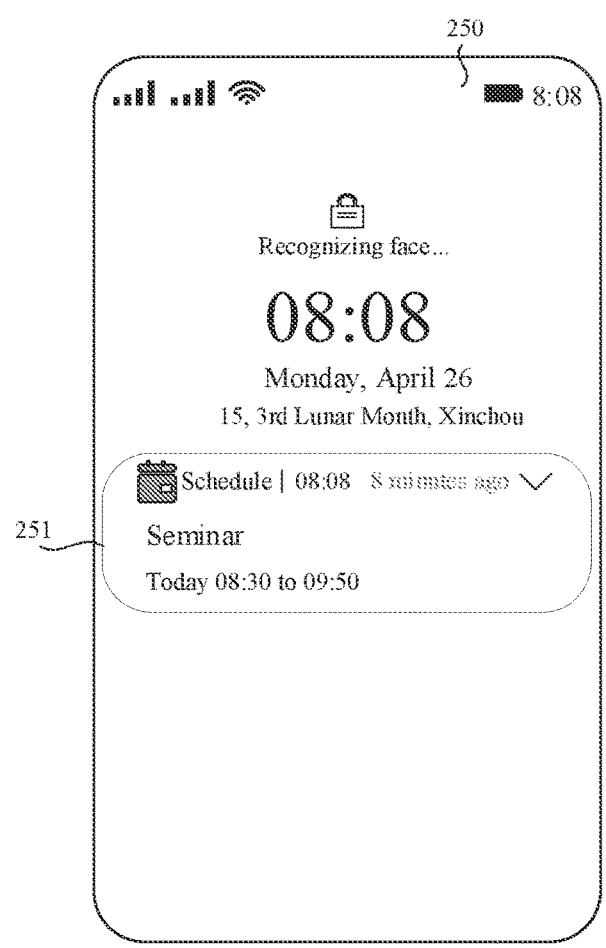
FIG. 2E                      FIG. 2F

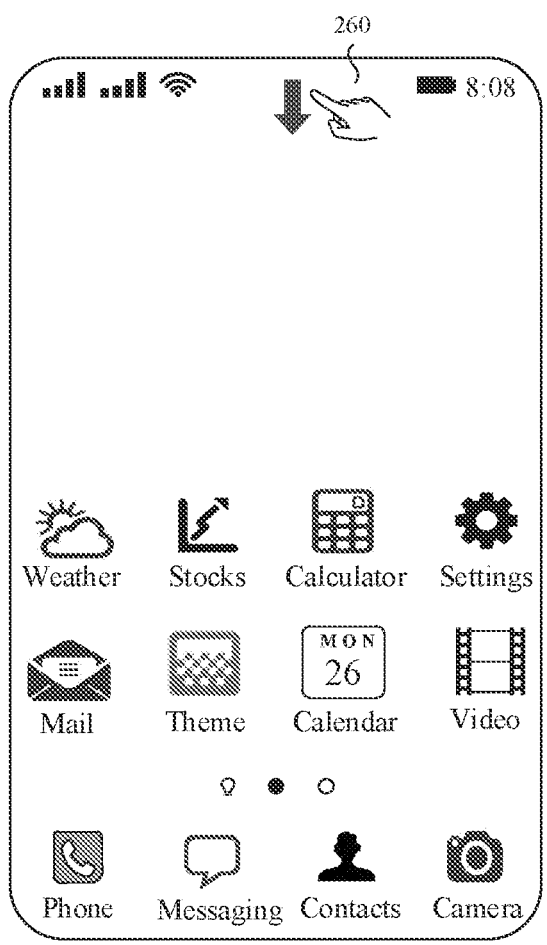
FIG. 2G
FIG. 2H

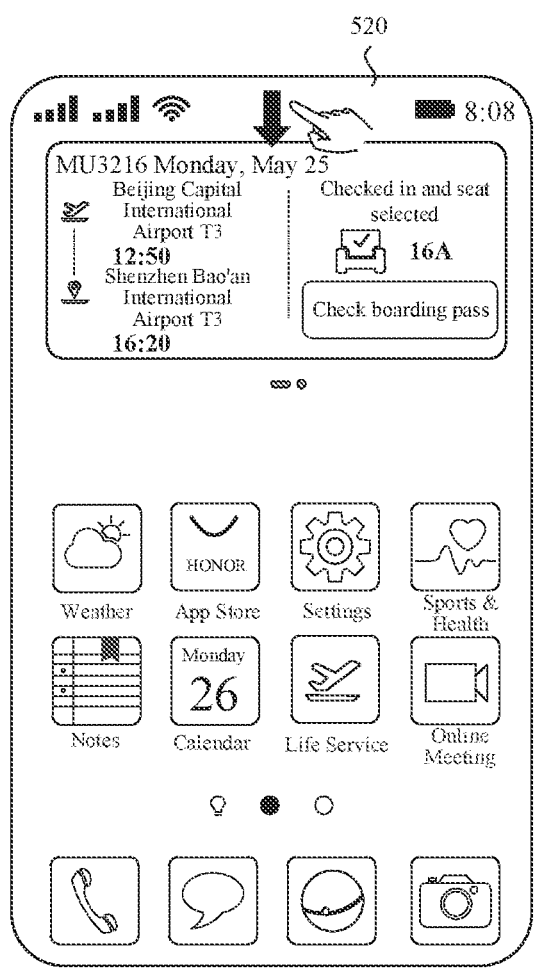
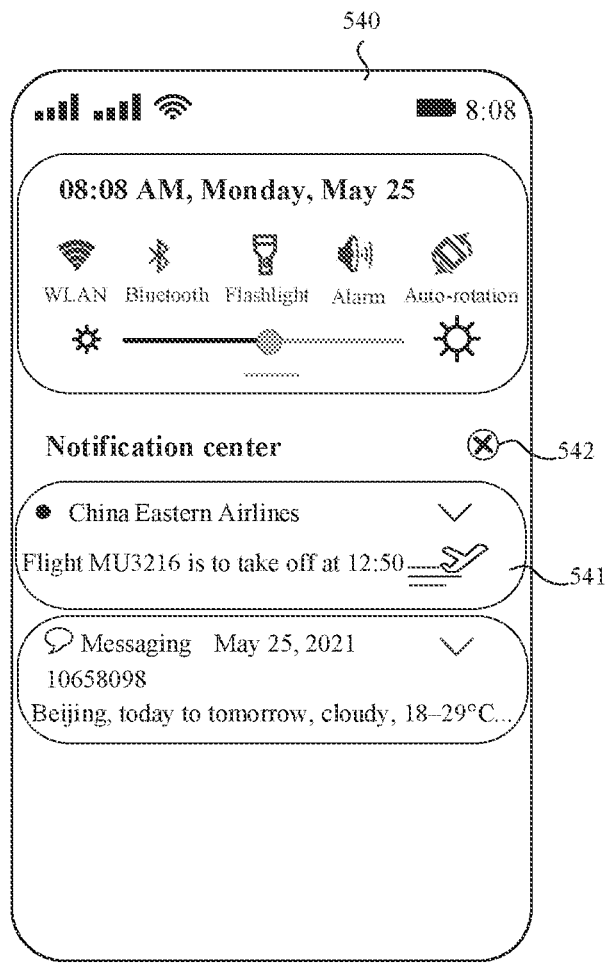
FIG. 5J                          FIG. 5K

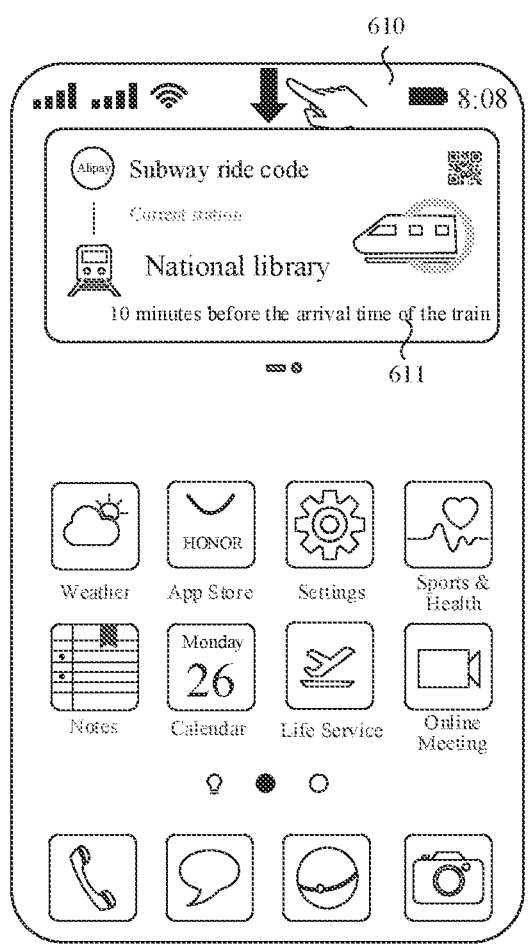 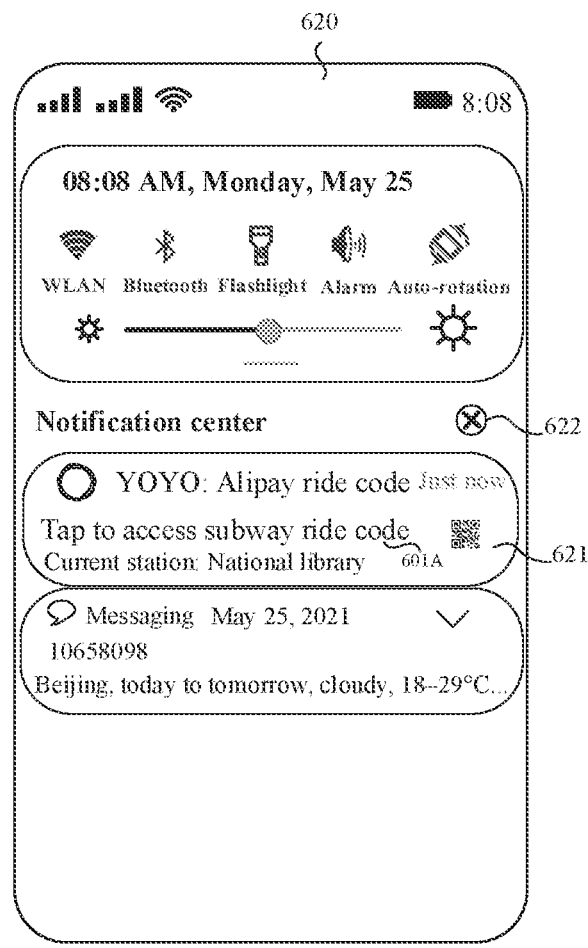
FIG. 6F                    FIG. 6G

NOTIFICATION DISPLAY METHOD AND ELECTRONIC DEVICE

CROSS-REFERENCE TO RELATED APPLICATIONS

This application is a U.S. National Stage of International Application No. PCT/CN2022/095046 filed on May 25, 2022, which claims priorities to Chinese Patent application Ser. No. 202110668346.9, filed with the China National Intellectual Property Administration on Jun. 16, 2021, and Chinese Patent Application No. 202110663165.7, filed with the China National Intellectual Property Administration on Jun. 15, 2021, all of which are incorporated herein by reference in their entireties.

TECHNICAL FIELD

This application relates to the field of terminal technologies, and in particular, to a notification display method and an electronic device.

BACKGROUND

As an increasing quantity of applications are installed on electronic devices, users need to deal with increasingly complex notification information from applications. When an electronic device receives notification information delivered by a specified application, the electronic device may display the notification information on a specified type of display screen (for example, an always on display screen, a lock screen, or a drop-down screen). For example, when the electronic device receives notification information based on a specified application, the electronic device may display a prompt icon for the notification information on the always on display screen, or display a notification bar including the notification information on the lock screen, to notify the user that the electronic device receives new notification information.

However, because the electronic device has limited types of display screens that are capable of displaying notification information, the electronic device cannot display content of notification information to the user in a timely and efficient manner, causing low efficiency in dealing with notification information by the user.

SUMMARY

This application provides a notification display method and an electronic device, so that when notification information delivered by a first application is received, different display content can be output based on the notification information and different types of display screens. Display screen types may include an AOD screen, a lock screen, a drop-down screen, a desktop screen, an immersive application screen, and the like. In addition, the electronic device may display a card including the notification information on a desktop screen. A user may further process notification content based on the card. The notification display method can help the user quickly view the notification content, thereby improving efficiency of dealing with the notification information by the user.

According to a first aspect, this application provides a notification display method. The method includes: obtaining, by an electronic device, notification information of a first application, where the notification information of the first application includes first content and second content, and the notification information of the first application is used to remind a user; determining that the electronic device is in an always on display state: in response to that the notification message of the first application is obtained, displaying an icon of the first application on an always on display screen; detecting a first operation of the user; displaying a lock screen, and displaying the first content on the lock screen, where the lock screen is a screen displayed when the electronic device is in a lock-screen state; detecting a second operation of the user; and in response to the second operation, displaying a desktop screen, where the desktop screen is a screen displayed when the electronic device is in an unlocked state, the desktop screen includes a first card, the first card includes the first content and the second content, and the second content is associated with the first content and the second content is different from the first content. This can help the user quickly view the notification content, thereby improving efficiency of dealing with the notification information by the user.

In a possible implementation, the notification information of the first application further includes third content, and the method further includes: detecting a third operation for the first card; and in response to the third operation, displaying a first application screen, and displaying the third content on the first application screen, where the third content is associated with the first content and the third content is different from the first content, and the third content is associated with the second content and the third content is different from the second content. In this way, the electronic device can display content with different levels of details on different screens, thereby improving efficiency of dealing with the notification information by the user.

In a possible implementation, the desktop screen is a main desktop screen, and the method further includes: detecting a fourth operation for the first card; and in response to the fourth operation, displaying a second card on the main desktop screen and skipping displaying the first card, where the second card is different from the first card.

In a possible implementation, the method further includes: obtaining, by the electronic device, the notification information of the first application; determining that the electronic device is in the lock-screen state; and in response to that the notification message of the first application is obtained, displaying the lock screen, and displaying the first content on the lock screen; or obtaining, by the electronic device, the notification information of the first application; determining that the electronic device is in the unlocked state; and in response to that the notification message of the first application is obtained, displaying the desktop screen, where the desktop screen includes the first card. This can help the user quickly view the notification content, thereby improving efficiency of dealing with the notification information by the user.

In a possible implementation, a display form of the icon of the first application at a first moment is different from a display form of the icon of the first application at a second moment; or a display form of the first content displayed on the lock screen at a first moment is different from a display form of the first content displayed on the lock screen at a second moment; or a display form of the second content displayed on the desktop screen at a first moment is different from a display form of the second content displayed on the desktop screen at a second moment. In this way, different prompt notifications can be displayed according to different time differences, and the user can be effectively prompted to view the notification content, thereby improving processing efficiency.

In a possible implementation, when the first application is a notes application, the method specifically includes: when the electronic device detects that a current moment is a first preset time point, obtaining, by the electronic device, the notification information of the first application, where the notification information includes schedule information of a current day, the schedule information of the current day includes a set of one or more schedule tasks whose schedule starting dates are the current day, the one or more schedule tasks whose schedule starting dates are the current day include a first schedule task, the first content includes content of the first schedule task, and the first schedule task has a highest priority among schedules of the current day. This can help the user quickly view notification content of a schedule task, thereby improving efficiency of dealing with a schedule task notification by the user.

In a possible implementation, the priority specifically includes: a schedule starting time of the schedule task is the earliest among the schedules of the current day.

In a possible implementation, when the first application is a notes application, the method specifically includes: when the electronic device detects that a current moment is a second preset time point, obtaining, by the electronic device, the notification information of the first application, where the notification information includes schedule information of a next day, and the schedule information of the next day includes a set of one or more schedule tasks whose schedule starting dates are the next day. This can help the user quickly view notification content of a next-day schedule task.

In a possible implementation, when the first application is a notes application, the method specifically includes: when the electronic device detects that a difference between a current time and a schedule starting time of a second schedule task is within a first time threshold, obtaining, by the electronic device, the notification information of the first application, where the notification information includes information about the second schedule task. This can help the user quickly view notification content of a specified schedule task, thereby improving efficiency of dealing with the specified schedule task notification by the user.

In a possible implementation, when the first application is an application that provides flight travel information, the method specifically includes: when the electronic device detects that a current time meets a first preset condition and/or a current geographic location meets a second preset condition, obtaining, by the electronic device, the notification information of the first application. This can help the user quickly view notification content of a flight travel task, thereby improving efficiency of dealing with a flight travel task notification by the user.

In a possible implementation, the first preset condition specifically includes any one of the following: a difference between the current time and a boarding time is within a second time threshold, a difference between the current time and a departure time is within a third time threshold, or a difference between the current time and a boarding time is within a fourth time threshold.

In a possible implementation, the second preset condition specifically includes any one of the following: the current geographic location is within a range of an airport, or the current geographic location and a geographic location of an airport are within a first geographic threshold range.

In a possible implementation, when the first application is an application that provides subway travel information, the method specifically includes: when the electronic device detects that a current geographic location is at a first station, obtaining, by the electronic device, the notification information of the first application, where the notification information includes information about a subway ride code. This can help the user quickly view notification content of a subway travel task, thereby improving efficiency of dealing with a subway travel task notification by the user.

In a possible implementation, the first operation, the second operation, the third operation, and the fourth operation may be tap operations, double-tap operations, swipe operations, two-finger swipe operations, three-finger swipe operations, press operations, double-press operations, or the like. This is not limited in this application.

According to a second aspect, an embodiment of this application provides an electronic device, including one or more processors, one or more memories, a display, and a transceiver. The one or more memories are coupled to the one or more processors, and the one or more memories are configured to store computer program code. The computer program code includes computer instructions. When the one or more processors execute the computer instructions, the processor may obtain notification information of a first application, where the notification information of the first application includes first content and second content, and the notification information of the first application is used to remind a user; the processor may determine that the electronic device is in an always on display state, and in response to that the notification message of the first application is obtained, display an icon of the first application on an always on display screen: the processor may detect a first operation of the user, display a lock screen, and display the first content on the lock screen, where the lock screen is a screen displayed when the electronic device is in a lock-screen state; the processor may detect a second operation of the user; and in response to the second operation, the processor may be further configured to display a desktop screen, where the desktop screen is a screen displayed when the electronic device is in an unlocked state, the desktop screen includes a first card, the first card includes the first content and the second content, and the second content is associated with the first content and the second content is different from the first content. This can help the user quickly view the notification content, thereby improving efficiency of dealing with the notification information by the user.

In a possible implementation, the notification information of the first application further includes third content, and the processor may be further configured to detect a third operation for the first card; and in response to the third operation, the processor may be further configured to display a first application screen, and display the third content on the first application screen, where the third content is associated with the first content and the third content is different from the first content, and the third content is associated with the second content and the third content is different from the second content. In this way, the electronic device can display content with different levels of details on different screens, thereby improving efficiency of dealing with the notification information by the user.

In a possible implementation, the desktop screen is a main desktop screen, and the processor may be further configured to detect a fourth operation for the first card; and in response to the fourth operation, the processor may be further configured to display a second card on the main desktop screen and skip displaying the first card, where the second card is different from the first card.

In a possible implementation, the processor may be further configured to obtain the notification information of the first application: the processor may be further configured to determine that the electronic device is in the lock-screen state; and in response to that the notification message of the first application is obtained, the processor may be further configured to display the lock screen, and display the first content on the lock screen; or the electronic device obtains the notification information of the first application, determines that the electronic device is in the unlocked state, and in response to that the notification message of the first application is obtained, displays the desktop screen, where the desktop screen includes the first card. This can help the user quickly view the notification content, thereby improving efficiency of dealing with the notification information by the user.

In a possible implementation, a display form of the icon of the first application at a first moment is different from a display form of the icon of the first application at a second moment; or a display form of the first content displayed on the lock screen at a first moment is different from a display form of the first content displayed on the lock screen at a second moment; or a display form of the second content displayed on the desktop screen at a first moment is different from a display form of the second content displayed on the desktop screen at a second moment. In this way, different prompt notifications can be displayed according to different time differences, and the user can be effectively prompted to view the notification content, thereby improving processing efficiency.

In a possible implementation, when the first application is a notes application, the processor may be further configured to: when detecting that a current moment is a first preset time point, obtain the notification information of the first application, where the notification information includes schedule information of a current day, the schedule information of the current day includes a set of one or more schedule tasks whose schedule starting dates are the current day, the one or more schedule tasks whose schedule starting dates are the current day include a first schedule task, the first content includes content of the first schedule task, and the first schedule task has a highest priority among schedules of the current day. This can help the user quickly view notification content of a schedule task, thereby improving efficiency of dealing with a schedule task notification by the user.

In a possible implementation, the priority specifically includes: a schedule starting time of the schedule task is the earliest among the schedules of the current day.

In a possible implementation, when the first application is a notes application, the processor may be further configured to: when detecting that a current moment is a second preset time point, obtain the notification information of the first application, where the notification information includes schedule information of a next day, and the schedule information of the next day includes a set of one or more schedule tasks whose schedule starting dates are the next day. This can help the user quickly view notification content of a next-day schedule task.

In a possible implementation, when the first application is a notes application, the processor may be further configured to: when detecting that a difference between a current time and a schedule starting time of a second schedule task is within a first time threshold, obtain the notification information of the first application, where the notification information includes information about the second schedule task. This can help the user quickly view notification content of a specified schedule task, thereby improving efficiency of dealing with the specified schedule task notification by the user.

In a possible implementation, when the first application is an application that provides flight travel information, the processor may be further configured to: when detecting that a current time meets a first preset condition and/or a current geographic location meets a second preset condition, obtain the notification information of the first application. This can help the user quickly view notification content of a flight travel task, thereby improving efficiency of dealing with a flight travel task notification by the user.

In a possible implementation, the first preset condition specifically includes any one of the following: a difference between the current time and a boarding time is within a second time threshold, a difference between the current time and a departure time is within a third time threshold, or a difference between the current time and a boarding time is within a fourth time threshold.

In a possible implementation, the second preset condition specifically includes any one of the following: the current geographic location is within a range of an airport, or the current geographic location and a geographic location of an airport are within a first geographic threshold range.

In a possible implementation, when the first application is an application that provides subway travel information, the processor may be further configured to: when detecting that a current geographic location is at a first station, obtain, by the electronic device, the notification information of the first application, where the notification information includes information about a subway ride code. This can help the user quickly view notification content of a subway travel task, thereby improving efficiency of dealing with a subway travel task notification by the user.

In a possible implementation, the first operation, the second operation, the third operation, and the fourth operation may be tap operations, double-tap operations, swipe operations, two-finger swipe operations, three-finger swipe operations, press operations, double-press operations, or the like. This is not limited in this application.

According to a third aspect, an embodiment of this application provides an electronic device, including one or more processors, one or more memories, a display, and a transceiver. The one or more memories are coupled to the one or more processors, and the one or more memories are configured to store computer program code. The computer program code includes computer instructions. When the one or more processors execute the computer instructions, the electronic device is enabled to perform the method according to any one of the possible implementations of the first aspect. This can help a user quickly view notification content, thereby improving efficiency of dealing with notification information by the user.

According to a fourth aspect, an embodiment of this application provides a computer storage medium, including computer instructions. When the computer instructions are run on an electronic device, the electronic device is enabled to perform the method according to any one of the possible implementations of the first aspect. This can help a user quickly view notification content, thereby improving efficiency of dealing with notification information by the user.

According to a fifth aspect, an embodiment of this application provides a computer program product. When the computer program product is run on an electronic device, the electronic device is enabled to perform the method according to any one of the possible implementations of the first aspect. This can help a user quickly view notification content, thereby improving efficiency of dealing with notification information by the user.

BRIEF DESCRIPTION OF DRAWINGS

FIG. 2A to FIG. 2H are schematic diagrams of a group of user interfaces according to an embodiment of this application:

FIG. 6A to FIG. 6J are schematic diagrams of a group of user interfaces according to an embodiment of this application.

DESCRIPTION OF EMBODIMENTS

Terms used in the following embodiments of this application are merely intended to describe specific embodiments, but not to limit this application. As used in the specification and the appended claims of this application, singular expressions "a", "an", "the", "the foregoing", and "this" are also intended to include plural expressions, unless otherwise expressly specified in the context. It should be further understood that the term "and/or" used in this application means including any or all possible combinations of one or more of listed items. In the embodiments of this application, the terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In the descriptions of the embodiments of this application, "plurality" indicates two or more, unless otherwise specified.

First, an example electronic device 100 provided in an embodiment of this application is described.

Figure 1:
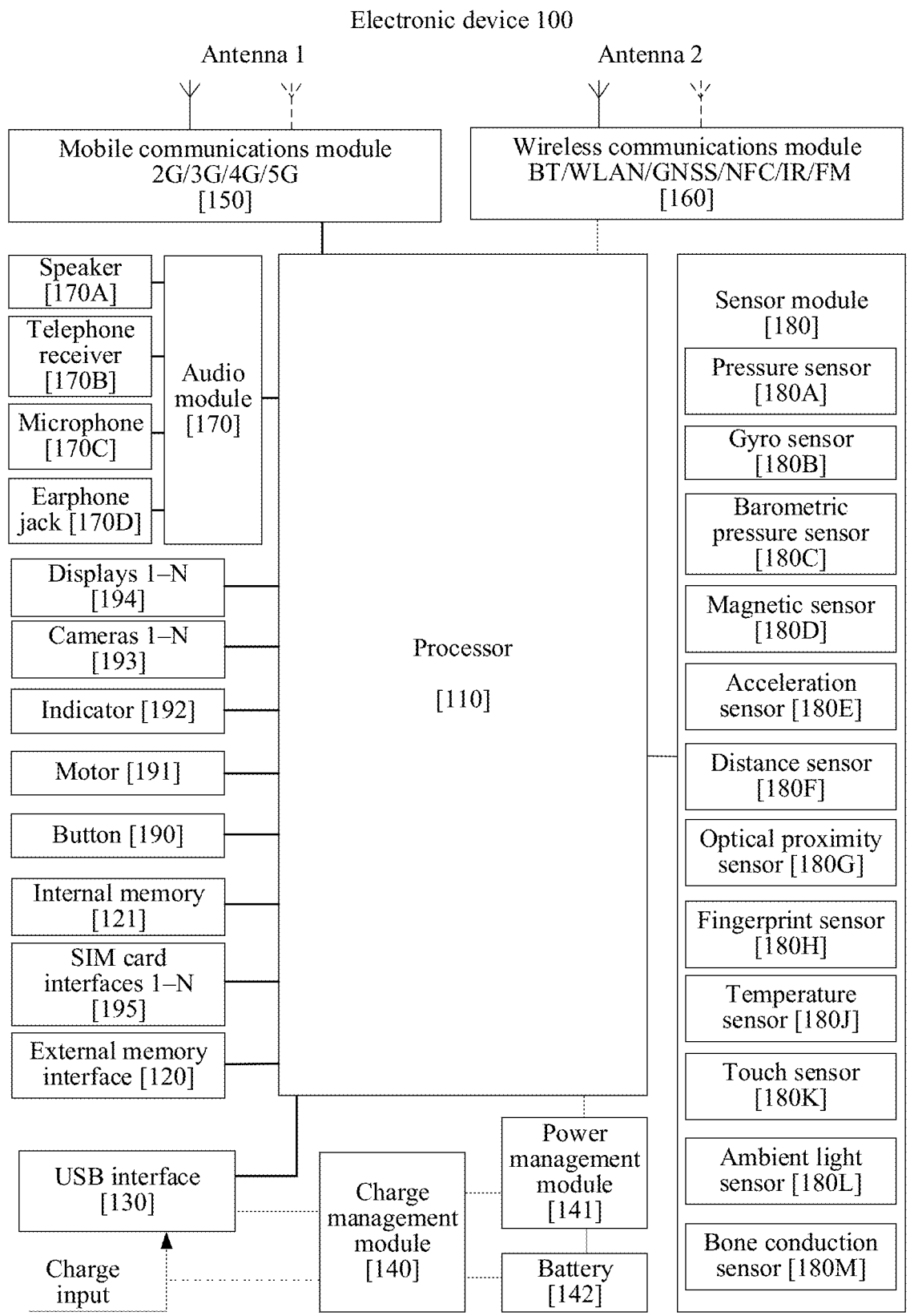
FIG. 1 is a schematic diagram of a hardware architecture of an electronic device according to an embodiment of this application.

FIG. 1 is an example schematic diagram of a hardware structure of an electronic device 100 according to an embodiment of this application.

The electronic device 100 may be a mobile phone, a tablet computer, a PC, an ultra-mobile personal computer (ultra-mobile personal computer, UMPC), a netbook, a personal digital assistant (personal digital assistant, PDA), or another electronic device. A specific type of the electronic device is not particularly limited in this embodiment of this application.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180N a fingerprint sensor 180H a temperature sensor 180J, a touch sensor 180K, an ambient light sensor 180L, a bone conduction sensor 180M, and the like.

It can be understood that the structure shown in this embodiment of the present application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may generate an operation control signal based on an instruction operation code and a time sequence signal, to control obtaining of an instruction and execution of the instruction.

A memory may be further disposed in the processor 110 to store instructions and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including a serial data line (serial data line, SDA) and a serial clock line (serial clock line, SCL). The processor 110 may be coupled to the touch sensor 180K, a charger, a flash, the camera 193, and the like separately through different I2C bus interfaces.

The I2S interface may be used for audio communication. The processor 110 may be coupled to the audio module 170 by using an I2S bus, to implement communication between the processor 110 and the audio module 170.

The PCM interface may also be used for audio communication, to sample, quantize, and encode an analog signal. Both the I2S interface and the PCM interface may be used for audio communication.

The UART interface is a universal serial data bus used for asynchronous communication. The bus converts to-be-transmitted data between serial communication and parallel communication.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like.

The GPIO interface may be configured by using software. The GPIO interface may be configured as a control signal, or may be configured as a data signal.

The USB interface 130 is an interface that complies with a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to an earphone to play an audio file by using the earphone. Alternatively, the interface may be configured to connect to another electronic device, for example, an AR device.

It can be understood that an interface connection relationship between the modules shown in this embodiment of the present application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charge management module 140 is configured to receive charge input from a charger. The charger may be a wireless charger, or may be a wired charger. In some embodiments of wired charging, the charge management module 140 may receive charge input from a wired charger through the USB interface 130. In some embodiments of wireless charging, the charge management module 140 may receive wireless charge input by using a wireless charging coil of the electronic device 100. When the charge management module 140 charges the battery 142, the power management module 141 may further supply power to the electronic device.

The power management module is configured to connect to the battery 142, the charge management module 140, and the processor 110. The power management module 141 receives input from the battery 142 and/or the charge management module 140, and supplies power to the processor 110, the internal memory 121, the display 194, the camera 193, the wireless communications module 160, and the like. The power management module 141 may be further configured to detect parameters such as a battery capacity, a quantity of battery cycles, and a battery health status (electric leakage and impedance). In some other embodiments, the power management module 141 may be alternatively disposed in the processor 110. In some other embodiments, the power management module 141 and the charge management module 140 may be alternatively disposed in a same device.

A wireless communication function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some another embodiments, an antenna may be used in combination with a tuning switch.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution that is used on the electronic device 100 and that includes wireless communications technologies such as 2G, 3G, 4G and 5G The mobile communications module 150 may include at least one light filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device. In some embodiments, a wireless communication solution provided by the mobile communications module 150 can enable the electronic device to communicate with a device (for example, a server) in a network.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor, and a processed signal is transmitted to the application processor. The application processor outputs a sound signal by using an audio device (not limited to the speaker 170A, the telephone receiver 170B, and the like), or displays an image or a video by using the display 194. In some embodiments, the modem processor may be an independent device. In some other embodiments, the modem processor may be independent of the processor 110, and is disposed in a same device with the mobile communications module 150 or another functional module.

The wireless communications module 160 may provide a solution that is used on the electronic device 100 and that includes wireless communications technologies such as a wireless local area network (wireless local area networks, WLAN) (for example, a wireless fidelity (wireless fidelity. Wi-Fi) network). Bluetooth (bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave and radiate the electromagnetic wave by using the antenna 2. In some embodiments, the electronic device 100 may detect or scan a device near the electronic device 100 by transmitting a signal by using a Bluetooth module or a WLAN module in the wireless communications module 160, and establish a wireless communication connection to and perform data transmission with the nearby device. The Bluetooth module may provide a solution including one or more of the following Bluetooth communication; classic Bluetooth (Bluetooth 2.1 standard) or Bluetooth low energy. The WLAN module may provide a solution including one or more of the following WLAN communication: Wi-Fi direct, Wi-Fi LAN, or Wi-Fi softAP.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems. SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini LED, a micro LED, a micro OLED, a quantum dot light-emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to a naked eye. The ISP may further optimize noise, luminance, and complexion of the image based on an algorithm. The ISP may further optimize parameters such as exposure and color temperature of a photographing scenario. In some embodiments, the ISP may be disposed in the camera 193.

The camera 193 is configured to capture a static image or a video. An optical image is generated for an object by using the lens, and the optical image is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG)1, MPEG2, MPEG3, and MPEG4.

The NPU is a neural-network (neural-network, NN) computing processor. The NPU quickly processes input information with reference to a structure of a biological neural network, for example, with reference to a transfer mode between human brain neurons, and may further continuously perform self-learning. The NPU may implement applications such as intelligent cognition of the electronic device 100, for example, image recognition, facial recognition, speech recognition, and text comprehension.

The internal memory 121 may include one or more random access memories (random access memory. RAM) and one or more non-volatile memories (non-volatile memory, NVM).

The random access memory may include a static random access memory (static random-access memory, SRAM), a dynamic random access memory (dynamic random access memory. DRAM), a synchronous dynamic random access memory (synchronous dynamic random access memory, SDRAM), a double data rate synchronous dynamic random access memory (double data rate synchronous dynamic random access memory, DDR SDRAM, for example, a fifth-generation DDR SDRAM is generally referred to as a DDR5 SDRAM), and the like.

The non-volatile memory may include a disk storage device and a flash memory (flash memory).

The flash memory may include a NOR flash, a NAND flash, a 3D NAND flash, and the like through division based on an operating principle, may include a single-level cell (single-level cell, SLC), a multi-level cell (multi-level cell, MLC), a triple-level cell (triple-level cell, TLC), a quad-level cell (quad-level cell, QLC), and the like through division based on a potential level of a cell, and may include a universal flash storage (English: universal flash storage, UFS), an embedded multimedia card (embedded multimedia card, eMMC), and the like through division based on storage specifications.

The random access memory may be directly read and written by the processor 110, may be configured to store an operating system or an executable program (for example, a machine instruction) of another running program, and may be further configured to store data of a user and an application program.

The non-volatile memory may also store an executable program, and store data of a user and an application program and the like, and the data may be loaded to the random access memory in advance for the processor 110 to directly read and write.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

The electronic device 100 may implement audio functions, for example, music playing and recording, by using the audio module 170, the speaker 170A, the telephone receiver 170B, the microphone 170C, the earphone jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call by using the speaker 170A.

The telephone receiver 170B, also referred to as an "earpiece", is configured to convert an audio electrical signal into a sound signal. When the electronic device 100 is used to answer a call or listen to voice information, the telephone receiver 170B may be placed close to a human ear to listen to a voice.

The microphone 170C, also referred to as a "mike" or a "mic", is configured to convert a sound signal into an electrical signal. When making a call or sending voice information, a user may move a mouth close to the microphone 170C and make a sound, to input a sound signal into the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may be alternatively disposed in the electronic device 100, to collect a sound signal and reduce noise. The microphones may further identify a sound source, implement a directional recording function, and the like.

The earphone jack 170D is configured to connect to a wired earphone. The earphone jack 170D may be a USB interface 130, or may be a 3.5-mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal.

The gyro sensor 180B may be configured to determine a motion posture of the electronic device 100. The gyro sensor 180B may be further used in navigation and motion sensing game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening/closing of a clamshell smart cover by using the magnetic sensor 180D.

The acceleration sensor 180E may detect a magnitude of an acceleration of the electronic device 100 in each direction (usually, three axes). When the electronic device 100 is still, a magnitude and a direction of gravity may be detected. The acceleration sensor 180E may be further configured to identify a posture of the electronic device, and is applied to applications such as landscape/portrait mode switching and a pedometer.

The distance sensor 180F is configured to measure a distance. The electronic device 100 may measure a distance by using an infrared or laser technology. In some embodiments, in a photographing scenario, the electronic device 100 may measure a distance by using the distance sensor 180F, to implement fast focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects, by using the photodiode, infrared reflected light that comes from a nearby object. When detecting sufficient reflected light, the electronic device 100 may determine that there is an object near the electronic device 100; or when detecting insufficient reflected light, the electronic device 100 may determine that there is no object near the electronic device 100. The electronic device 100 may detect, by using the optical proximity sensor 180G that a user holds the electronic device 100 close to an ear for a call, so as to automatically turn off the screen to save power. The optical proximity sensor 180G may also be used for automatic screen locking or unlocking in a smart cover mode or a pocket mode.

The ambient light sensor 180L is configured to sense luminance of ambient light. The electronic device 100 may adaptively adjust luminance of the display 194 based on the sensed luminance of ambient light. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access lock, fingerprint-based photographing, fingerprint-based call answering, and the like by using characteristics of a collected fingerprint.

The temperature sensor 180J is configured to detect temperature. In some embodiments, the electronic device 100 executes a temperature processing policy by using the temperature detected by the temperature sensor 180J. In some other embodiments, when temperature is lower than still another threshold, the electronic device 100 boosts an output voltage of the battery 142 to avoid abnormal shutdown due to low temperature.

The touch sensor 180K is also referred to as a "touch device". The touch sensor 180K may be disposed in the display 194, and the touch sensor 180K and the display 194 form a touchscreen, which is also referred to as a "touch control screen". The touch sensor 180K is configured to detect a touch operation acting on or near the touch sensor.

The bone conduction sensor 180M may be configured to obtain a vibration signal.

The button 190 includes a power button, a volume button, and the like. The button 190 may be a mechanical button, or may be a touch button. The electronic device 100 may receive button input, and generate button signal input related to user settings and function control of the electronic device 100.

The motor 191 may generate a vibration prompt. The motor 191 may be configured to generate a vibration prompt for an incoming call, or may be configured to generate a vibration feedback on a touch. For example, touch operations acting on different applications (for example, photographing and audio playing) may correspond to different vibration feedback effects. For touch operations acting on different regions on the display 194, the motor 191 may also correspond to different vibration feedback effects. Different application scenarios (for example, a time reminder, information reception, an alarm clock, and a game) may also correspond to different vibration feedback effects. A touch vibration feedback effect may be further customized.

The indication device 192 may be an indicator, and may be configured to indicate a charging status and a battery level change, or may be configured to indicate a message, a missed call, a notification, or the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted in one SIM card interface 195. The plurality of cards may be of a same type, or may be of different types. The SIM card interface 195 may also be compatible with different types of SIM cards. The SIM card interface 195 may also be compatible with an external storage card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100, and cannot be separated from the electronic device 100.

The following describes a notification display manner provided in an embodiment of this application.

The electronic device 100 may obtain notification information of a specified application, and after receiving unlock input and displaying a desktop, the electronic device 100 may display the notification information of the specified application in a drop-down notification bar. The electronic device 100 may receive drop-down input of a user in a status bar at the top of a touchscreen, and display the drop-down notification bar in response to the drop-down input, so that the user can view the notification information.

For example, as shown in FIG. 2A, the specified application is a calendar application, and the electronic device 100 may display a desktop 200. One or more application icons may be displayed on the desktop 200. The one or more application icons may include a weather application icon, a stock application icon, a calculator application icon, a settings application icon, a mail application icon, a theme application icon, a calendar application icon 201, a video application icon, and the like. Optionally, a status bar, a page indicator, and a tray icon area may be further displayed on the desktop 200. The status bar may include one or more signal strength indicators for a mobile communication signal (which may also be referred to as a cellular signal), a signal strength indicator for a wireless fidelity (wireless fidelity, Wi-Fi) signal, a battery status indicator, a time indicator, and the like. The page indicator may be used to indicate a location relationship between a currently displayed page and another page. The tray icon area includes a plurality of tray icons (for example, a phone application icon, a messaging application icon, a contacts application icon, and a camera application icon), and the tray icons remain displayed during page switching. The page indicator may be not a part of a page, but exist independently, and the tray icons are also optional. This is not limited in this embodiment of this application.

The electronic device 100 may receive a touch operation (for example, tapping) performed by the user on the calendar application icon 201, and the electronic device 100 may display a calendar application screen in response to the touch operation.

As shown in FIG. 2B, the electronic device 100 may display a calendar application screen 210. The calendar application screen 210 may include a calendar 211 and a window 212. A new schedule control 212A is displayed in the window 212.

When the electronic device 100 detects, on a user interface 210, that the user selects a day, for example, April 26, in the calendar 211, and a touch operation (for example, tapping) acting on the new schedule control 212A, the electronic device 100 may display, in response to the touch operation, a user interface for creating a schedule task.

Figure 2C:
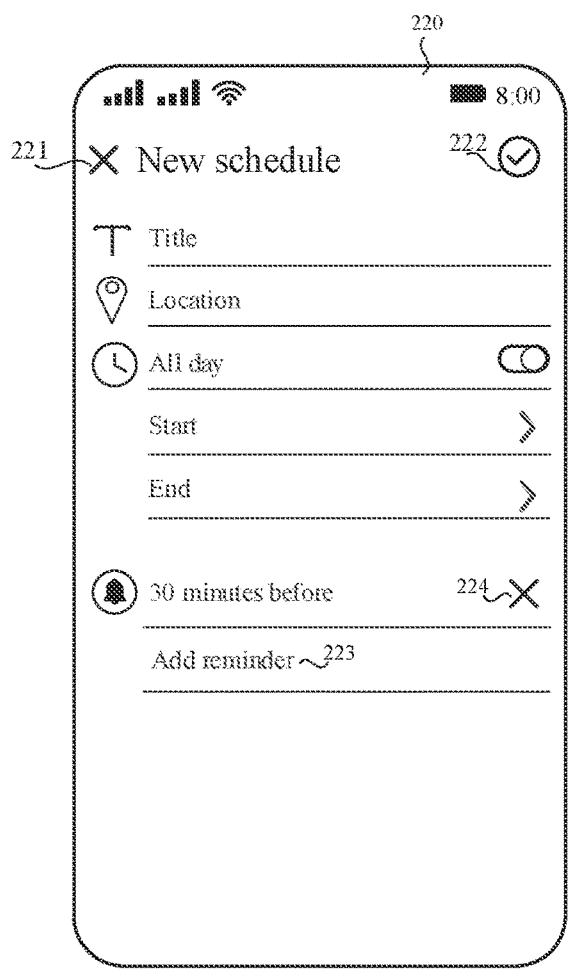

As shown in FIG. 2C, the electronic device 100 may display a user interface 220 for creating a schedule task. The user interface 220 may include a cancel control 221, a confirmation control 222, a page title (for example, new schedule), and one or more settings items (for example, a title item, a location item, a time item, and an advance reminder settings item). The cancel control 221 may be used for closing the user interface 220. The confirmation control 222 may be used for confirming an edited schedule task. The title item may be used for receiving user input to display a title of a schedule task. The location item may be used for receiving user input to display a location at which a schedule task occurs. The time item may be used for receiving user input to display a starting time and an ending time of a schedule task. A close control 224 in the advance reminder settings item may be used for closing advance reminder settings. A reminder adding control 223 in the advance reminder settings item may be used for receiving user input so that the electronic device 100 can add, in response to the input, a reminder based on a preset time interval (for example, every 30 minutes).

After receiving user input, the electronic device 100 may display a user interface including schedule task information.

Figure 2D:
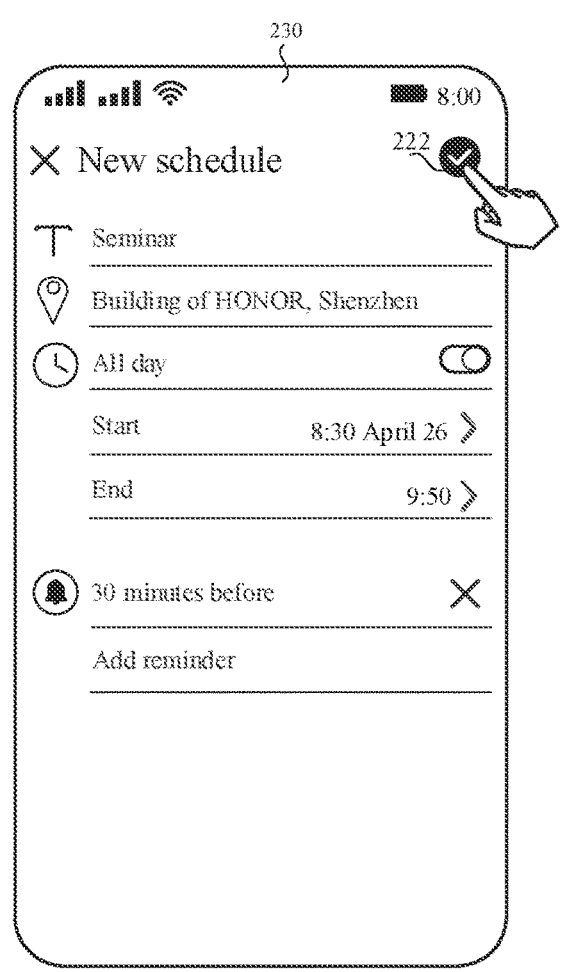

As shown in FIG. 2D, the electronic device 100 may display a user interface 230 of schedule task information. For example, the electronic device 100 may display, on the user interface 230, a name "Seminar", a location "Building of HONOR, Shenzhen", and a time "8:30 to 9:50 April 26" of the to-do event that are edited by the user, and a reminder notification is set to be displayed 30 minutes before a starting time of the to-do event. The electronic device 100 may receive a touch operation (for example, tapping) performed by the user on the confirmation control 222, and the electronic device 100 may add the schedule task in response to the operation.

With reference to FIG. 2E to FIG. 2H, the following describes a case in which the electronic device 100 displays a notification prompt on an AOD screen or a lock screen after the electronic device 100 obtains the notification information of the foregoing schedule task. When the electronic device 100 unlocks the screen and displays the desktop, the electronic device 100 may receive drop-down input performed by the user in the status bar at the top of the touchscreen, and display the notification information in the drop-down notification bar in response to the drop-down input, so that the user views the notification information. The foregoing four states are different reminder forms for notification information of the same schedule task. Reminding may be performed for notification information of the same schedule task in all the four states, or one or more of the four states may be selected for reminding for notification information of the same schedule task. This is not limited in this application. The lock screen is a screen displayed when the electronic device 100 is in a lock-screen state. The desktop (which may also be referred to as a desktop screen) is a screen displayed when the electronic device 100 is in an unlocked state. The unlocked state means that the electronic device 100 can display one or more application icons based on a screen in this state, that is, a state presented after unlocking, which is also an unlocked state of an electronic device in a conventional technology. A main desktop screen is a desktop screen displayed after unlocking, that is, the first desktop screen displayed to the user on the desktop screen after unlocking; or may be a desktop screen for displaying a weather card, for example, a desktop screen displayed to the user after the user performs unlocking in FIG. 3C, as shown in FIG. 3D. The main desktop screen may be set by default and cannot be modified, or may be set by the user.

For example, the electronic device 100 learns that a current time is a preset reminder time for the "Seminar" schedule task, that is, the current time is 30 minutes before the starting time "08:30" of the schedule task, that is, "08:00": and the electronic device 100 detects that an always on display (always on display, AOD) screen (which may also be referred to as an always on screen, an always on display, or the like) is currently displayed. In this case, the electronic device 100 may display a prompt icon for the "Seminar" schedule task on the AOD screen. The AOD screen is a screen displayed when the electronic device 100 is in the lock screen state and some areas on the screen remain on for displaying information such as a time and a notification. An always on display state is a state in which the electronic device 100 is in the lock screen state and some areas on the screen remain on for displaying information such as a time and a notification.

As shown in FIG. 2E, the electronic device 100 may display an AOD screen 240. The AOD screen 240 may include a calendar indicator, a battery status indicator, a prompt icon 241, and the like. The calendar indicator may be used for indicating a current time, for example, a date, a day of a week, and hour and minute information. The battery status indicator may be used for indicating a current battery level. The prompt icon 241 may be used for reminding the user that there is currently a schedule task to be completed.

When the electronic device 100 displays the AOD screen, the electronic device 100 may receive user input (for example, a press operation performed by the user on a power button on a side of the electronic device 100), and the electronic device 100 may display the lock screen.

As shown in FIG. 2F, the electronic device 100 may display a lock screen 250. The lock screen 250 may include a status bar, a calendar indicator, a notification bar 251, and the like. The status bar may include one or more signal strength indicators for a mobile communication signal (which may also be referred to as a cellular signal), one or more signal strength indicators for a wireless fidelity (wireless fidelity, Wi-Fi) signal, a battery status indicator, and the like. For descriptions of the calendar indicator, refer to the descriptions in the embodiment shown in FIG. 2E. Details are not described herein again. The notification bar 251 may display prompt information for the "Seminar" schedule task, and the prompt information may be text information. For example, the notification bar 251 may display the following text information: "Seminar" and "Today 08:30 to 09:50", to notify the user of a starting time and specific items of the schedule task to be completed.

When the electronic device 100 displays the AOD screen or the lock screen, the electronic device 100 may receive unlock input by the user (for example, fingerprint input by the user or digital password input by the user). In response to the input, the electronic device 100 may display the desktop.

As shown in FIG. 2G the electronic device 100 may display a desktop 260. For text descriptions of the desktop 260, refer to the text descriptions in the embodiment shown in FIG. 2A. Details are not described herein again.

The electronic device 100 may receive swipe-down input performed by the user for a status bar on the desktop, and in response to the swipe-down input, display a drop-down screen including content of the foregoing notification information.

As shown in FIG. 2H, the drop-down screen 270 may include a notification window 271 and a control 272. The notification window 270 may display content of the "Seminar" schedule task, for example, the name of the schedule task: "Seminar"; and the time information of the schedule task: "Today 08:30 to 09:50". The control 272 may be used for receiving a touch operation (for example, tapping) performed by the user on the control, so that the electronic device 100 clears all notifications on the drop-down screen in response to the touch operation.

It can be learned from the foregoing notification display manner that the electronic device 100 can display notification information only on a specified type of display screen (for example, the always on display screen, the lock screen, or the drop-down screen), and the electronic device cannot display content of the notification information to the user in a timely and efficient manner. In addition, the user cannot perform further operations on the notification information, and efficiency of dealing with the notification information by the user is very low.

Therefore, this application provides a notification display method. The electronic device 100 may receive notification information delivered by a first application, and output different display content based on the notification information and different types of display screens. Display screen types may include an AOD screen, a lock screen, a drop-down screen, a desktop screen, an immersive application screen, and the like. In addition, the electronic device 100 may display a card including the notification information on a desktop screen. A user may further process notification content based on the card. The notification display method can help the user quickly view the notification content, thereby improving efficiency of dealing with the notification information by the user. It should be noted that an icon of an application program, a folder, and the like are displayed on a display screen, and components such as weather and clock may also be displayed on the display screen. These components may also be referred to as widgets, mini parts, parts, cards (optionally, a card is a widget), or the like. This is not limited in this embodiment of this application.

The following describes a notification display method provided in an embodiment of this application with reference to application scenarios.

In some application scenarios, the electronic device 100 may obtain notification information of a first application (for example, notification information of a schedule task, notification information of flight travel, or notification information of subway travel). The first application may be a reminder application, on a screen such as an AOD screen, a lock screen, or a desktop, that reminds a user that there is an item to be handled, for example, a calendar application, a notes application, or a travel application (for example, an application that can provide flight travel information, or an application that can provide subway travel information). The notification information is used to remind the user to deal with an event (for example, remind the user to deal with something, remind the user to attend a meeting, or remind the user to take a flight), or prompt the user (for example, prompt the user that a battery level of a mobile phone is excessively low). The notification information may be notification information from an application (for example, pushed information of a music app), notification information from an operating system (for example, version upgrade information), or notification information from an FA (Feature Ability, FA) or a PA (Particle Ability). This is not limited in this embodiment of this application. The electronic device 100 may output different types of prompts based on different types of screens displayed on the electronic device. For example, when the electronic device 100 displays the AOD screen, the electronic device 100 may display a prompt icon for the notification information. When the electronic device 100 displays the lock screen, the electronic device 100 may display a notification bar including the notification information. When the electronic device 100 unlocks the screen and displays the desktop screen, the electronic device 100 may display a card including the notification information on the desktop screen.

In some embodiments, the first application may be a notes application, for example, a calendar application. The electronic device 100 may obtain notification information of the notes application. The notification information includes schedule task information. The electronic device 100 may output a notification prompt for the schedule task information under a preset time condition. The electronic device 100 may output different types of prompt notifications based on different screens currently displayed on the electronic device 100. In addition, the electronic device 100 may output, based on different screens currently displayed, notification prompts including schedule task information with different levels of details. For example, when the electronic device 100 displays the AOD screen, the electronic device 100 may display, on the AOD screen, a prompt icon for indicating schedule task information. When the electronic device 100 displays the lock screen, the electronic device 100 may display a part of schedule task information (which may be referred to as first content) in a notification bar of the lock screen. When the electronic device 100 displays the desktop, the electronic device 100 may display, on the desktop, a card prompt with more schedule task information (which may be referred to as second content) than that in the notification bar of the lock screen.

For example, the calendar application is the first application, and the electronic device 100 may output a prompt notification for a current-day schedule in a schedule task.

When displaying a screen of the calendar application, the electronic device 100 may receive user input to add one or more schedule tasks. For a process of adding a schedule task, refer to the embodiments shown in FIG. 2A to FIG. 2D. Details are not described herein again. When the electronic device 100 detects that a current time is a preset time point 1 (for example, 8:00 AM), the electronic device 100 may receive one or more schedule tasks whose schedule starting dates are a current day and that are delivered by the calendar application. The one or more schedule tasks whose schedule starting dates are the current day may be referred to as a current-day schedule.

When the electronic device 100 detects that a type of a screen displayed on the electronic device 100 is an AOD screen, the electronic device 100 may display a prompt icon for the current-day schedule (which may also be referred to an icon of the first application) on the AOD screen.

Figure 3A:
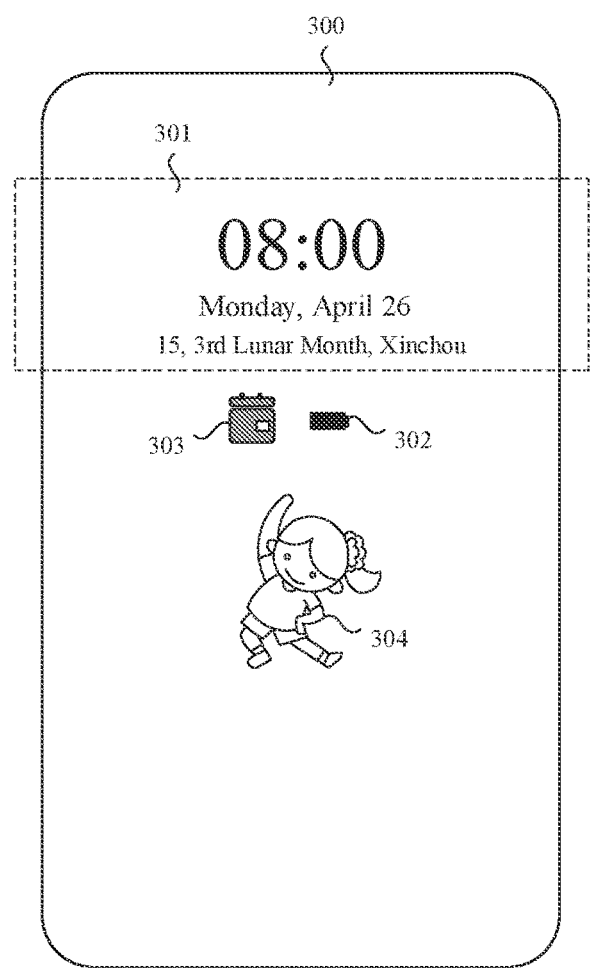
FIG. 3A to FIG. 3Q are schematic diagrams of a group of user interfaces according to an embodiment of this application.

As shown in FIG. 3A, the electronic device 100 may display an AOD screen 300. The AOD screen 300 may include a calendar indicator 301, a battery status indicator 302, a current-day schedule icon 303, and the like. The calendar indicator 301 may be used for indicating a current time, for example, a date, a day of a week, and hour and minute information. The battery status indicator 302 may be used for indicating a current battery level. The current-day schedule icon 303 may be used for notifying the user that there is one or more schedule tasks to be completed today.

Optionally, the AOD screen 300 may further display a preset image 304. The preset image 304 may be a default image prestored in the electronic device 100, or may be an image set by the user. The preset image 304 may be used for enriching display on the AOD screen 300.

When the electronic device 100 receives and responds to input of turning on the screen (which may also be referred to as a first operation), the electronic device 100 may display the lock screen. The electronic device 100 may display a notification bar on the lock screen. For example, the input of turning on the screen may be double-tapping the AOD screen or a press operation acting on the power button on the side of the electronic device 100. The notification bar may include schedule content of one or more schedule tasks of a current day, and the one or more schedule tasks of the current day has a highest priority among a plurality of schedule tasks of the current day. The having a highest priority among a plurality of schedule tasks of the current day may mean that a schedule starting time of a schedule task is the earliest among the plurality of schedule tasks of the current day. Schedule content of the schedule task may include one or more of a name of the schedule task, a schedule time (including a schedule starting time and a schedule ending time), a schedule location, and the like.

Figure 3B:
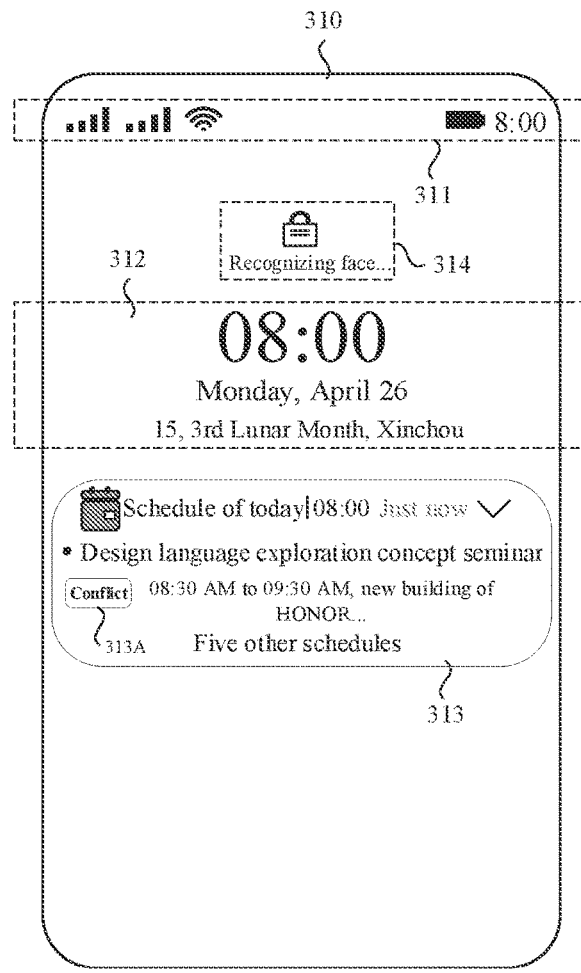

As shown in FIG. 3B, the electronic device 100 may display a lock screen 310. The lock screen 310 may include a status bar 311, a calendar indicator 312, a notification bar 313, a lock screen icon 314, and the like. For text descriptions of the status bar 311, the calendar indicator 312, and the lock screen icon 314, refer to the text descriptions in the embodiment shown in FIG. 2F. Details are not described herein again. The notification bar 313 may display content of a schedule task 1. A schedule starting time of the schedule task 1 is the earliest among a plurality of schedule tasks of a current day. Content, displayed in the notification bar 313, of the schedule task 1 may include a name of the schedule task 1 (for example, "Design language exploration concept seminar"), a schedule time of the schedule task 1 (for example, "08:30 AM to 09:30 AM"), and a schedule location of the schedule task 1 (for example, "New building of HONOR . . . ").

Optionally, when the electronic device 100 detects that the schedule time of the schedule task 1 overlaps a schedule time of another schedule task, the electronic device 100 may display a conflict prompt in the notification bar. The conflict prompt may be a conflict icon 313A in the notification bar 313 shown in FIG. 3B. The conflict icon 313A may be used for notifying the user that the schedule time of the schedule task 1 conflicts with the schedule time of the another schedule task.

Optionally, the notification bar 313 may further display current-day schedule task quantity information, and the current-day schedule task quantity information may be used for notifying the user of a quantity of schedule tasks of the current day. The current-day schedule task quantity information may be text prompt information: "Five other schedules".

When the electronic device 100 receives and responds to user input (which may also be referred to as a second operation, for example, input of swiping from bottom to top on the lock screen), the electronic device 100 may display an unlock screen. When the electronic device 100 displays the unlock screen, the electronic device 100 may verify an identity of the user in a biometric authentication manner. The biometric authentication manner may include one or more of password verification, face verification, fingerprint verification, iris verification, voiceprint verification, and the like.

Figure 3C:
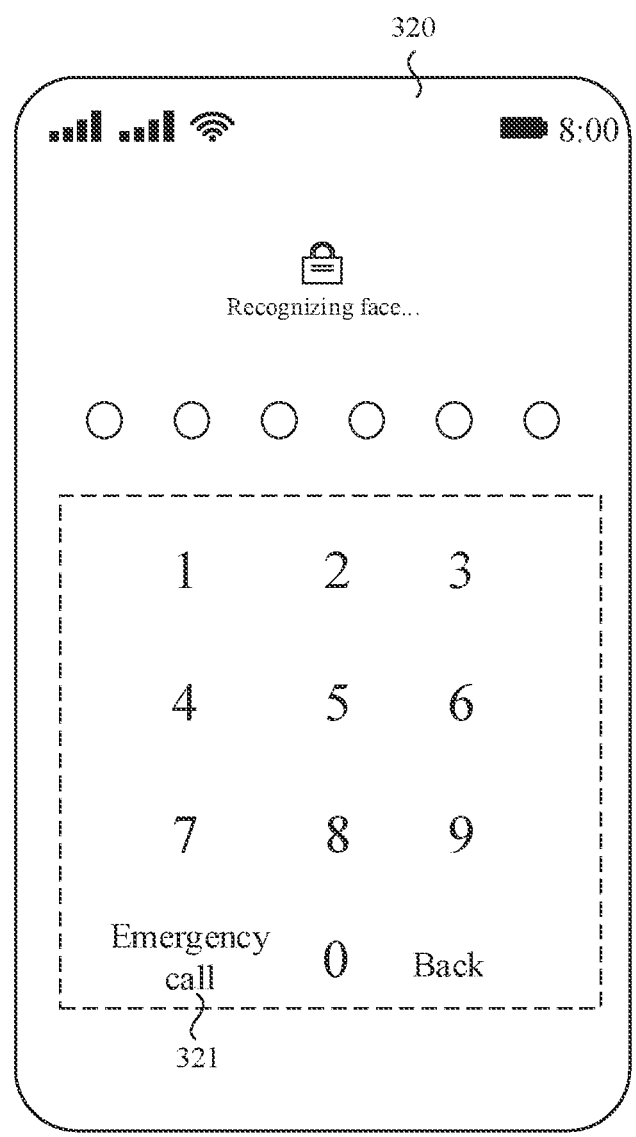
Figure 3D:
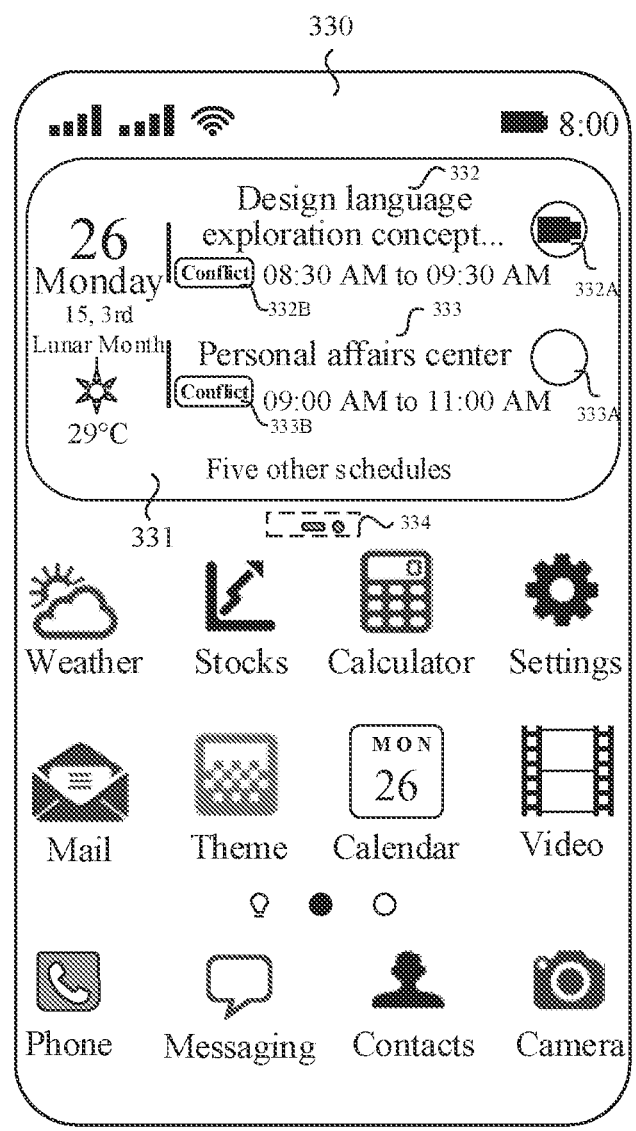

As shown in FIG. 3C, the electronic device 100 may display an unlock screen 320. The unlock screen 320 may display a digital area 321. The electronic device 100 may receive unlock input (for example, tapping) performed by the user on the digital area 321. In response to the unlock input, the electronic device 100 may unlock the screen and display the desktop.

When the electronic device 100 displays the desktop, if a current time is within a preset time period (for example, the current time is later than 8:00 AM, a schedule time of a current-day schedule task is later than the current time, and a difference between the schedule time and the current time is greater than a preset time threshold), the electronic device 100 may listen to a database, invoke a specified current-day schedule card management interface, and display the current-day schedule card (which may also be referred to as a first card) at the top of the desktop. The current-day schedule card may include schedule content of one or more schedule tasks of the current day.

As shown in FIG. 3D, the electronic device 100 may display a desktop 330. The electronic device 100 may display a current-day schedule card 331 and a component indicator 334 on the desktop 330. For text descriptions of other screen elements on the desktop 330, refer to the text descriptions in the embodiment shown in FIG. 2A. Details are not described herein again. The current-day schedule card 331 may include an option 332 corresponding to a schedule task 1 and an option 333 corresponding to a schedule task 2. A schedule name (for example, "Design language exploration concept . . . "), a schedule time (for example, "08:30 AM to 09:30 AM"), and a control 332A of the schedule task 1 are displayed in the option 332. The control 332A may be used for triggering the schedule task 1 of the electronic device 100 (for example, the electronic device 100 accesses a meeting link of the schedule task 1). A schedule name (for example, "Personal affairs center"), a schedule time (for example, "09:00 AM to 11:00 AM"), and a control 333A of the schedule task 2 are displayed in the option 333. The control 333A may be used for triggering the electronic device 100 to no longer display the foregoing content of the schedule task 2 in the current-day schedule card 331.

The component indicator 334 may be used for indicating a total quantity of components on a home screen and a location relationship between a currently displayed component and another component.

Optionally, when the electronic device 100 detects that the schedule time of the schedule task 1 and the schedule time of the execution task 2 overlap a schedule time of another schedule task, for example, the schedule time of the schedule task 1 overlaps the schedule time of the schedule task 2, the electronic device 100 may display a conflict prompt. The conflict prompt may be a conflict icon 332B and a conflict icon 333B shown in FIG. 3D, to notify the user that the schedule time of the schedule task conflicts with the schedule time of the another schedule task.

Optionally, the current-day schedule card 331 may further display current-day schedule task quantity information, and the current-day schedule task quantity information may be used for notifying the user of a quantity of schedule tasks of the current day. The current-day schedule task quantity information may be text prompt information: "Five other schedules".

If all schedule tasks in the current-day schedule card 331 have been performed, or when the electronic device 100 detects that a current time point is later than the latest schedule ending time among preset schedule ending times of one or more schedule tasks in a current-day schedule, the electronic device 100 may listen to a database, invoke a current-day schedule card management interface to uninstall the current-day schedule card 331, so that the current-day schedule card 331 can be no longer displayed on the desktop.

With reference to the examples of FIG. 3A to FIG. 3D, it can be learned that the electronic device 100 may display, on different display screens, notification prompts with different levels of details for current-day schedule information. For example, when the electronic device 100 displays the AOD screen, the electronic device 100 may display, on the AOD screen, a prompt icon for indicating the current-day schedule task information. When the electronic device 100 displays the lock screen, the electronic device 100 may display a part of the current-day schedule task information in a notification bar of the lock screen. When the electronic device 100 displays the desktop, the electronic device 100 may display, on the desktop, a current-day schedule card with more current-day schedule task information than that in the notification bar of the lock screen.

In a possible implementation, when the electronic device 100 displays, in the current-day schedule card, a control corresponding to a schedule task (for example, the control 332A corresponding to the schedule task 1 or the control 333A corresponding to the schedule task 2), the electronic device 100 may receive a touch operation (for example, tapping) acting on the control corresponding to the schedule task. In response to the touch operation, the electronic device 100 may perform a processing operation on the associated schedule task, and the electronic device 100 may display a corresponding user interface.

Figure 3E:
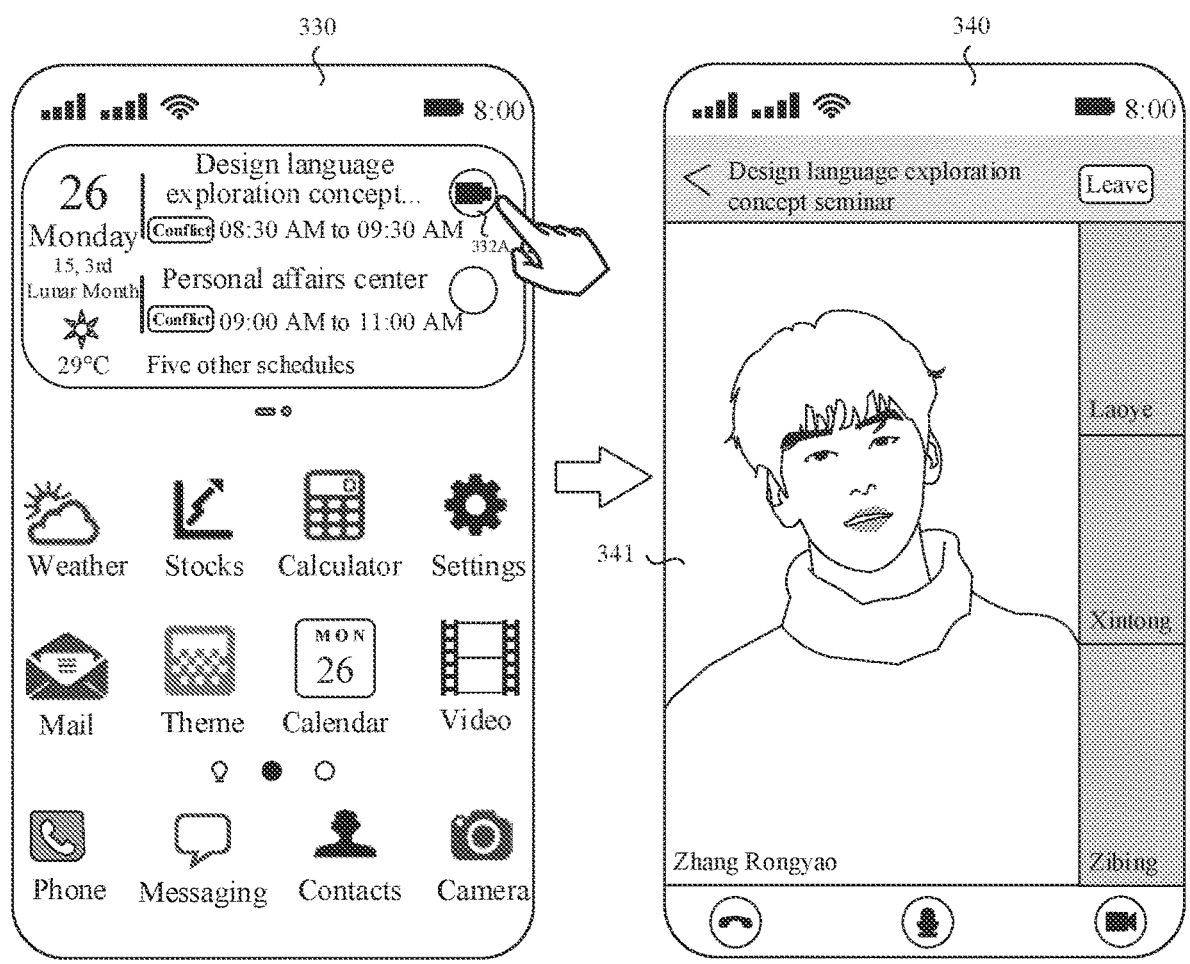

As shown in FIG. 3E, the electronic device 100 may receive a tap operation acting on the control 332A. In response to the tap operation, the electronic device 100 may obtain a corresponding meeting link and display a meeting screen, so that the user can join the meeting to deal with the schedule task 1. The meeting screen may include information about one or more participants, for example, an identification number (identity document, ID) of the participant. The electronic device 100 may receive video data and/or audio data of the participant when displaying the meeting screen. The meeting screen may be a meeting screen 340 shown in a figure on the right of FIG. 3E. The meeting screen 340 may display a meeting image 341, a meeting title (for example, "Design language exploration concept seminar"), and one or more participant IDs (for example, "Zhang Rongyao", "Laoye", "Xintong", and "Zibing"). When displaying the meeting screen 340, the electronic device 100 may receive video data and/or audio data of participants corresponding to the participant IDs.

Figure 3F:
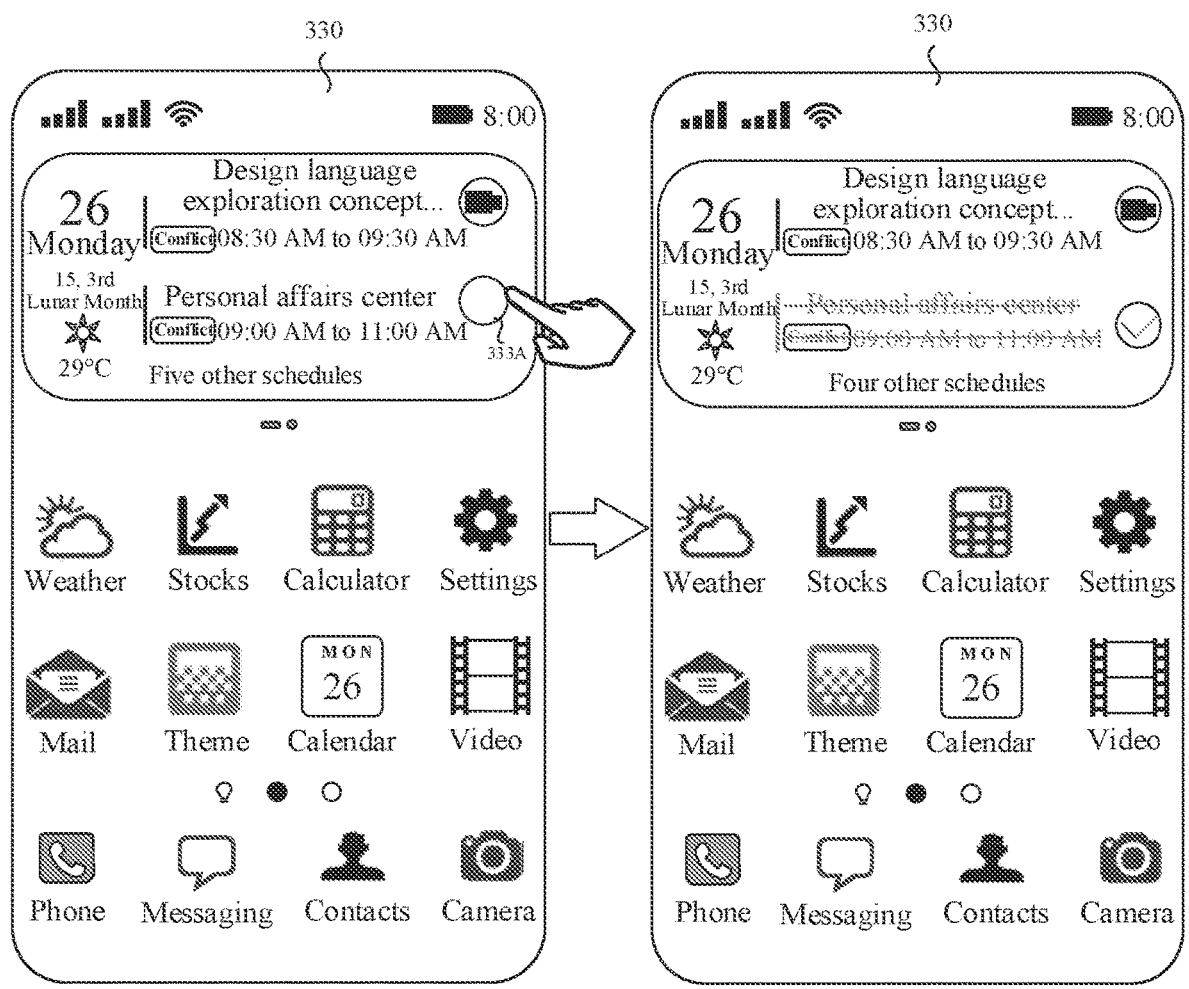

As shown in FIG. 3F, the electronic device 100 may receive a tap operation acting on the control 333A. In response to the tap operation, the electronic device 100 may display, in the current-day schedule card 331 on the desktop 330, an animation effect of deleting the schedule task 2, to notify the user that content of the schedule task 2 is no longer to be displayed in the schedule card 331.

In a possible implementation, when the electronic device 100 receives and responds to a tap operation acting on the control 333A, the electronic device 100 may no longer display content of the schedule task 2 in the current-day schedule card 331.

In a possible implementation, the electronic device 100 may display, in the current-day schedule card, a specified control for canceling display of a specified schedule task (for example, the schedule task 1 or the schedule task 2). When the electronic device 100 receives and responds to input on a specified control, and/or detects that a current time is later than a preset schedule ending time of a specified schedule task (for example, the schedule ending time "09:30 AM" of the schedule task 1, or the schedule ending time "11:00 AM" of schedule task 2), the electronic device 100 may listen to a database, obtain updated data of a current-day schedule task, and invoke the current-day schedule card management interface to cancel display of content of the specified schedule task in the current-day schedule card but display one or more schedule tasks other than the specified schedule task in a current-day schedule.

Figure 3G:
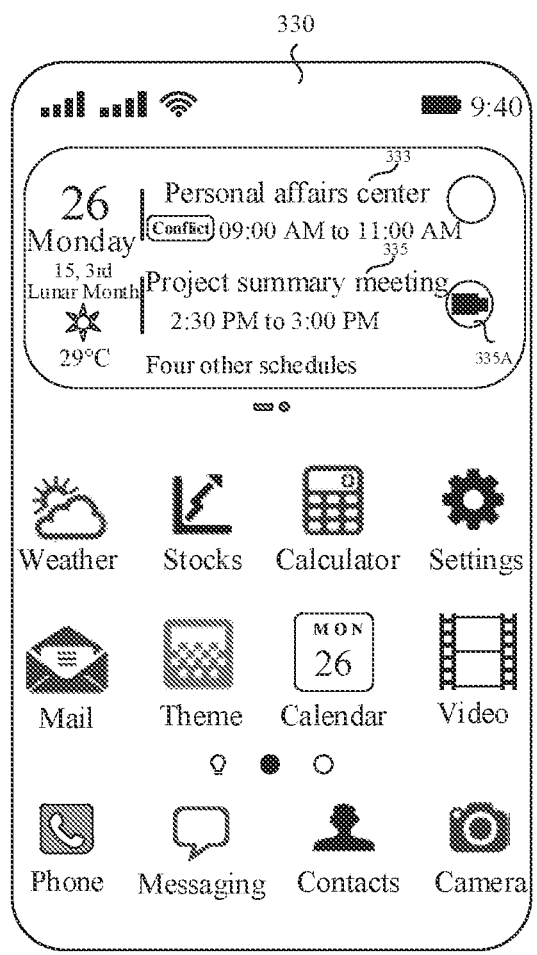

As shown in FIG. 3G, when the electronic device 100 detects that a current time is 09:40 and is later than the preset schedule ending time 09:30 of the schedule task 1, the electronic device 100 may update the current-day schedule card 331 and no longer display the option 332 for the schedule task 1. In this case, the current-day schedule card 331 may display the option 333 for the schedule task 2 and an option 335 for a schedule task 3. For descriptions of the option 333 corresponding to the schedule task 2, refer to the related descriptions of FIG. 3D. Details are not described herein again. The option 335 for the schedule task 3 may include content of the schedule task 3, for example, a name of the schedule task 3: "Project summary meeting"; a schedule time of the schedule task 3: "2:30 PM to 3:00 PM"; and a corresponding control 335A for the schedule task 3. The corresponding control 335A may be used for receiving a touch operation (for example, tapping) performed by the user on the control 335A, and the electronic device 100 may display a meeting screen in response to the touch operation. For text descriptions of the meeting screen, refer to the text descriptions in the embodiment shown in FIG. 3E.

Figure 3H:
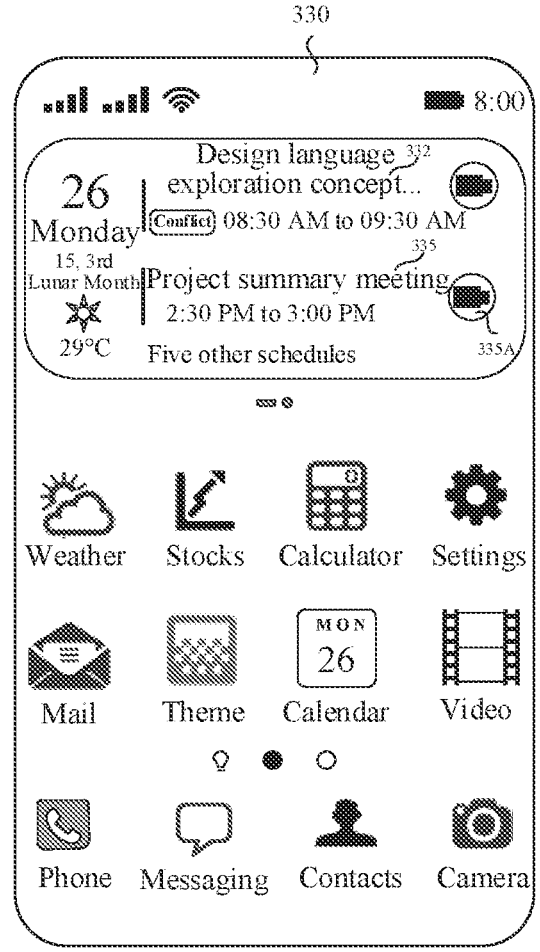

As shown in FIG. 3H, when the electronic device 100 receives a touch operation (for example, tapping) performed by the user on the control 333A corresponding to the schedule task 2 and responds to the touch operation, the electronic device 100 may no longer display the option 333 for the schedule task 2 in the current-day schedule card 331. In this case, the current-day schedule card 331 displays the option 332 for the schedule task 1 and the option 335 for the schedule task 3. For descriptions of the option 332, refer to the related descriptions in the embodiment shown in FIG. 3D. Details are not described herein again. For descriptions of the option 335, refer to the related descriptions in the embodiment shown in FIG. 3G Details are not described herein again.

In a possible implementation, when the electronic device 100 receives a touch operation (which may also be referred to as a third operation, for example, tapping) performed by the user on an option (for example, the option 332) corresponding to a specified schedule task (for example, the schedule task 1), the electronic device 100 may display a first application screen, and the first application screen may include content of the specified schedule task (which may also be referred to as third content).

Figure 3I:
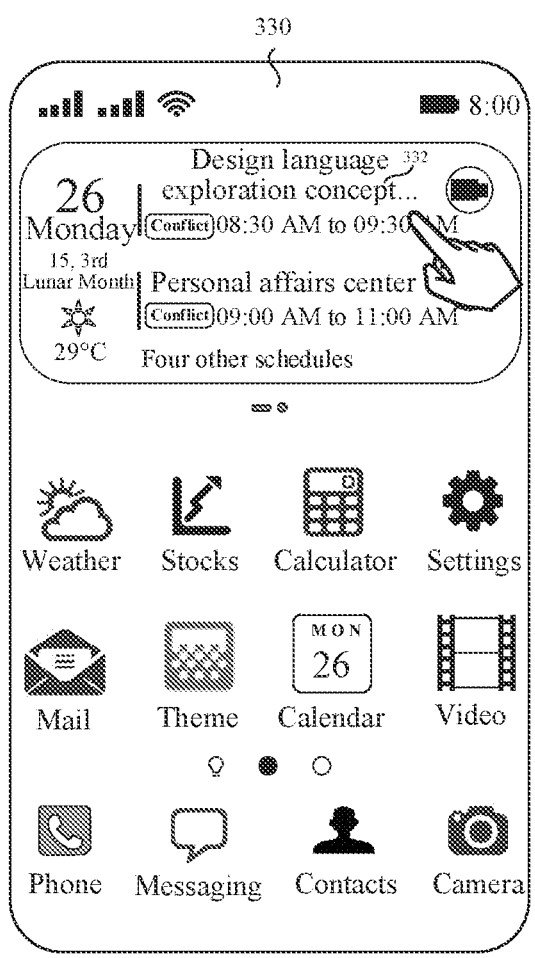
Figure 3J:
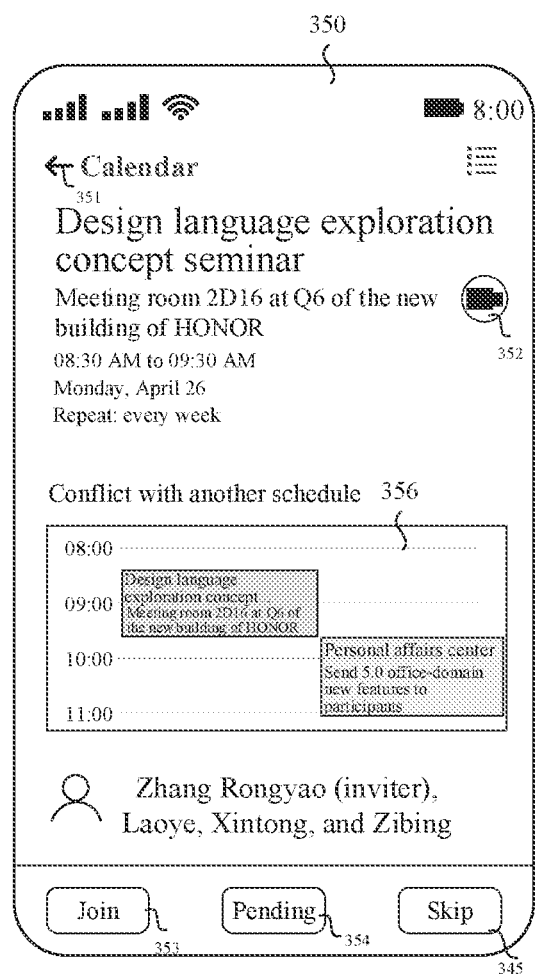

As shown in FIG. 3I and FIG. 3J, when the electronic device 100 receives and responds to a touch operation (for example, tapping) performed by the user on the option 332 corresponding to the schedule task 1, the electronic device 100 may display a calendar application screen 350. The calendar application screen 350 may display an application name "Calendar", a back icon 351, a control 352, a "Join" control 353, a "Pending" control 354, a "Skip" control 355, and content of the schedule task 1.

The back icon 351 may be used for the electronic device 100 to exit the calendar application screen 350 and display an upper-level page (for example, a calendar page).

The control 352 may be used for receiving input performed by the user on the control 352. In response to the input, the electronic device 100 may display a meeting screen, so that the user can join the meeting to deal with the schedule task 1. For descriptions of the meeting screen, refer to the descriptions in the embodiment shown in FIG. 3E. Details are not described herein again.

The "Join" control 353, the "Pending" control 354, and the "Skip" control 355 may be used for receiving input performed by the user on the controls. In response to the input, the electronic device 100 may perform processing operations, corresponding to the controls, for the schedule task 1. For example, when the electronic device 100 receives a touch operation (for example, tapping) on the "Join" control 353, the electronic device 100 may determine that the user performs the schedule task 1 and therefore no longer display a conflict prompt (for example, the conflict icon 332B).

The content of the schedule task 1 may include a name of the schedule task 1: "Design language exploration concept seminar"; a location of the schedule task 1: "Meeting room 2D16 at Q6 of the new building of HONOR"; a time of the schedule task 1: "08:30 AM to 09:30 AM", "Monday, April 26", and "Repeat: every week"; names of participants of the schedule task 1: "Zhang Rongyao". "Laoye", "Xintong", and "Zibing"; and a conflict prompt 356 for the schedule task 1.

In a possible implementation, the current-day schedule card may be displayed over an area of another functional component, or may be displayed in a blank area of the desktop. If the current-day schedule card is displayed over an area of another functional component, the electronic device 100 may receive user input (for example, left/right-swiping acting on the current-day schedule card), and display the another functional component. For example, the functional component may be a date and weather component, and the date and weather component may include time information such as hours, minutes, a date, and a day of a week, a location of the electronic device 100, and local weather.

Figure 3K:
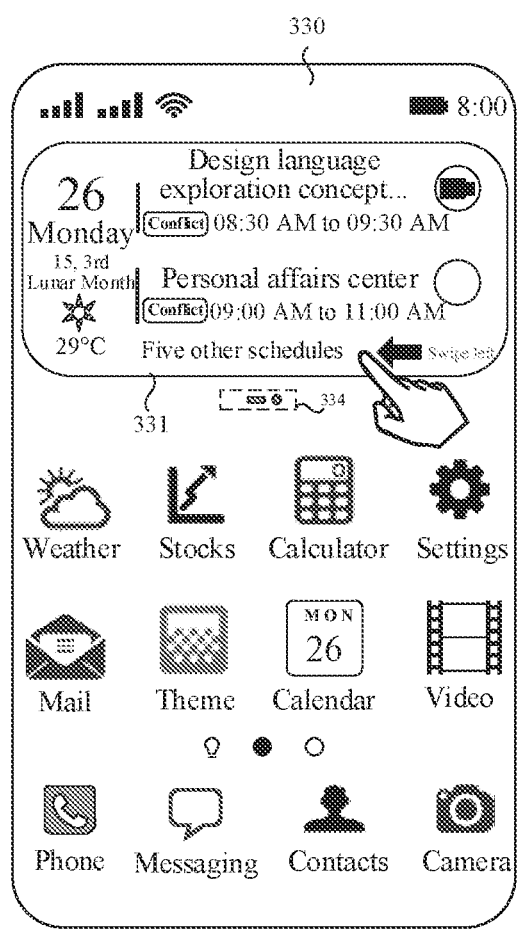
Figure 3L:
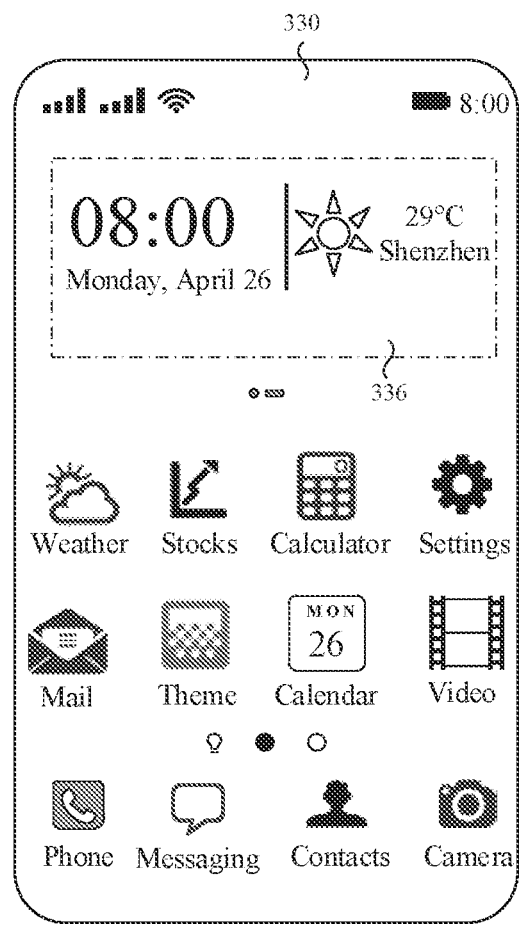

As shown in FIG. 3K to FIG. 3L, the electronic device 100 may receive input of swiping from right to left in the current-day schedule card 331. In response to the operation, the electronic device 100 may display a weather and time component 336 on the desktop 330. The weather and time component 336 may include time information: "08:00" and "Monday, April 26"; information about a current location of the electronic device 100: "Shenzhen"; information about weather at the location of the electronic device 100: "29° C."; and the like.

In a possible implementation, the electronic device 100 may receive an operation of expanding the notification bar on the lock screen. In response to the operation, the electronic device 100 may display the notification bar in an expanded manner. A display size of the notification bar may be greater than a display size of the notification bar that is not displayed in an expanded manner. The notification bar may include schedule content of one or more schedule tasks of a current day, and the one or more schedule tasks of the current day has a highest priority among a plurality of schedule tasks of the current day. The having a highest priority among a plurality of schedule tasks of the current day may mean that a schedule starting time of a schedule task is the earliest among the plurality of schedule tasks of the current day. Schedule content of the schedule task may include one or more of a name of the schedule task, a schedule time (including a schedule starting time and a schedule ending time), a schedule location, and the like.

Figure 3M:
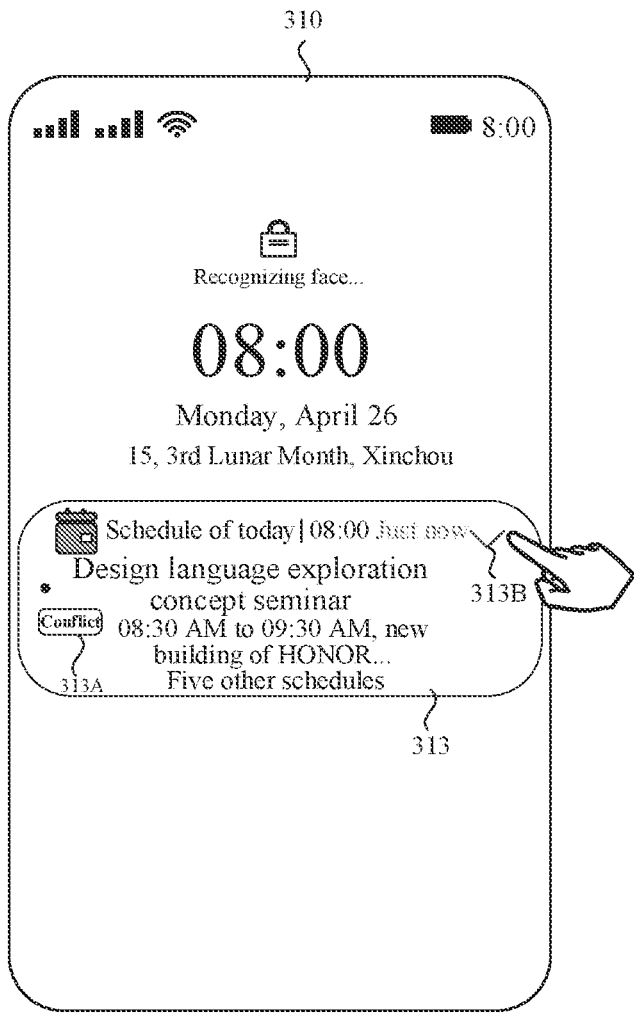
Figure 3N:

As shown in FIG. 3M and FIG. 3N, the electronic device 100 may receive, based on the lock screen 310, a touch operation (for example, tapping) of expanding a control 313B in the notification bar 313. In response to the touch operation, the electronic device 100 may display a notification bar 315 on the lock screen 310. A display size of the notification bar 315 is greater than that of the notification bar 313. The notification bar 315 may display content of the schedule task 1. A schedule starting time of the schedule task 1 is the earliest among a plurality of schedule tasks of a current day. In addition, the content, displayed in the notification bar 315, of the schedule task 1 may be more than that displayed in the notification bar 313. The content, displayed in the notification bar 315, of the schedule task 1 may include the name of the schedule task 1: "Design language exploration concept seminar", the schedule time of the schedule task 1: "08:30 AM to 09:30 AM"; the location of the schedule task 1: "Meeting room 2D16 at Q6 of the new building of HONOR"; and the conflict icon 313A. For descriptions of the conflict icon 313A, refer to the descriptions in the embodiment shown in FIG. 3B. Details are not described herein again.

Optionally, the notification bar 315 may further display current-day schedule task quantity information, and the current-day schedule task quantity information may be used for notifying the user of a quantity of schedule tasks of the current day. The current-day schedule task quantity information may be text prompt information: "Five other schedules".

In a possible implementation, when displaying the AOD screen, the electronic device 100 may also receive input of verifying an identity of the user in a biometric authentication manner. In response to the input, the electronic device 100 may display the desktop. The input of verifying the user in a biometric authentication manner may be one or more of password verification input, face verification input, fingerprint verification input, iris verification input, voiceprint verification input, and the like.

In a possible implementation, when the electronic device 100 detects that a current time is a preset time point 1 (for example, 8:00 AM), if the electronic device 100 cannot receive information about a current-day schedule because there is no one or more schedule tasks whose schedule starting dates are a current day, the electronic device 100 cannot display a reminder notification for the current-day schedule on the AOD screen, the lock screen, the desktop, or the like. After the preset time point 1 (for example, 8:00 AM), if the electronic device 100 receives, based on user input, information that is about the current-day schedule and that is delivered by the calendar application, the electronic device 100 may perform one or more of the following: displaying a reminder icon for the current-day schedule on the AOD screen; displaying, on the lock screen, a notification bar including a reminder for the current-day schedule; displaying, on the desktop, a card including the current-day schedule; and the like.

For example, when the first application is the calendar application, the electronic device 100 may output a prompt notification for a next-day schedule in a schedule task.

When displaying a screen of the calendar application, the electronic device 100 may receive user input to add one or more schedule tasks. For a process of adding a schedule task, refer to the embodiments shown in FIG. 2A to FIG. 2D. Details are not described herein again. When the electronic device 100 detects that a current time is a preset time point 2 (for example, 21:00 PM), the electronic device 100 may receive one or more schedule tasks whose schedule starting dates are a next day and that are delivered by the calendar application. The one or more schedule tasks whose schedule starting dates are the next day may be referred to as a next-day schedule.

When the electronic device 100 detects that a type of a screen displayed on the electronic device 100 is an AOD screen, the electronic device 100 may display a prompt icon for the next-day schedule on the AOD screen.

Figure 3O:
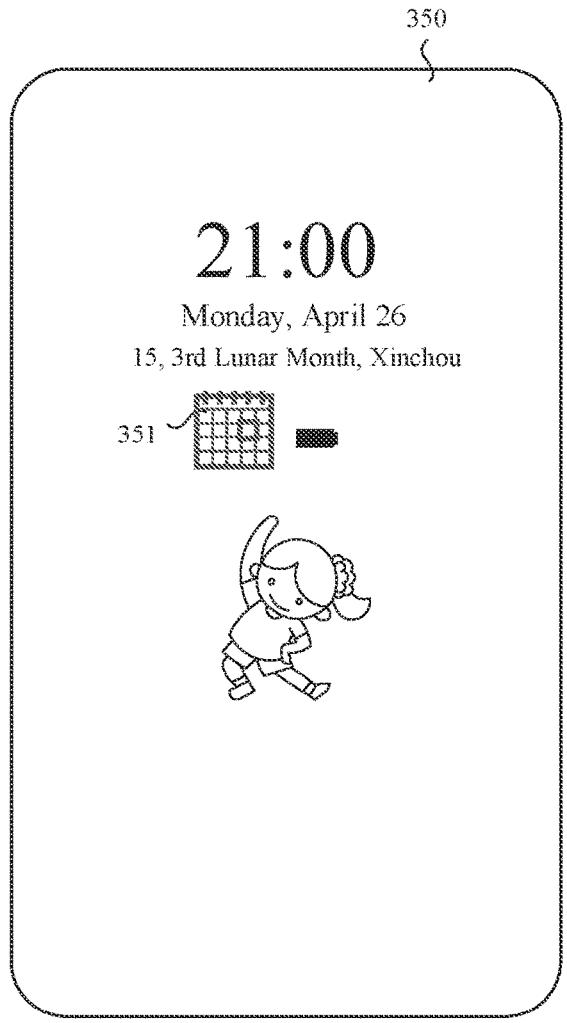

As shown in FIG. 3O, the electronic device 100 may display an AOD screen 350. The AOD screen 350 may include a next-day schedule icon 351. The next-day schedule icon 351 may be used for notifying the user that there is one or more schedule tasks to be completed tomorrow. For descriptions of other screen elements on the AOD screen 350, refer to the descriptions in the embodiment shown in FIG. 3A. Details are not described herein again.

When the electronic device 100 receives and responds to input of turning on the screen (which may also be referred to as a first operation), the electronic device 100 may display the lock screen. The electronic device 100 may display a notification bar on the lock screen. For example, the input of turning on the screen may be double-tapping the AOD screen or a press operation acting on the power button on the side of the electronic device 100. The notification bar may display reminder information for a next-day schedule, for example, a quantity of schedule tasks of a next day.

Figure 3P:
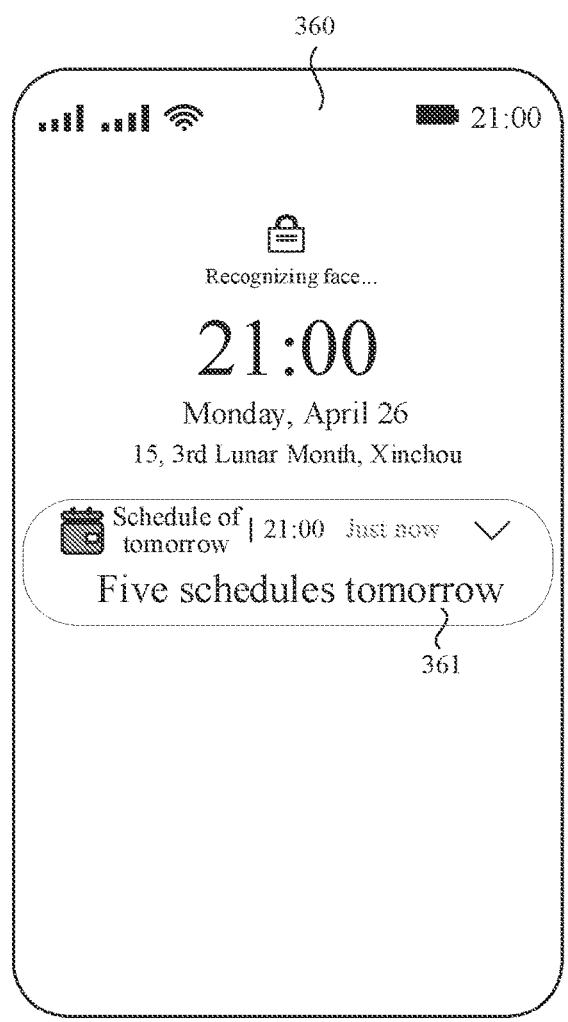

As shown in FIG. 3P, the electronic device 100 may display a lock screen 360. The lock screen 360 may include a notification bar 361. The notification bar 361 may display prompt information for a next-day schedule, for example, a quantity of schedule tasks of a next day: "Five schedules tomorrow". The prompt information for the next-day schedule may be used for notifying the user of a quantity of schedule tasks to be completed on the next day.

When the electronic device 100 receives and responds to user input (which may also be referred to as a second operation, for example, input of swiping from bottom to top on the lock screen), the electronic device 100 may display an unlock screen. When the electronic device 100 displays the unlock screen, the electronic device 100 may verify an identity of the user in a biometric authentication manner. The biometric authentication manner may include one or more of password verification, face verification, fingerprint verification, iris verification, voiceprint verification, and the like.

The unlock screen may be the unlock screen 320 shown in FIG. 3C. For descriptions of the unlock screen 320, refer to the descriptions in the embodiment shown in FIG. 3C. Details are not described herein again.

When the electronic device 100 receives and responds to unlock input based on the unlock screen, the electronic device 100 may display the desktop. When the electronic device 100 displays the desktop, if a current time is within a preset time period (for example, 21:00 PM to 24:00 PM), the electronic device 100 may display a next-day schedule card on the desktop. The next-day schedule card may include prompt information for a next-day schedule, for example, a quantity of schedule tasks of a next day, and a prompt for a schedule starting time of a schedule task with a highest schedule priority. The schedule task with the highest schedule priority may be a schedule task with the earliest schedule starting time among one or more schedule tasks of the next day.

Figure 3Q:
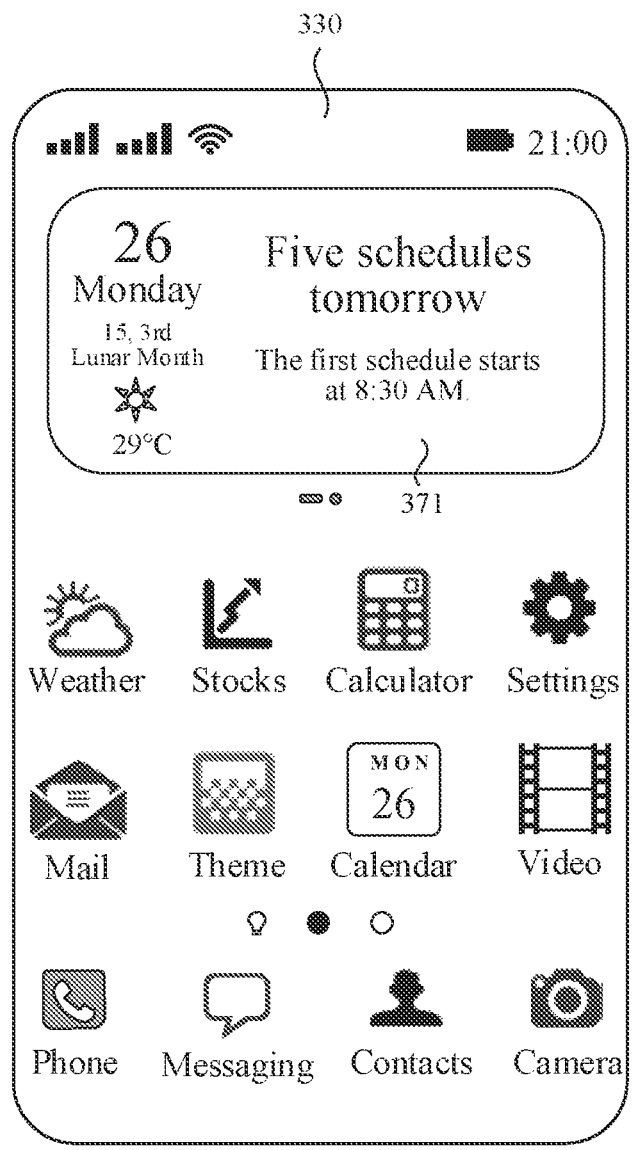

As shown in FIG. 3Q, the electronic device 100 may display a desktop 330. The desktop 330 may display a next-day schedule card 371. The next-day schedule card 371 may display prompt information for a next-day schedule, for example, a quantity of schedule tasks in the schedule of a next day: "Five schedules tomorrow"; and a prompt for a starting time of a schedule with a highest schedule priority: "The first schedule starts at 8:30 AM." For descriptions of other screen elements on the desktop 330, refer to the related descriptions in the embodiment shown in FIG. 3D. Details are not described herein again.

In a possible implementation, if all schedule tasks in the next-day schedule are checked by the user within a preset time period (for example, 21:00 PM to 24:00 PM) to indicate completion, the desktop may no longer display the next-day schedule card (for example, the next-day schedule card 371 shown in FIG. 3Q).

For example, when the first application is the calendar application, the electronic device 100 may output a prompt notification for a specified schedule task of schedule tasks.

When displaying a screen of the calendar application, the electronic device 100 may receive user input to add one or more schedule tasks. For a process of adding a schedule task, refer to the embodiments shown in FIG. 2A to FIG. 2D. Details are not described herein again. When the electronic device 100 detects that a difference between a current time and a schedule starting time of a specified schedule task is within a preset time threshold range 1 (for example, 30 minutes), the electronic device 100 may receive information that is about the specified schedule task and that is delivered by the calendar application.

When the electronic device 100 detects that the electronic device 100 displays the AOD screen, the electronic device 100 may display a prompt icon for the specified schedule on the AOD screen.

Figure 4A:
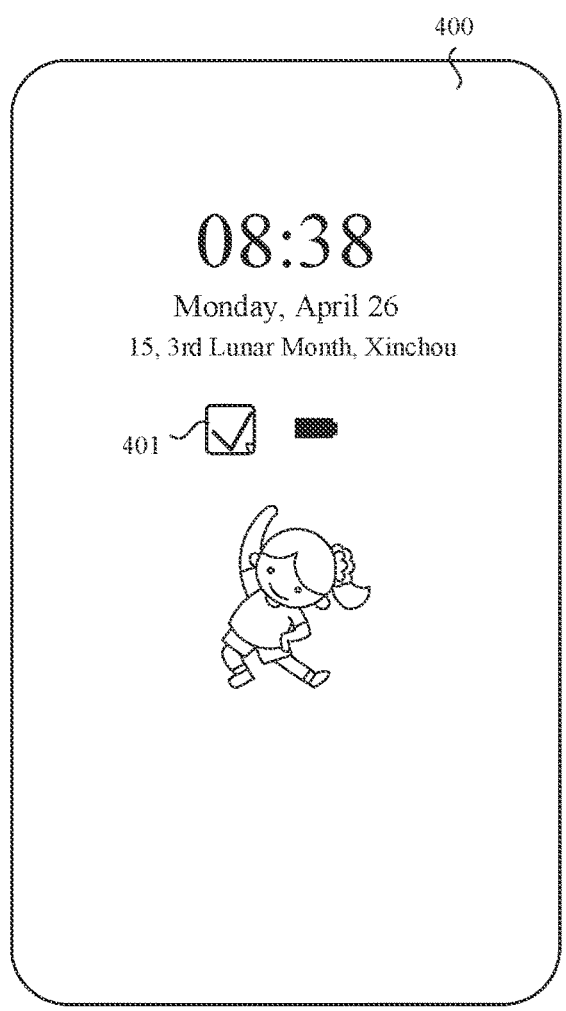
FIG. 4A to FIG. 4N are schematic diagrams of a group of user interfaces according to an embodiment of this application.

As shown in FIG. 4A, the schedule task 2 in the foregoing current-day schedule is used as a specified schedule. The electronic device 100 may display an AOD screen 400. The AOD screen 400 may include a calendar indicator, a battery status indicator, a schedule task prompt icon 401, and the like. For descriptions of the calendar indicator and the battery status indicator, refer to the descriptions in the embodiment shown in FIG. 3A. Details are not described herein again. The schedule task prompt icon 401 may be used for notifying the user that there is a schedule task that needs to be completed.

Figure 4B:
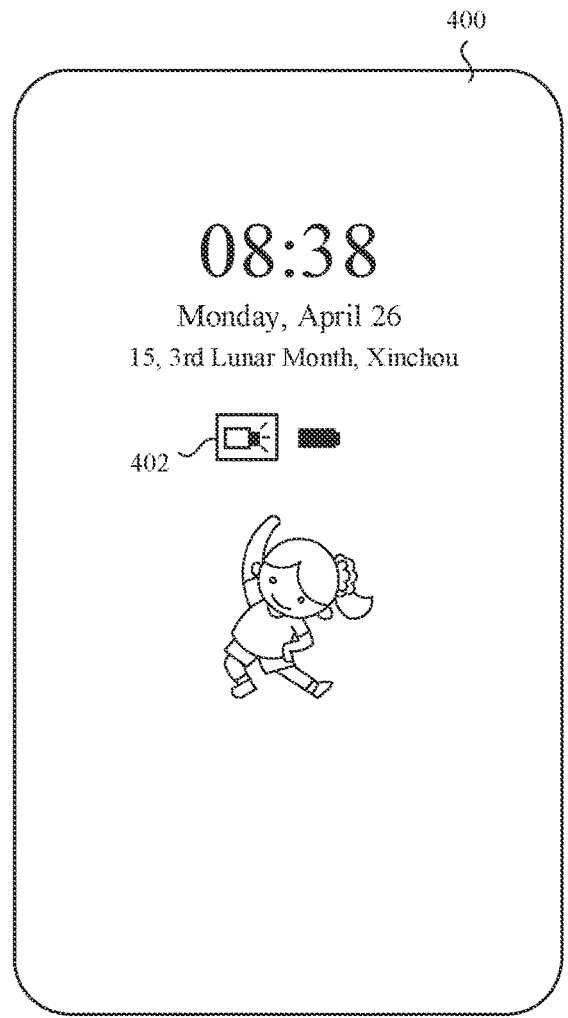

Optionally, when the electronic device 100 receives different types of schedule task information delivered by the same application, the AOD screen may display different schedule prompt icons based on different types of schedule tasks. The different types of schedule tasks mean that scenarios for dealing with schedule tasks are different, for example, a to-do schedule, a meeting schedule, and a shopping schedule. For example, the electronic device 100 may receive information about the schedule task 1 and information about the schedule task 2 that are delivered by the calendar application. The schedule task 1 is a meeting schedule, and the schedule task 2 is a to-do schedule. The schedule task 1 and the schedule task 2 belong to different types. In this case, for the schedule task 1, the AOD screen 400 may display a meeting schedule task prompt icon 402 shown in FIG. 4B. For the schedule task 2, the AOD screen 400 may display a to-do schedule task prompt icon 401 shown in FIG. 4A. Alternatively, the same icon may be displayed for the schedule task 1 and the schedule task 2. For example, a calendar icon is displayed for both schedule tasks. This is not limited in this application.

When the electronic device 100 receives and responds to input of turning on the screen (which may also be referred to as a first operation), the electronic device 100 may display the lock screen. The electronic device 100 may display a notification bar on the lock screen. For example, the input of turning on the screen may be double-tapping the AOD screen or a press operation acting on the power button on the side of the electronic device 100. The notification bar may include content of a specified schedule task, for example, one or more of a name of the specified schedule task, a schedule time and a schedule location of the specified schedule task, and the like.

Figure 4C:
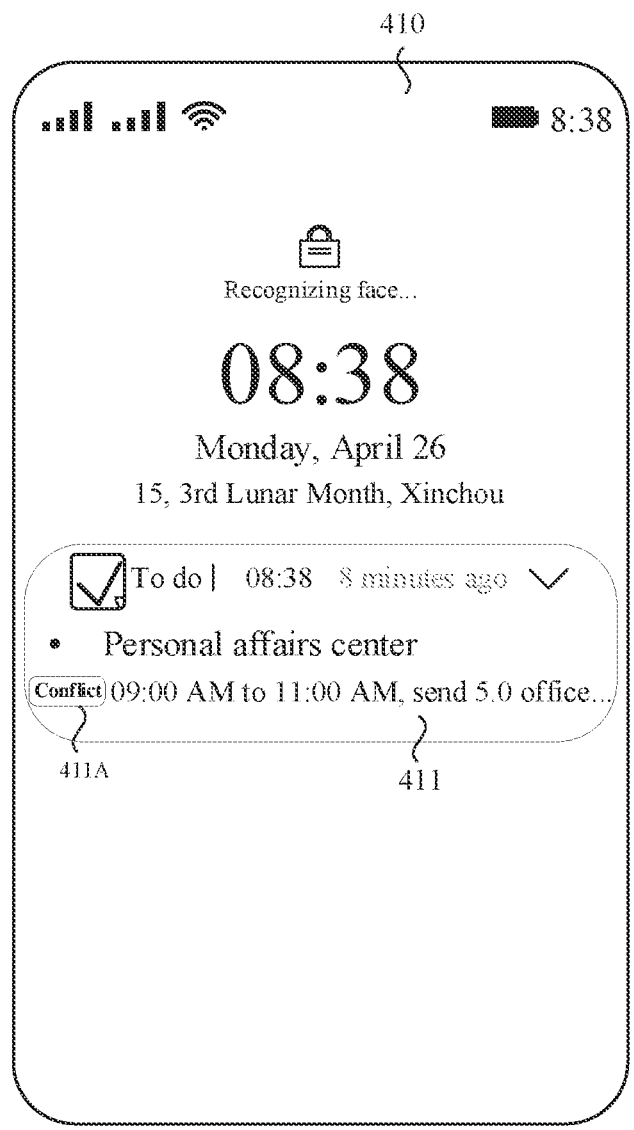

As shown in FIG. 4C, the schedule task 2 in the foregoing current-day schedule is used as a specified schedule. The electronic device 100 may display a lock screen 410. The lock screen 410 may include a status bar, a calendar indicator, a notification bar 411, and a lock screen icon. For descriptions of the status bar, the calendar indicator, and the lock screen icon, refer to the descriptions in the embodiment shown in FIG. 3B. Details are not described herein again. The notification bar 411 may display content of the schedule task 2, for example, the name of the schedule task 2: "Personal affairs center"; the schedule time of the schedule task 2: "09:00 AM to 11:00 AM"; and remarks of the schedule task 2: "Send 5.0 office . . . ".

Optionally, when the electronic device 100 detects that a schedule time of a specified schedule task (for example, the schedule task 2) overlaps a schedule time of another schedule task, the electronic device 100 may display a conflict prompt in the notification bar. The conflict prompt may be a conflict icon 411A in the notification bar 411 shown in FIG. 4C, to notify the user that the schedule time of the specified schedule task conflicts with the schedule time of the another schedule task.

When the electronic device 100 receives and responds to user input (which may also be referred to as a second operation, for example, input of swiping from bottom to top on the lock screen), the electronic device 100 may display an unlock screen. When the electronic device 100 displays the unlock screen, the electronic device 100 may verify an identity of the user in a biometric authentication manner. The biometric authentication manner may include one or more of password verification, face verification, fingerprint verification, iris verification, voiceprint verification, and the like.

The unlock screen may be the unlock screen 320 shown in FIG. 3C. For descriptions of the unlock screen 320, refer to the descriptions in the embodiment shown in FIG. 3C. Details are not described herein again.

When the electronic device 100 receives and responds to unlock input based on the unlock screen, the electronic device 100 may display the desktop. When the electronic device 100 displays the desktop, if a difference between a current time and a schedule starting time of a specified schedule task is within a preset time threshold 1 (for example, 30 minutes), the electronic device 100 may invoke a specified schedule task card interface and display a specified schedule task card on the desktop. For example, in a possible implementation, the electronic device 100 may display the specified schedule task card on the desktop based on an identifier of the specified schedule task card by using a preset instruction (for example, using an onDisplayCard instruction to request the operation instruction to display, on the desktop, the specified schedule task card for an EventID corresponding to the specified schedule task card in a loadBusinessID). The specified schedule task card displays one or more of a name of the specified schedule task, a schedule time of the specified schedule task, remarks of the specified schedule task, a location of the specified schedule task, a control corresponding to the specified schedule, and the like.

Figure 4D:
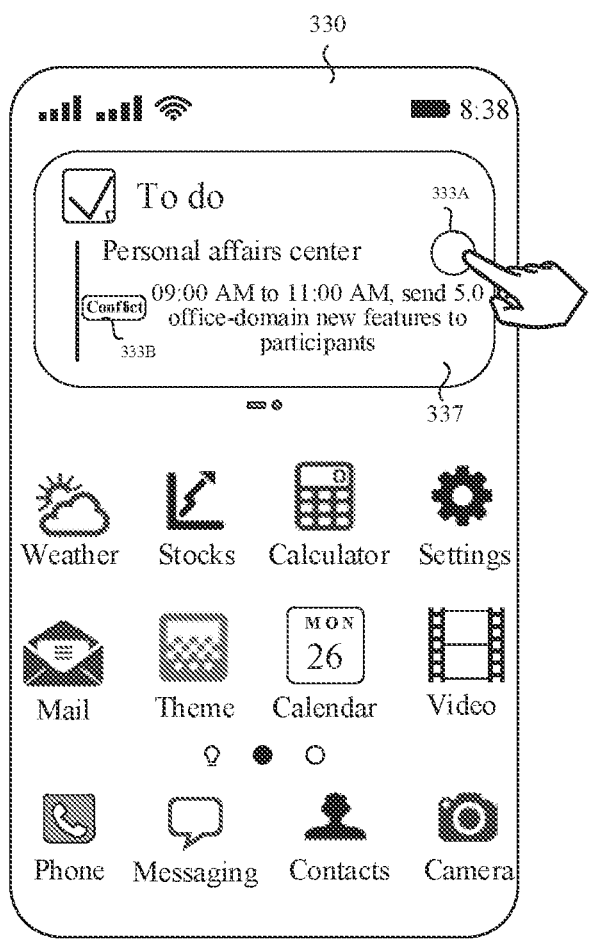

As shown in FIG. 4D, the schedule task 2 in the foregoing current-day schedule is used as a specified schedule. The electronic device 100 may display a desktop 330. The desktop 330 may display a specified schedule task card 337. The specified schedule task card 337 may display content of the schedule task 2 and the control 333A corresponding to the specified schedule task, for example, the name of the specified schedule task: "Personal affairs center"; the schedule time of the specified schedule task: "09:00 AM to 11:00 AM"; and remarks of the schedule task 2: "Send 5.0 office-domain new features to participants". For descriptions of the control 333A, refer to the descriptions in the embodiment shown in FIG. 3D. Details are not described herein again. For descriptions of other screen elements on the desktop 330, refer to the related descriptions in the embodiment shown in FIG. 3D. Details are not described herein again.

Optionally, when the electronic device 100 detects that the schedule time of the specified schedule task (for example, the schedule task 2) overlaps a schedule time of another schedule task, the electronic device 100 may display a conflict prompt in the specified schedule task card. The conflict prompt may be a conflict icon 333B in the specified schedule task card 337 shown in FIG. 4D. For descriptions of the conflict icon 333B, refer to the descriptions in the embodiment shown in FIG. 3D. Details are not described herein again.

With reference to the examples of FIG. 4A to FIG. 4D, it can be learned that the electronic device 100 may display, on different display screens, notification prompts with different levels of details for specified schedule information. For example, when the electronic device 10) displays the AOD screen, the electronic device 100 may display, on the AOD screen, a prompt icon for indicating the specified schedule task information. When the electronic device 100 displays the lock screen, the electronic device 100 may display a part of the specified schedule task information in a notification bar of the lock screen. When the electronic device 100 displays the desktop, the electronic device 100 may display, on the desktop, a specified schedule task card with all the specified schedule task information.

In a possible implementation, when the electronic device 100 receives and responds to a touch operation (for example, tapping) on a control (for example, the control 333A) corresponding to a specified schedule task, and/or detects that a current time is later than a preset time point 3 (for example, 20 minutes after a schedule ending time of a specified schedule or a schedule starting time corresponding to the specified schedule), the electronic device 100 may invoke a specified schedule task card interface to remove the specified schedule task card, that is, the specified schedule task card is no longer displayed on the desktop. The current-day schedule card may include content of one or more schedule tasks other than the specified schedule task in the current-day schedule.

Figure 4E:
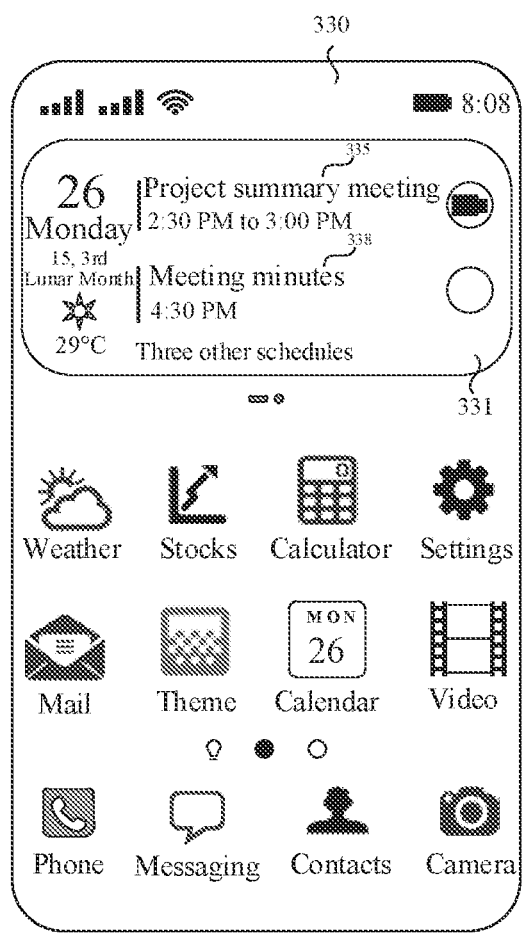

As shown in FIG. 4D and FIG. 4E, the schedule task 2 in the foregoing current-day schedule is used as a specified schedule. When the electronic device 100 receives and responds to a touch operation (for example, tapping) performed by the user on the control 333A corresponding to the schedule task 2, the electronic device 100 may no longer display the specified schedule task card 337. The electronic device 100 displays the current-day schedule card 331 on the desktop 330. The current-day schedule card 331 may include an option for one or more schedule tasks other than the schedule task 2 in the current-day schedule. The option for the one or more schedule tasks may include the option 335 for the schedule task 3 and an option 338 for a schedule task 4. For descriptions of the option 335, refer to the descriptions in the embodiment shown in FIG. 3G Details are not described herein again. The option 338 for the schedule task 4 may include content of the schedule task 4, for example, a name of the schedule task 4: "Meeting minutes"; and a schedule time of the schedule task 4: "4:30 PM".

Optionally, the current-day schedule card 331 may further display current-day schedule task quantity information, and the current-day schedule task quantity information may be used for notifying the user of a quantity of schedule tasks of the current day. The current-day schedule task quantity information may be text prompt information: "Three other schedules".

In a possible implementation, the electronic device 100 may receive an operation of expanding the notification bar on the lock screen. In response to the operation, the electronic device 100 may display the notification bar in an expanded manner. A size of the notification bar may be greater than a size of the notification bar that is not displayed in an expanded manner. The notification bar may include content of a specified schedule task, for example, one or more of a name of the specified schedule task, a schedule time of the specified schedule task, remarks of the specified schedule task, a location of the specified schedule time, or the like.

Figures 4F, 4G:
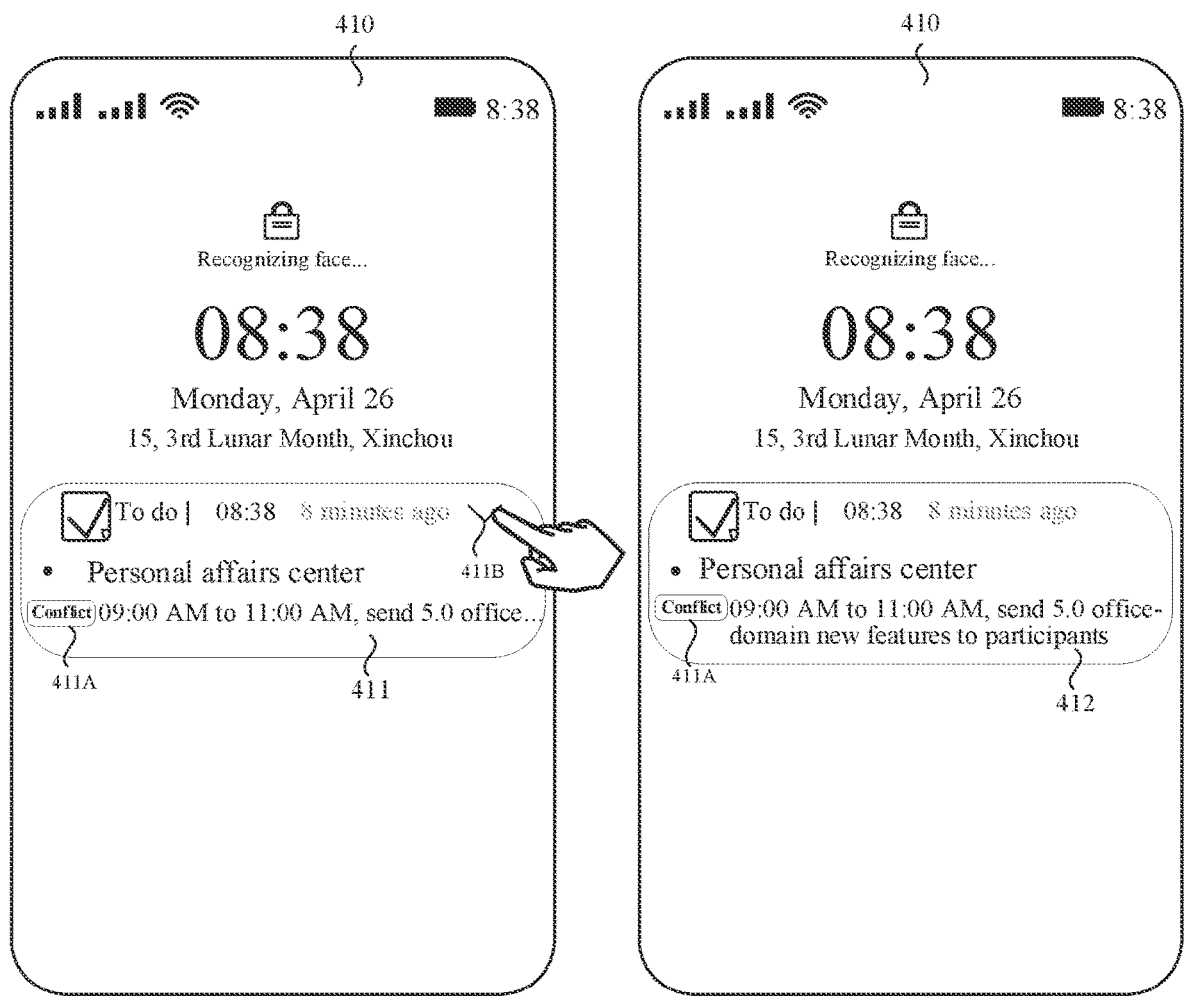

As shown in FIG. 4F and FIG. 4Q the schedule task 2 in the foregoing current-day schedule is used as a specified schedule. The electronic device 100 may receive, based on the lock screen 410, a touch operation (for example, tapping) of expanding the control 411B in the notification bar 411. In response to the touch operation, the electronic device 100 may display a notification bar 412 on the lock screen 410. A display size of the notification bar 412 may be greater than that of the notification bar 411. The notification bar 412 may display content of the schedule task 2. In addition, the content, displayed in the notification bar 412, of the schedule task 1 may be more than that displayed in the notification bar 411. The content, displayed in the notification bar 412, of the schedule task 2 may include the name of the schedule task 2: "Personal affairs center"; the schedule time of the schedule task 2: "09:00 AM to 11:00 AM"; and the remarks of the schedule task 2: "Send 5.0 office-domain new features to participants".

Optionally, when the electronic device 100 detects that the schedule time of the specified schedule task (for example, the schedule task 2) overlaps a schedule time of another schedule task, the electronic device 100 may display a conflict prompt in the notification bar. The conflict prompt may be the conflict icon 411A in the notification bar 412 shown in FIG. 4G For descriptions of the conflict icon 411A, refer to the descriptions of the embodiment shown in FIG. 4C. Details are not described herein again.

In a possible implementation, when the electronic device 100 detects that a difference between a current time and a schedule starting time of a specified schedule task is within a preset time threshold 2 (for example, within 20 minutes), the electronic device 100 may display, in response, a strong reminder notification for the specified schedule task on the AOD screen, the lock screen, or the desktop. For example, one or more of the following is performed; The electronic device 100 displays a prompt icon for the specified schedule task on the AOD screen in a flashing manner, the electronic device 100 displays a notification bar with a preset size on the lock screen; the electronic device 100 displays a specified schedule task card on the desktop with an animation effect; the electronic device 100 outputs a vibration reminder; or the like.

Figure 4H:
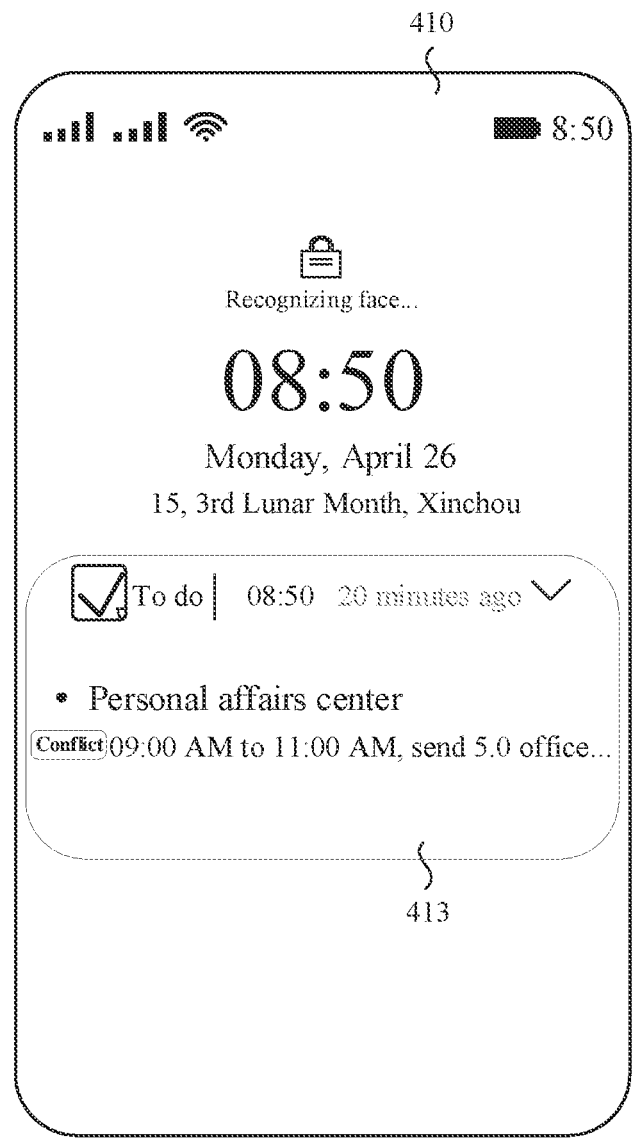

As shown in FIG. 4H, the schedule task 2 in the foregoing current-day schedule is used as a specified schedule. When the electronic device 100 detects that a difference between a current time and a schedule starting time of a specified schedule task is within a preset time threshold 2 (for example, 10 minutes), the electronic device 100 may display a notification bar 413 with a preset size on a notification screen 410. A display size of the notification bar 412 may be greater than that of the notification bar 412 in the embodiment shown in FIG. 4G For descriptions of content of the schedule task 2 in the notification bar 413, refer to the related descriptions in the embodiment shown in FIG. 4C. Details are not described herein again.

In a possible implementation, when the electronic device 100 detects that a difference between a current time and a schedule starting time of a specified schedule task is within a preset time threshold 2 (for example, within 20 minutes), the electronic device 100 may display different prompt notifications on a currently displayed screen (for example, the AOD screen, the lock screen, or the desktop) at an interval of a preset time interval (for example, every 5 minutes), to better notify the user that the specified schedule task is to be dealt with.

For example, the schedule task 2 is the specified schedule task, and the currently displayed screen is the lock screen. When the electronic device 100 detects that the difference between the current time and the schedule starting time of the specified schedule task is 20 minutes, the electronic device 100 may display the notification bar 413 shown in FIG. 4H on the lock screen. When the electronic device 100 detects that the difference between the current time and the schedule starting time of the specified schedule task is 15 minutes, the electronic device 100 may display, on the lock screen in a flashing manner, the notification bar 413 shown in FIG. 4H. When the electronic device 100 detects that the difference between the current time and the schedule starting time of the specified schedule task is 10 minutes, the electronic device 100 may change a background color of the notification bar 413 for display (for example, in red). When the electronic device 100 detects that the difference between the current time and the schedule starting time of the specified schedule task is 5 minutes, the electronic device 100 may display a notification bar with a larger size than that of the notification bar 413, or the like.

Likewise, intensity of a reminder displayed on the lock screen, the AOD screen, or the desk-top screen may also vary with the difference between the current time and the schedule starting time of the specified schedule task, and an effect of a displayed reminder is increasingly striking as the time approaches.

For example, the schedule task 2 is the specified schedule task, and the currently displayed screen is the AOD screen. When the electronic device 100 detects that the difference between the current time and the schedule starting time of the specified schedule task is 20 minutes, the electronic device 100 may display, on the AOD screen, a prompt icon with a larger size than that of the schedule task prompt icon 401 shown in FIG. 4A. When the electronic device 100 detects that the difference between the current time and the schedule starting time of the specified schedule task is 15 minutes, the electronic device 100 may display, on the AOD screen in a flashing manner, the schedule task prompt icon 401 shown in FIG. 4A. When the electronic device 100 detects that the difference between the current time and the schedule starting time of the specified schedule task is 10 minutes, the electronic device 100 may change a background color of the schedule task prompt icon 401 for display (for example, in red), or the like.

In a possible implementation, when the electronic device 100 detects that a difference between a current time and a schedule starting time of a specified schedule task is within a preset time threshold 1 (for example, within 30 minutes), the electronic device 100 may alternatively display, in response, an alarm reminder for the specified schedule task. In a process of displaying the alarm reminder in response, the electronic device 100 may display an alarm reminder screen, and output audio data and/or a vibration reminder, or the like. The alarm reminder screen may display content of the specified schedule task and a control corresponding to the specified schedule task. The content of the specified schedule task may include one or more of a name of the specified schedule task, a schedule time of the specified schedule task, a location of the specified schedule task, or the like.

Figure 4I:
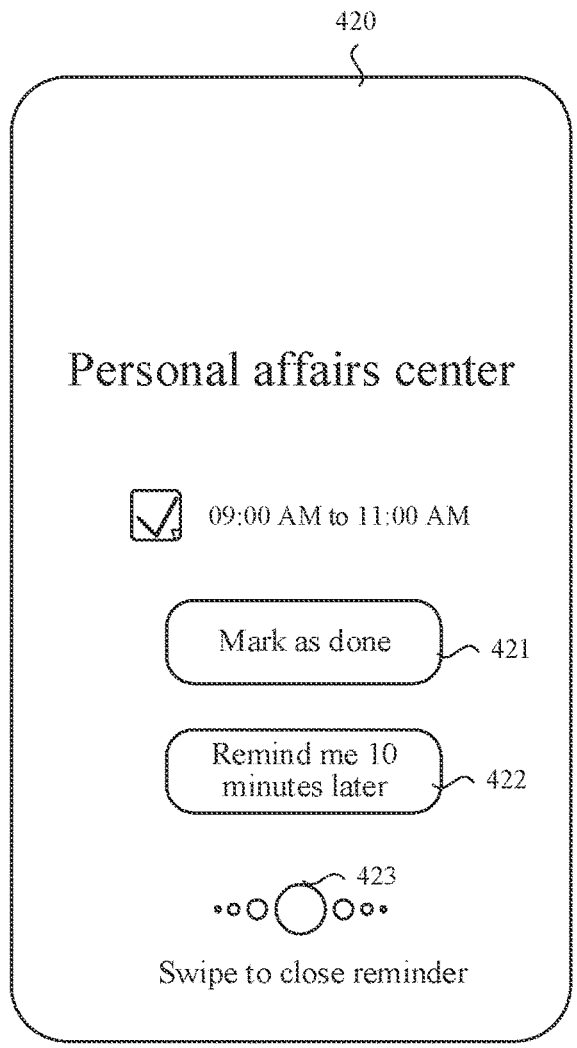

As shown in FIG. 4I, the schedule task 2 in the foregoing current-day schedule is used as a specified schedule. When the electronic device 100 detects that a difference between a current time and the schedule starting time 09:00 of the schedule task 2 is within a preset time threshold 1 (for example, 30 minutes), the electronic device 100 may display an alarm reminder in response, display an alarm reminder screen 420, and output audio data. The alarm reminder screen 420 may include content of the schedule task 2 and a control 421, a control 422, and a control 423 that correspond to the schedule task 2. The content of the schedule task 2 may include the name of the schedule task 2: "Personal affairs center"; and the schedule time of the schedule task 2: "09:00 AM to 11:00 AM". The control 421 may receive a touch operation (for example, tapping) acting on the control 421. Therefore, in response to the touch operation, the electronic device 100 may set a completion flag for the schedule task 2, cancel display of the user interface 420, and stop output of audio data. The control 422 may receive a touch operation (for example, tapping) acting on the control 422. Therefore, in response to the touch operation, the electronic device 100 may cancel display of the user interface 420, stop output of audio data, and set a flag for the schedule task 2, so that the electronic device 100 displays the user interface 420 and outputs audio data after 10 minutes. The control 423 may receive a touch operation (for example, dragging the control 423 from left to right or from right to left) acting on the control 423. Therefore, in response to the touch operation, the electronic device 100 may cancel display of the user interface 420 and stop output of audio data.

In a possible implementation, the electronic device 100 may obtain a link corresponding to a specified schedule task (for example, a link that corresponds to the control 332A related to the schedule task 1 in FIG. 3E and that may display a meeting screen). When the electronic device 100 detects that a difference between a current time and a schedule starting time of a specified schedule task is within a preset time threshold 1 (for example, within 30 minutes), the electronic device 100 may alternatively display, in response, an alarm reminder for the specified schedule task. In a process of displaying the alarm reminder in response, the electronic device 100 may display an alarm reminder screen, and generate a corresponding control on the alarm reminder screen based on the obtained link. The electronic device 100 may receive a touch operation (for example, tapping) acting on the corresponding control, and in response to the touch operation, display a user interface corresponding to the link (for example, the meeting screen 340 shown in FIG. 3E).

Figure 4J:
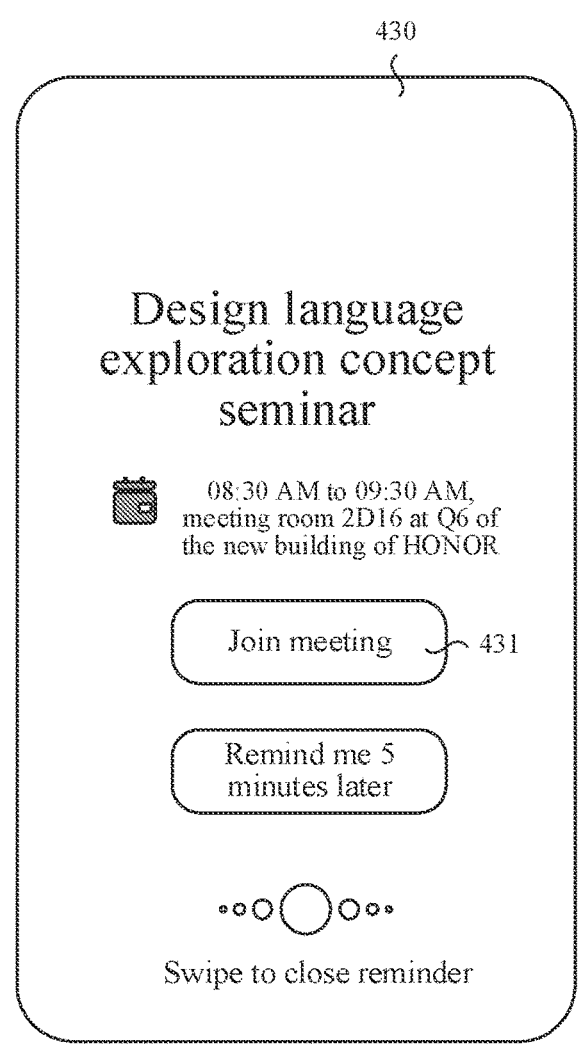

As shown in FIG. 4J, for example, the specified schedule task is the schedule task 1 in the current-day schedule: "Design language exploration concept seminar". When the electronic device 100 detects that a difference between a current time and the schedule starting time 08:30 AM of the schedule task 1 is within a preset time threshold 1 (for example, 30 minutes), the electronic device 100 may display an alarm reminder in response, display an alarm reminder screen 430, and output audio data. The alarm reminder screen 430 may display content of the schedule task 1 and a control 431 corresponding to the schedule task 1. The content of the schedule task 1 may include the name of the schedule task 1: "Design language exploration concept seminar"; the schedule time of the schedule task 1: "08:30 AM to 09:30 AM"; and the location of the schedule task 1: "Meeting room 2D16 at Q6 of the new building of HONOR". The control 431 may be a corresponding control generated by the electronic device 100 based on a meeting link of the specified schedule task. The control 431 may receive a touch operation (for example, tapping) acting on the control 431. Therefore, the electronic device 100 may obtain the meeting link in response to the touch operation. The electronic device 100 may display a meeting screen based on the meeting link, so that the user can join the meeting to deal with the specified schedule task. For descriptions of the meeting screen, refer to the descriptions in the embodiment shown in FIG. 3E. Details are not described herein again.

In a possible implementation, when the electronic device 100 detects that a difference between a current time and a schedule starting time of a specified schedule task is within a preset time threshold 1 (for example, within 30 minutes), the electronic device 100 may perform listening by using a preset interface (for example, a calendar Provider update interface) within preset duration (for example, 5 seconds) when running a second application or displaying the desktop, to obtain content of the specified schedule task (for example, one or more of a name of the specified schedule task, a schedule time of the specified schedule task, a location of the specified schedule task, or the like); and display a short-term prompt notification bar on a second application screen displayed when the second application is run and/or on the desktop. The short-term prompt notification bar may include content of prompt information of the specified schedule task and a control corresponding to the specified schedule task.

Optionally, the electronic device 100 may also determine, by using a preset interface (for example, the calendar Provider update interface), whether the schedule time of the specified schedule task overlaps a schedule time of another schedule task. If overlapping occurs, a conflict prompt is displayed in the short-term prompt notification bar.

Optionally, when the specified schedule task is changed, for example, when the electronic device 100 detects that a difference between a current time and a schedule starting time of another specified task is within the preset time threshold 1 (for example, within 30 minutes), the electronic device may perform listening by using a preset interface (for example, the calendar Provider update interface), and display, in the short-term prompt notification bar, content including prompt information of the another specified schedule task and a control corresponding to the specified schedule task.

Figure 4K:
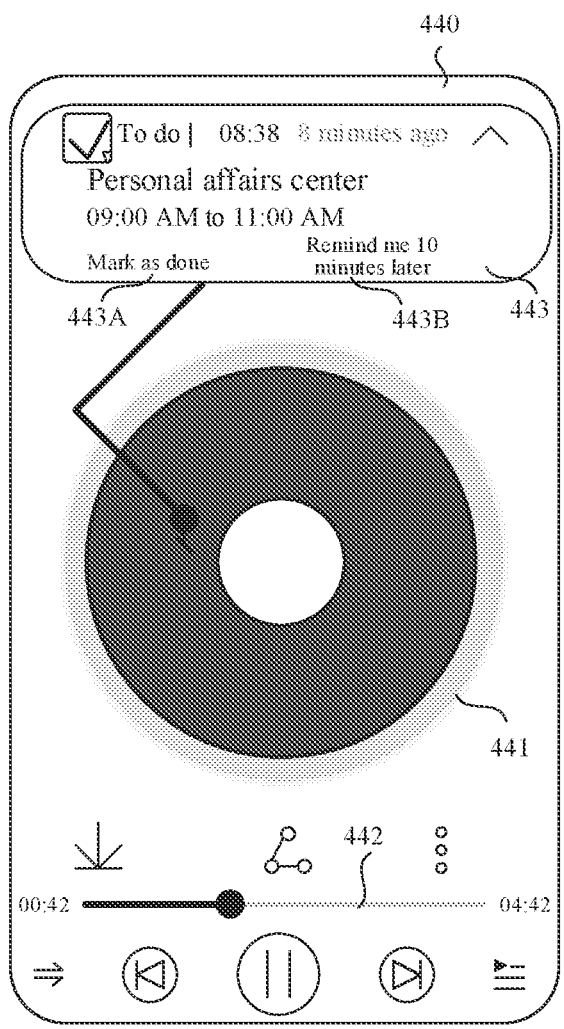

As shown in FIG. 4K, for example, the schedule task 2 in the foregoing current-day schedule is the specified schedule, the second application is a music application, and the preset duration is 5 seconds. When the electronic device 100 runs the music application, the electronic device 100 may display a music play screen 440. The music play screen 440 may display a music play image 441, a progress bar 442, one or more controls (for example, a music pause/play control, a control for playing next music, and a control for playing previous music), and a short-term prompt notification bar 443. The short-term prompt notification bar 443 may be displayed on the music play screen 440 for 5 seconds. The short-term prompt notification bar 443 may include content of the schedule task 2, a control 443A, and a control 443B. The content of the schedule task 2 may include the name of the schedule task 2: "Personal affairs center"; and the schedule time of the schedule task 2: "09:00 AM to 11:00 AM". For descriptions of the control 443A and the control 443B, refer to the descriptions of the control 421 and the control 422 shown in FIG. 4I. Details are not described herein again.

In a possible implementation, the electronic device 100 obtains a link corresponding to a specified schedule task (for example, a link that corresponds to the control 332A related to the schedule task 1 in FIG. 3E and that may display a meeting screen). When the electronic device 100 detects that a difference between a current time and a schedule starting time of a specified schedule task is within a preset time threshold 1 (for example, within 30 minutes), the electronic device 100 may display, within preset duration (for example, 5 seconds), a short-term prompt notification bar on a second application screen displayed when the second application is run and/or on the desktop. The short-term prompt notification bar may include content of prompt information of the specified schedule task and a control corresponding to the specified schedule task. In addition, the electronic device 100 may generate a corresponding control on the foregoing screen based on the obtained link. The electronic device 100 may receive a touch operation (for example, tapping) acting on the corresponding control, and in response to the touch operation, display a user interface corresponding to the link (for example, the meeting screen 340 shown in FIG. 3E).

Figure 4L:
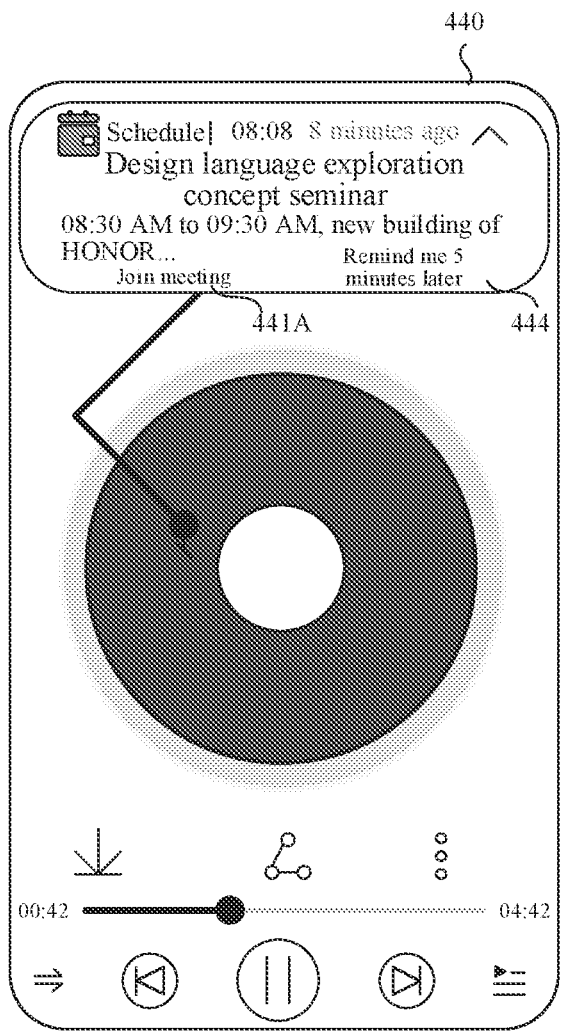

As shown in FIG. 4L, for example, the schedule task 1 in the foregoing current-day schedule is the specified schedule task, the second application is a music application, and the preset duration is 5 seconds. When the electronic device 100 runs the music application, the electronic device 100 may display a music play screen 440, and display a short-term prompt notification bar 444 on the music play screen 440. The short-term prompt notification bar 444 may be displayed on the music play screen 440 for 5 seconds. The short-term prompt notification bar 443 may include content of the schedule task 1 and a control 444A. The content of the schedule task 1 may include the name of the schedule task 1: "Design language exploration concept seminar"; the schedule time of the schedule task 1: "08:30 AM to 09:30 AM"; and the location of the schedule task 1: "Meeting room 2D16 at Q6 of the new building of HONOR". The control 444A may be a corresponding control generated by the electronic device 100 based on a meeting link of the specified schedule task. The control 444A may receive a touch operation (for example, tapping) acting on the control 444A. Therefore, the electronic device 100 may obtain the meeting link in response to the touch operation. The electronic device 100 may display a meeting screen based on the meeting link, so that the user can join the meeting to deal with the specified schedule task. For descriptions of the meeting screen, refer to the descriptions in the embodiment shown in FIG. 3E. Details are not described herein again.

In a possible implementation, if two or more schedule tasks delivered by one application (for example, the calendar application) need to be performed within a same time period and the two or more schedule tasks belong to a same type (for example, all belong to a to-do type), the electronic device 100 may display a single icon of the type (for example, a to-do icon) on the AOD screen. If two or more schedule tasks (for example, the schedule task 1, the schedule task 2, and the schedule task 3) delivered by one application need to be performed within a same time period and the two or more schedule tasks belong to different types (for example, the schedule task 1 belongs to a meeting type, the schedule task 2 belongs to a to-do type, and the schedule task 3 belongs to the meeting type), the electronic device 100 can simultaneously display prompt icons corresponding to different types of schedule tasks on the AOD screen, and only a single reminder icon of each type is displayed (for example, for the schedule task 1, the schedule task 2, and the schedule task 3, a single prompt icon of the to-do type and a single prompt icon of the meeting type are displayed on the AOD screen).

In a possible implementation, when the electronic device 100 detects that a difference between a current time and schedule starting times of two or more specified schedule tasks is within a preset time threshold 1 (for example, within 30 minutes), the electronic device 100 may display a specified schedule task card on the desktop. The specified schedule task card may randomly display content of one of the specified schedule tasks and specified schedule task quantity information. The content of the specified schedule task may include one or more of a name of the specified schedule task, a schedule time of the specified schedule task, remarks of the specified schedule task, a location of the specified schedule task, a control corresponding to the specified schedule, and the like.

Figure 4M:
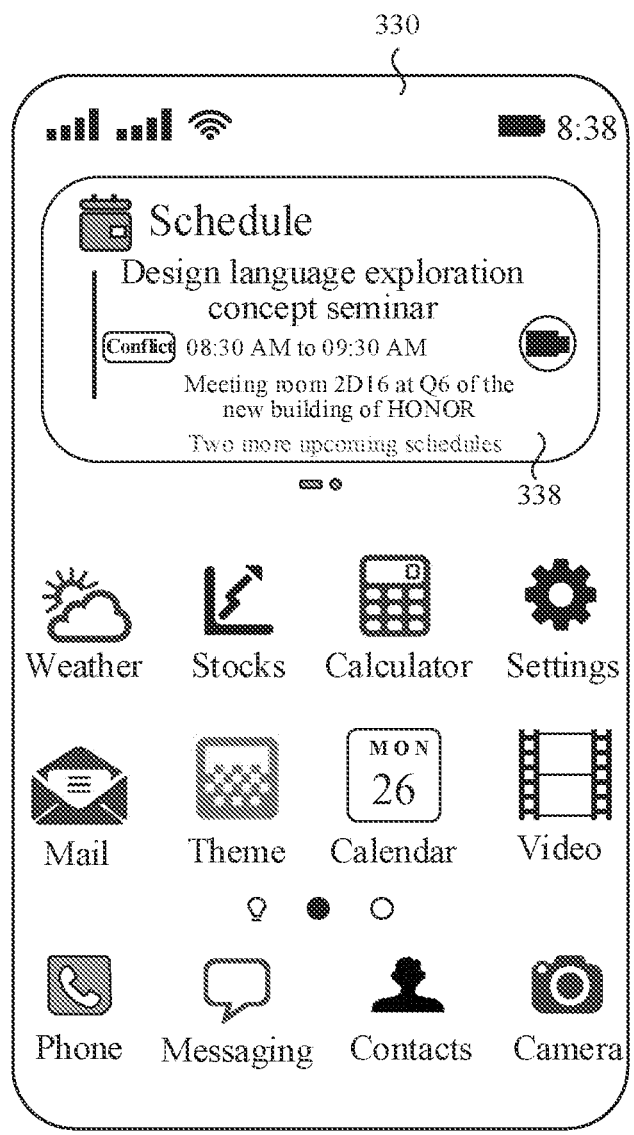

As shown in FIG. 4M, when the electronic device 100 detects that a difference between a current time and schedule starting times of three specified schedule tasks is within a preset time threshold 1 (for example, within 30 minutes), the electronic device 100 may display a specified schedule task card 338. The specified schedule task card 338 may randomly display content of one of the schedule tasks, for example, the schedule task 1, and specified schedule task quantity information: "Two more upcoming schedules". The content of the schedule task 1 may include the name of the schedule task 1: "Design language exploration concept seminar"; the schedule time of the schedule task 1: "08:30 AM to 09:30 AM"; the location of the schedule task 1: "Meeting room 2D16 at Q6 of the new building of HONOR"; and the like.

In a possible implementation, when the electronic device 100 displays a current-day schedule card on the desktop, the electronic device 100 detects that a difference between a current and a schedule starting time of a specified schedule task is within a preset time threshold range 1 (for example, 30 minutes), and the electronic device 100 may display a specified schedule task card over an area of the current-day schedule card.

Figure 4N:
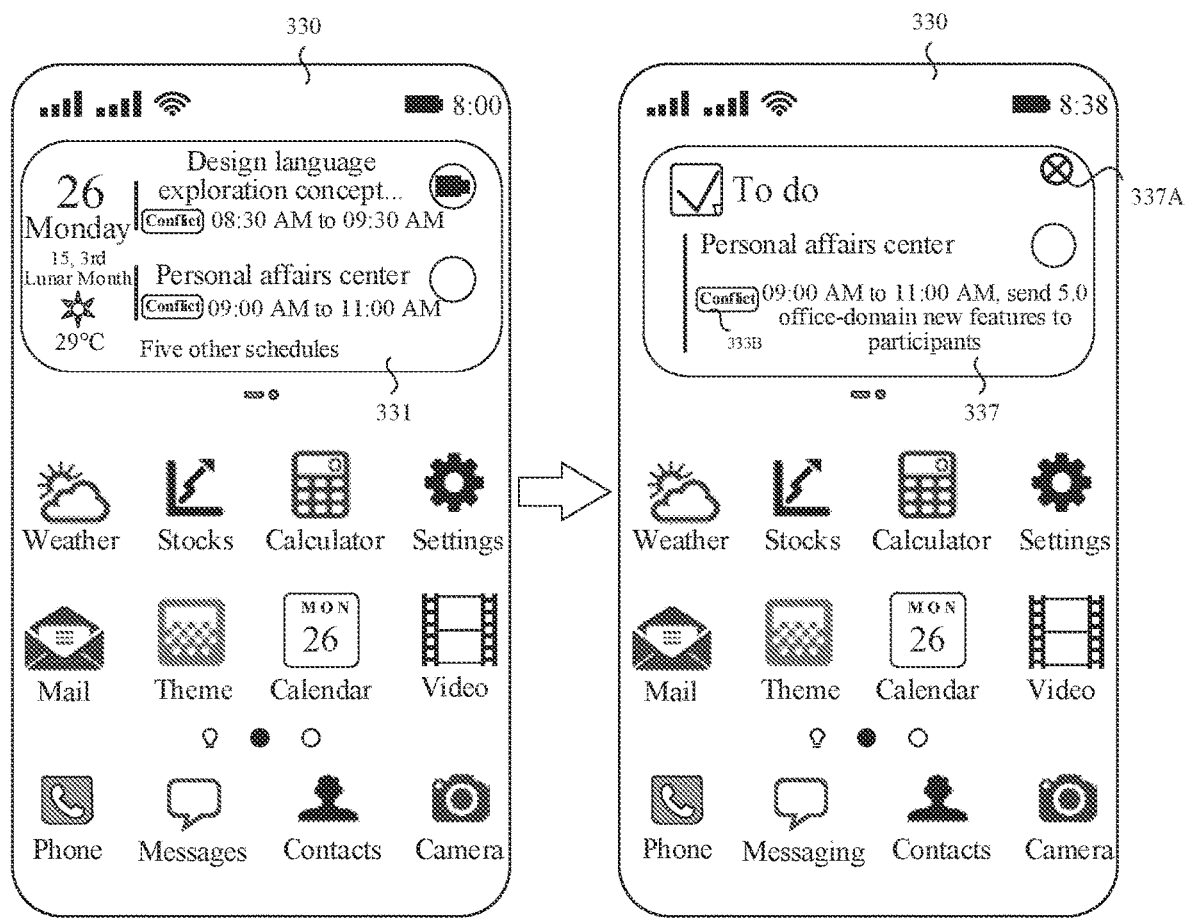

As shown in FIG. 4N, for example, the specified schedule task is the schedule task 2. When the electronic device 100 displays the current-day schedule card 331 on the desktop, the electronic device 100 detects that a difference between a current time and a schedule starting time of the specified schedule task is within a preset time threshold range 1 (for example, 30 minutes), and the electronic device 100 may display the specified schedule task card 337 over an area of the current-day schedule card 331. For example, there are originally three schedule cards in a card location on the main desktop screen (the first schedule card is shown in a figure on the left of FIG. 4N, and two schedule cards are covered by the first schedule card and therefore are not shown in the figure). When the preset time threshold range is reached, a card is automatically added, covering the first schedule card shown in the figure on the left of FIG. 4N, a card shown in a figure on the right of FIG. 4N is automatically displayed, and there are four schedule cards in the card location on the main desktop screen (one schedule card is shown in the figure on the right of FIG. 4N, three schedule cards are covered by the first schedule card and therefore are not shown in the figure, and the user may turn pages through operations such as swiping or tapping to view the four schedule cards in sequence). Optionally, when a preset time is reached, the first schedule card shown in the figure on the right of FIG. 4N automatically disappears, and there are still three schedule cards in the card location on the main desktop screen. For descriptions of the current-day schedule card 331, refer to the descriptions of the embodiment shown in FIG. 3D. For descriptions of the specified schedule task card 337, refer to the descriptions in the embodiment shown in FIG. 4D. Details are not described herein again.

Optionally, a close control, for example, a control 337A shown in FIG. 4N, may be displayed in the specified schedule task card. When the electronic device 100 receives and responds to a touch operation (for example, tapping) acting on the close control, the electronic device 100 may no longer display the specified schedule task card (for example, the specified schedule task card 337), but display the current-day schedule card (for example, the current-day schedule card 331) again.

In a possible implementation, when the electronic device 100 detects that a difference between a current time and a schedule starting time of a specified scheduled task is within a preset time threshold range 1 (for example, 30 minutes), the electronic device 100 may alternatively display a prompt icon for a current-day schedule (for example, the current-day schedule icon 303 shown in FIG. 3A) on the AOD screen, but not distinguish between types of schedule tasks to display prompt icons corresponding to different types.

In some embodiments, the first application may be a travel application, for example, a flight application or an application that provides subway schedule information. The electronic device 100 may obtain notification information delivered by the travel application. The notification information includes user schedule information. The electronic device 100 may output a travel notification prompt under a preset time condition and/or a preset geographic location condition. The electronic device 100 may output different types of prompt notifications based on different screens currently displayed on the electronic device 100. In addition, the electronic device 100 may output, based on different screens currently displayed, notification prompts including user schedule information with different levels of details. For example, when the electronic device 100 displays the AOD screen, the electronic device 100 may display, on the AOD screen, a prompt icon for indicating a user schedule. When the electronic device 100 displays the lock screen, the electronic device 100 may display a part of schedule task information (which may also be referred to as first content) in a notification bar of the lock screen. When the electronic device 100 displays the desktop, the electronic device 100 may display, on the desktop, a card prompt with more user schedule information (which may also be referred to as second content) than that in the notification bar of the lock screen.

For example, the flight application is the first application. In a process in which the user travels by flight, the electronic device 100 may output a prompt notification for an electronic boarding pass.

The electronic device 100 may receive notification information that is delivered by the first application and that includes notification information for information about a flight that the user is to take. When the electronic device 100 detects that a current geographic location is within a range of an airport and the AOD screen is currently displayed on the electronic device 100, the electronic device 100 may display a flight icon (which may also be referred to as an icon of the first application) on the AOD screen.

Figures 5A, 5B:
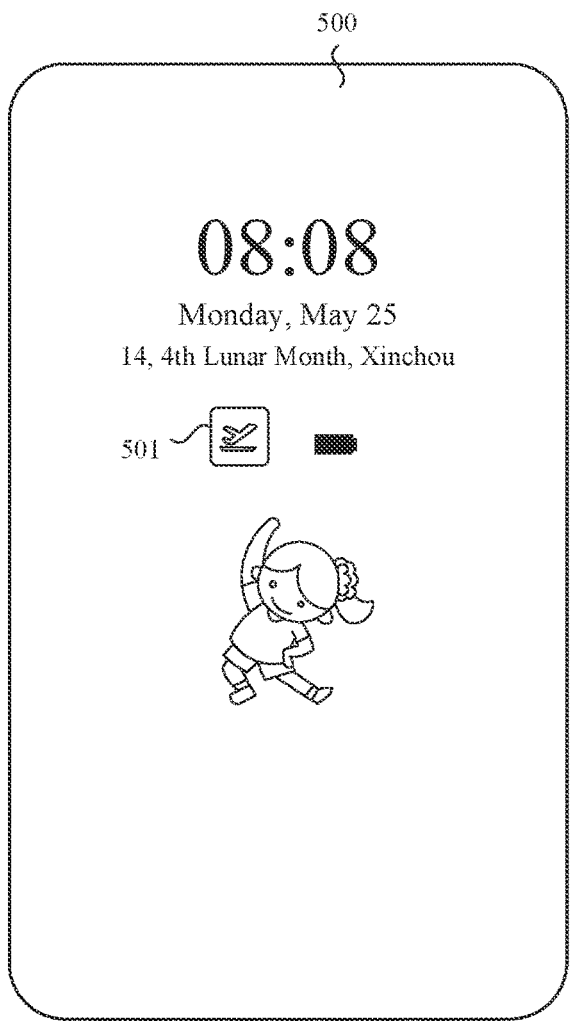
FIG. 5A to FIG. 5R are schematic diagrams of a group of user interfaces according to an embodiment of this application.

As shown in FIG. 5A, the electronic device 100 may display an AOD screen 400. The AOD screen 500 may display a flight icon 501 and the like. The flight icon 501 may be used to notify the user that there is a flight task to be dealt with. For descriptions of other screen elements displayed on the AOD screen 500, refer to the descriptions in the embodiment shown in FIG. 3A. Details are not described herein again.

When the electronic device 100 receives and responds to input of turning on the screen (which may also be referred to as a first operation), the electronic device 100 may display the lock screen. The electronic device 100 may display a notification bar on the lock screen. The notification bar may include flight schedule information and an option for obtaining an electronic boarding pass. The flight schedule information displayed in the notification bar may include one or more of a flight number, a flight departure time, airline information, and the like.

As shown in FIG. 5B, the electronic device 100 may display a lock screen 510. The lock screen 510 may include a status bar, a calendar indicator, a notification bar 511, and a lock screen icon. For descriptions of the status bar, the calendar indicator, and the lock screen icon, refer to the descriptions in the embodiment shown in FIG. 3B. Details are not described herein again. The notification bar 511 may include flight schedule information and an option 511A for obtaining an electronic boarding pass. The flight schedule information may include airline information: "China Eastern Airlines"; a flight number; and flight departure time information. "Flight MU3216 is to take off at 12:50". The option 511A may receive a touch operation (for example, tapping) performed by the user on the option 511A, so that the electronic device 100 displays a user interface including electronic boarding pass information in response to the touch operation. The electronic boarding pass information may include flight schedule information and a two-dimensional code of an electronic boarding pass. The user interface including the electronic boarding pass information is described in detail in subsequent embodiments. Details are not described herein.

When the electronic device 100 receives and responds to user input (which may also be referred to as a second operation, for example, input of swiping from bottom to top on the lock screen), the electronic device 100 may display an unlock screen. When the electronic device 100 displays the unlock screen, the electronic device 100 may verify an identity of the user in a biometric authentication manner. The biometric authentication manner may include one or more of password verification, face verification, fingerprint verification, iris verification, voiceprint verification, and the like.

The unlock screen may be the unlock screen 320 shown in FIG. 3C. For descriptions of the unlock screen 320, refer to the descriptions in the embodiment shown in FIG. 3C. Details are not described herein again.

When the electronic device 100 receives and responds to unlock input based on the unlock screen, the electronic device 100 may display the desktop. When the electronic device 100 displays the desktop, if a current geographic location is within a geographic area of an airport, the electronic device 100 may display a flight card (which may also be referred to as a first card) on the desktop. The flight card may display flight schedule information and an option corresponding to an electronic boarding pass. The flight schedule information may include one or more of a flight departure place, a flight destination, a flight departure time, a flight landing time, and the like.

Figure 5C:
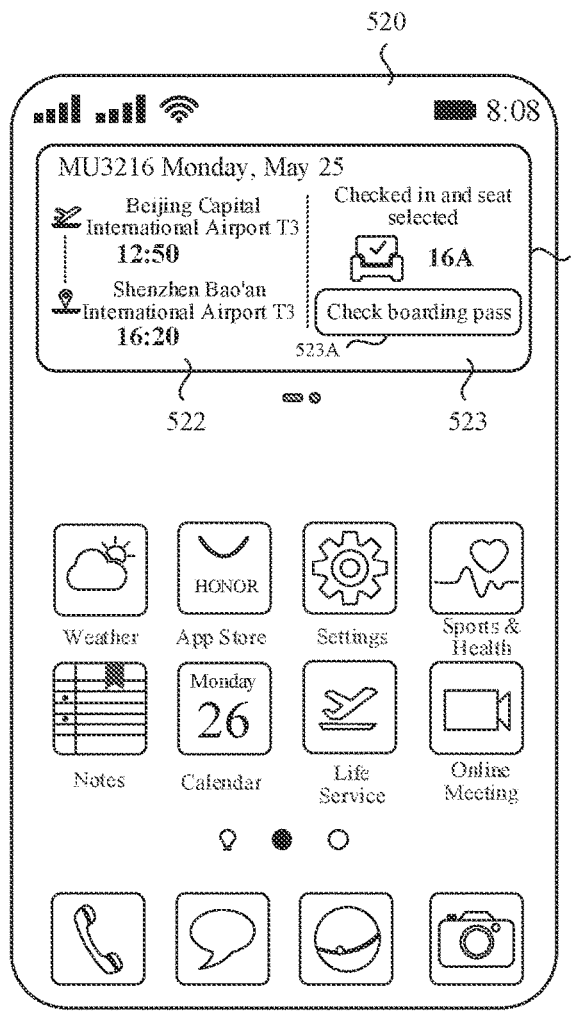

As shown in FIG. 5C, the electronic device 100 may display a desktop 520. The desktop 520 may display a flight card 521. The flight card 521 may display a left area 522 and a right area 523. The left area 522 may include flight schedule information, for example, a flight departure place: "Beijing Capital International Airport T3"; a flight departure time: "12:50"; a flight destination: "Shenzhen Bao'an International Airport T3"; and a flight arrival time: "16:20". The right area may display an option 523A and prompt information: "Checked in and seat selected". The option 523A may be used for receiving a touch operation (for example, tapping) performed by the user on the option 523A, so that the electronic device 100 can display a user interface including electronic boarding pass information in response to the touch operation. Information recorded in an electronic boarding pass includes a flight number, a date, a departure place, a destination, a cabin, a seat number, a boarding gate, and the like. The user interface including the electronic boarding pass is described in detail in subsequent embodiments. Details are not described herein.

Optionally, the right area 523 may further display a seat number selected by the user, for example, "16A", so that the user can conveniently and quickly obtain the seat number.

With reference to the examples of FIG. 5A to FIG. 5C, it can be learned that the electronic device 100 may display, on different display screens, notification prompts with different levels of details for flight schedule information. For example, when the electronic device 100 displays the AOD screen, the electronic device 100 may display, on the AOD screen, a prompt icon for indicating a flight schedule. When the electronic device 100 displays the lock screen, the electronic device 100 may display a part of flight schedule information in a notification bar of the lock screen. When the electronic device 100 displays the desktop, the electronic device 100 may display, on the desktop, a flight card with more flight schedule information than that in the notification bar of the lock screen.

The electronic device 100 displays, on the desktop, a flight card including an option corresponding to an electronic boarding pass. The electronic device 100 may receive, based on the flight card, a touch operation (which may also be referred to as a third operation, for example, tapping) performed by the user on the option corresponding to the electronic boarding pass. In response to the touch operation, the electronic device 100 may display a user interface including electronic boarding pass information (which may also be referred to as third content). The electronic boarding pass information may include one or more of a flight number, a flight departure place, a flight destination, a flight departure time, a flight landing time, a check-in counter, a boarding gate, a seat number, a two-dimensional code of the electronic boarding pass, and the like.

Figure 5D:
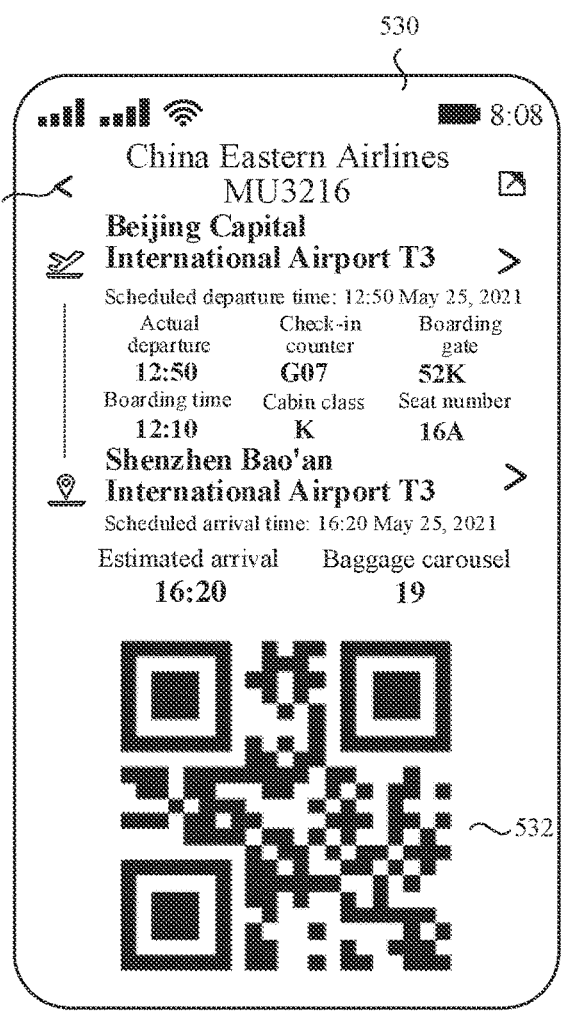

As shown in FIG. 5C and FIG. 5D, the electronic device 100 receives a touch operation (for example, tapping) performed by the user on the option 523A corresponding to the electronic boarding pass, and may display a user interface 530 in response to the touch operation. The user interface 530 may include a back control 531 and electronic boarding pass information. The back control 531 may receive input (for example, tapping) acting on the back control 531, so that the electronic device 100 can display an upper-level screen (for example, the desktop 520) in response to the input. The electronic boarding pass information may include a flight number: "China Eastern Airlines MU3216"; a departure place: "Beijing Capital International Airport T3": a destination: "Shenzhen Bao'an International Airport T3"; an actual departure time: "12:50"; a boarding time: "12:10": a check-in counter: "G07"; a cabin class: "K": a seat number: "16A"; a boarding gate: "52K"; an estimated arrival time: "16:20": a baggage carousel: "19"; a two-dimensional code of an electronic boarding pass: 532; and other information.

In a possible implementation, the electronic device 100 may receive an operation of expanding the notification bar on the lock screen. In response to the operation, the electronic device 100 may display the notification bar in an expanded manner. A size of the notification bar may be greater than a size of the notification bar that is not displayed in an expanded manner. The notification bar may include flight schedule information, for example, one or more of a flight departure place, a flight destination, a flight departure time, a flight arrival time, a boarding time, a flight number, and the like.

Figures 5E, 5F:
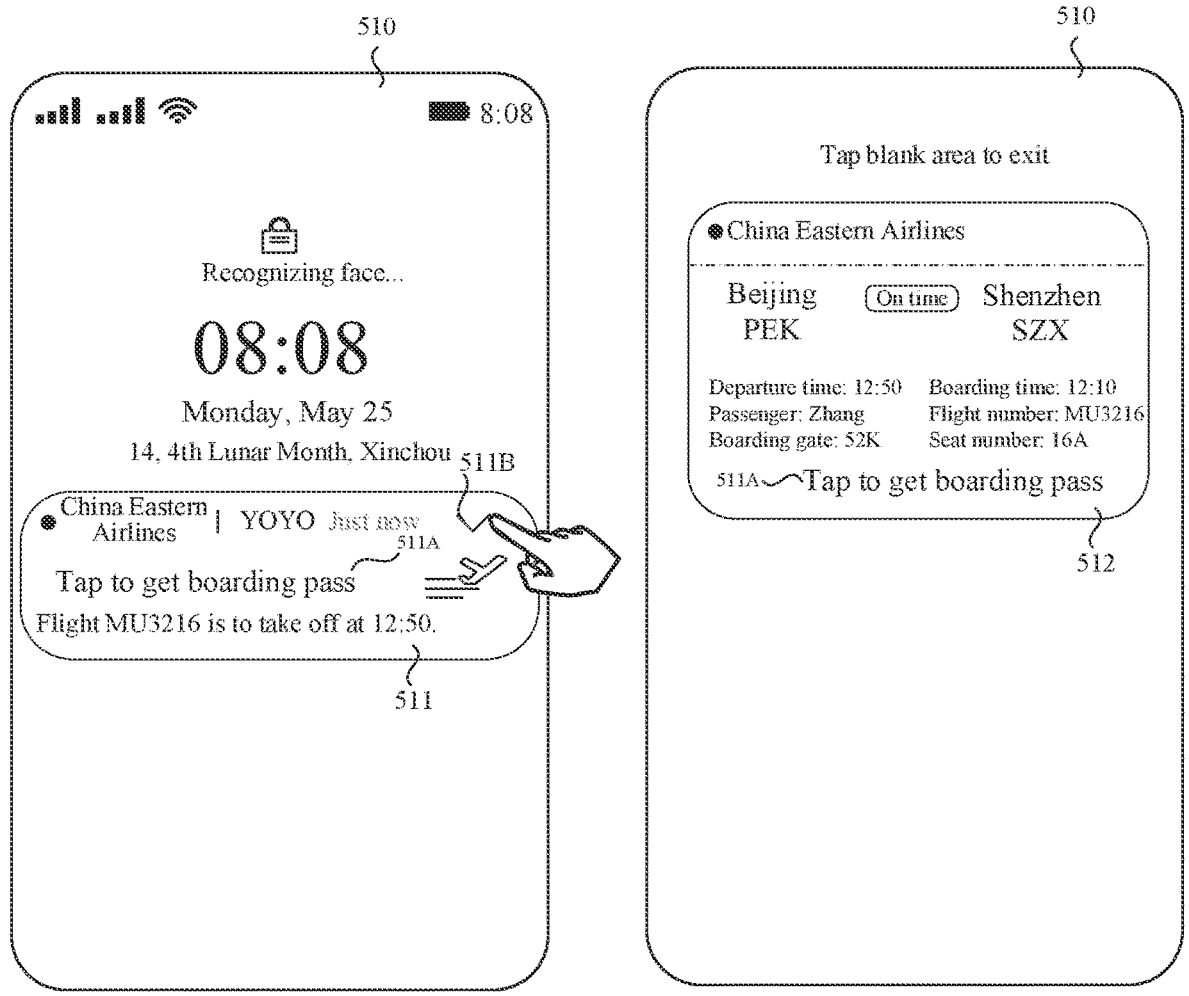

As shown in FIG. 5E and FIG. 5F, the electronic device 100 may receive, based on the lock screen 510, a touch operation (for example, tapping) of expanding a control 511B. In response to the touch operation, the electronic device 100 may display, on the lock screen 510, a notification bar 512 and the option 511A corresponding to the electronic boarding pass. For descriptions of the electronic boarding pass 511A, refer to the descriptions in the embodiment shown in FIG. 5B. Details are not described herein again. A display size of the notification bar 512 may be greater than that of the notification bar 511. The notification bar 512 may display flight schedule information. The flight schedule information may include a flight departure place: "Beijing"; a flight destination: "Shenzhen"; a flight departure time: "12:50"; a flight boarding time: "12:10"; a passenger name: "Zhang"; a flight number: "MU3216": a seat number: "16A"; a boarding gate: "52K": a current flight status: "on time"; and other information.

In a possible implementation, when the electronic device 100 displays the option corresponding to the electronic boarding pass in the notification bar of the lock screen, the electronic device 100 may receive a touch operation (for example, tapping) performed by the user on the option corresponding to the electronic boarding pass. In response to the touch operation, the electronic device 100 may display flight schedule information and a two-dimensional code of the electronic boarding pass on the lock screen. The flight schedule information may include one or more of a flight departure place, a flight destination, a flight departure time, a flight arrival time, a passenger name, a flight number, and the like.

Figure 5G:
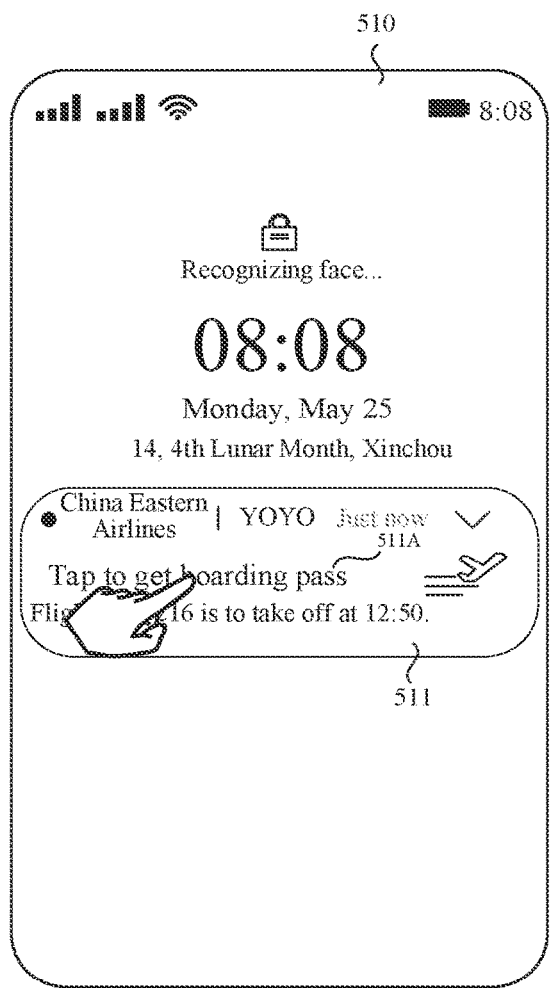
Figure 5H:

As shown in FIG. 5G and FIG. 5H, the electronic device 100 may display the option 511A corresponding to the electronic boarding pass in the notification bar 511 of the lock screen 510. The electronic device 100 may receive a touch operation (for example, tapping) performed by the user on the option 511A. In response to the touch operation, the electronic device 100 may display a window 513 on the lock screen 510. The window 513 may display flight schedule information and a two-dimensional code 513A of an electronic boarding pass. The flight schedule information may include a flight number: "China Eastern Airlines MU3216"; a departure place: "Beijing Capital International Airport T3"; a destination: "Shenzhen Bao'an International Airport T3"; a passenger name: "Zhang"; an actual boarding time: "12:10"; a check-in counter: "G07"; a cabin class: "K"; a seat number: "16A"; a boarding gate: "52K"; a check-in counter: "G07": a two-dimensional code of an electronic boarding pass; and other information.

Optionally, the lock screen 510 may further include a control 514 and a control 513B. The control 514 may be used for receiving a touch operation (for example, tapping) performed by the user on the control 514, so that the electronic device 100 closes display of the window 513 in response to the touch operation. The control 513B may be used for receiving a touch operation (for example, tapping) performed by the user on the control 513B, so that the electronic device 100 archives the electronic boarding pass to a wallet application in response to the touch operation. Therefore, the user may open and display, in the wallet application, the information shown in the window 513.

In a possible implementation, the electronic device 100 may receive a double-tap operation acting on the notification bar area of the lock screen, and the electronic device 100 may display an unlock screen in response to the double-tap operation. After the electronic device 100 verifies an identity of the user based on the unlock screen, the electronic device 100 may display a user interface including electronic boarding pass information (for example, the user interface 530 shown in the embodiment of FIG. 5D).

In a possible implementation, when the electronic device 100 detects that a difference between a current time and a boarding time is within a preset time threshold 3 (for example, within 10 minutes), the electronic device 100 may display, in response, a strong reminder notification about the electronic boarding pass on the AOD screen, the lock screen, or the desktop. For example, one or more of the following is performed: The electronic device 100 displays a prompt icon on the AOD screen in a flashing manner; the electronic device 100 displays a notification bar with a preset size on the lock screen; the electronic device 100 displays a flight card including flight schedule information and an option corresponding to an electronic boarding pass: the electronic device 100 performs a vibration reminder; or the like.

Figure 5I:

As shown in FIG. 5I, when the electronic device 100 detects that a difference between a current time and a boarding time is within a preset time threshold 3 (for example, within 10 minutes), to be specific, when the boarding time is 12:10 AM and the electronic device 100 detects that the current time is 12:00, the electronic device 100 may display a notification bar 514 with a preset size. A display size of the notification bar 514 may be greater than that of the notification bar 511 in the embodiment shown in FIG. 5B. The notification bar 514 may include flight schedule information and an option 511A corresponding to an electronic boarding pass. The light schedule information may include a flight number and a flight departure time: "Flight MU3216 is to take off at 12:50"; a flight boarding time: "12:10"; a seat: "16A"; a flight departure time: "12:50"; a flight destination: "Shenzhen"; a boarding gate: "52K"; and the like.

In a possible implementation, the flight schedule information may be displayed in a fixed area of a drop-down screen within a preset time period (for example, before the flight takes off). When the electronic device 100 detects that a current time is beyond a preset time period (for example, later than a flight departure time), and/or the electronic device 100 receives and responds to input for the flight schedule information, the flight schedule information may no longer be displayed in the fixed area of the drop-down screen.

As shown in FIG. 5J and FIG. 5K, when the electronic device 100 detects an operation of a swipe-down gesture performed by the user on the desktop 520, the electronic device 100 may display a drop-down screen 540 in response to the swipe-down gesture. The drop-down screen 540 may include a notification window 541 and a control 542. The notification window 541 may be displayed in a notification center area of the drop-down screen 540 before a flight takes off. The notification window 541 may include flight schedule information, for example, a flight number and a flight departure time: "Flight MU3216 is to take off at 12:50". The control 542 may receive a touch operation (for example, tapping) performed by the user on the control 542, so that the electronic device 100 clears all notifications on the drop-down screen in response to the touch operation.

In a possible implementation, the electronic device 100 may further display a floating window on the desktop and/or w % ben running the second application and displaying a user interface of the second application. The floating window may include prompt information and a control for displaying electronic boarding pass information. For example, the second application is an immersive application, and the immersive application may be an application that provides video play and runs a game. When the electronic device 100 runs an immersive application, the electronic device 100 may display a floating window on a user interface of the application. The immersive application may include a video application (for example, TikTok® or Honor Video®) and a game application (for example, Honor of Kings® or Subway Surfers®).

Figure 5L:
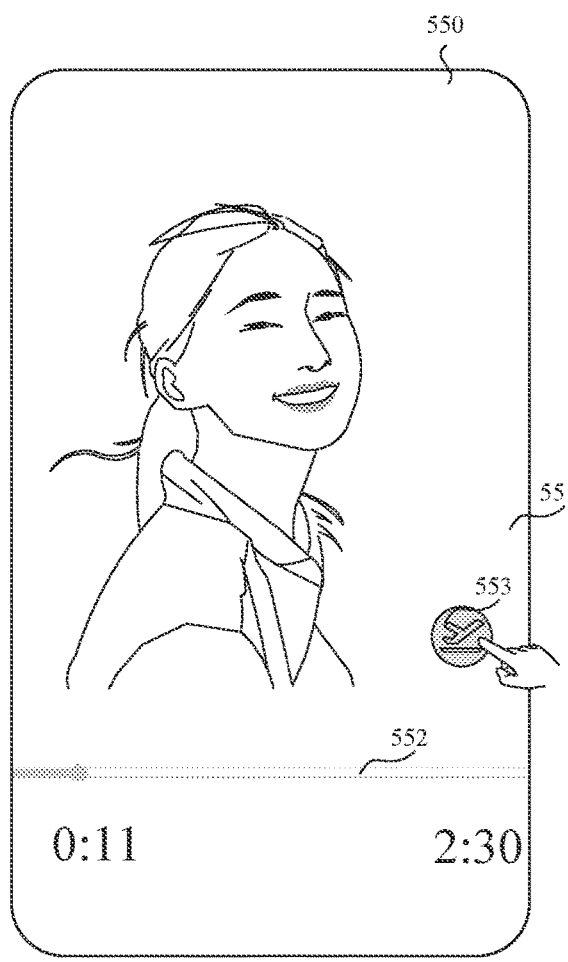
Figure 5M:
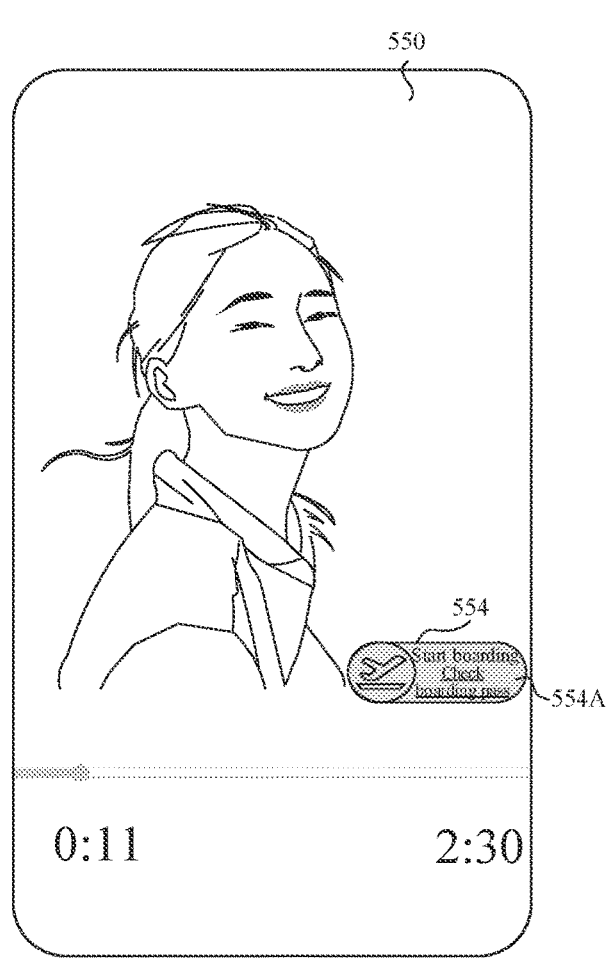

As shown in FIG. 5L and FIG. 5M, when the electronic device 100 runs a video application, the electronic device 100 may display a video play screen 550. The video play screen 550 may include a video image 551, a progress bar 552, and a floating ball 553. The floating ball 553 may be used for notifying the user that there is a flight item to be dealt with. The floating ball may receive input acting on the floating ball, so that the electronic device 100 displays a floating window in response to the input. When the electronic device 100 detects a touch operation (for example, tapping) performed by the user on the floating ball 553, the electronic device 100 may display a floating window 554 in response to the touch operation. The floating window 554 may include a control 554A and boarding prompt information: "Start boarding". When the electronic device 100 detects a touch operation (for example, tapping) acting on the control 554A, the electronic device 100 may display a user interface including electronic boarding pass information (for example, the user interface 530 shown in the embodiment of FIG. 5D). Optionally, the floating window displays more information than that in the floating ball. Both the floating window and the floating ball are display windows located at a top layer of screen display layers. A display priority of the floating window is higher than those of others application, and a display priority of the floating ball is lower only than that of the floating window; or a display priority of the floating ball is higher than those of other applications, and a display priority of the floating window is lower only than that of the floating ball; or the floating window and the floating ball cannot be displayed at a same location on the screen.

In some embodiments, in addition to an electronic boarding pass reminder notification, the electronic device 100 may further display reminder notifications in scenarios such as ticketing feedback, check-in and seat selection, departure reminding, baggage claim, and flight changing based on different screen types.

Ticketing feedback means that the electronic device 100 may obtain a travel plan of a user after the user buys a ticket. The travel plan may include a flight number, a date, a departure place, a destination, a time, and the like. The electronic device 100 may push a reminder notification to the user on the lock screen, in a flight card on the desktop, at an archival location, or the like based on the travel plan. The archival location is a user interface on the electronic device 100 on which one or more cards (for example, a flight card, a schedule card, and a weather card) may be displayed.

Check-in and seat selection means that when check-in is allowed, the electronic device 100 may receive input of selecting a flight seat by the user, and obtain information about the flight seat selected by the user. The electronic device 100 may push a reminder notification to the user on the lock screen, in a flight card on the desktop, at an archival location, or the like based on the flight seat information.

Departure reminding means that when the electronic device 100 detects that a difference between a current time and a flight departure time is within a preset threshold range 4 (for example, 3 hours) and detects that a current location of the electronic device 100 and a geographic location of an airport area are within a preset threshold range 5 (for example, 1 km or above), the electronic device 100 may push a reminder notification about leaving for the airport as soon as possible to the user on the lock screen, in a flight card on the desktop, at an archival location, or the like.

Baggage claim means that when the electronic device 100 detects that the user has arrived at a destination of a flight, the electronic device 100 may obtain a baggage claim location corresponding to the flight. The electronic device 100 may push a baggage claim notification to the user on the lock screen, in a flight card on the desktop, at an archival location, or the like based on the baggage claim location.

Flight changing means that when the electronic device 100 detects that a flight schedule has changed (for example, a departure time is delayed, or a flight is canceled), the electronic device 100 may obtain data information of the flight schedule change, and push a baggage claim notification to the user on the lock screen, in a flight card on the desktop, at an archival location, or the like based on the flight schedule change information.

For example, with reference to FIG. 5N to FIG. 5Q, a process of pushing a reminder notification by the electronic device 100 based on different display screen types in a flight travel scenario is described by using a departure reminding scenario as an example.

The electronic device 100 may receive travel notification information of the first application. When the electronic device 100 detects that a difference between a current time and a flight boarding time is within a preset time threshold 4 (for example, 2 hours) and detects that a distance between a current geographic location and a geographic location of an airport is within a preset geographic threshold (for example, 1 km or above), and a screen displayed on the electronic device 100 is the lock screen, the electronic device 100 may display a notification bar on the lock screen. The notification bar may include departure prompt information, for example, one or more of a time difference between the current time and the flight boarding time, a departure reminder, or the like.

Figure 5N:
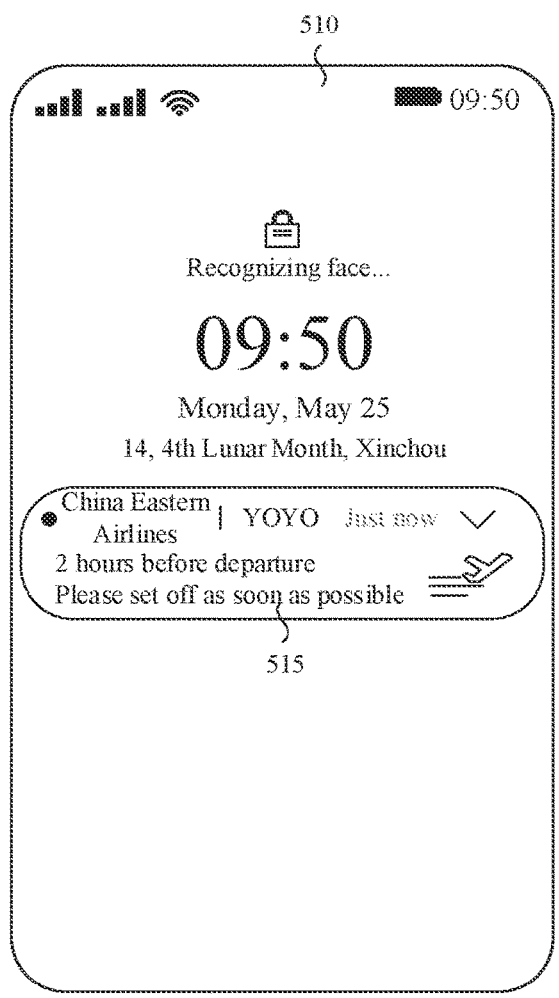

As shown in FIG. 5N, the electronic device 100 displays the lock screen 510. When the electronic device 100 detects that a current time 10:50 and a flight boarding time 12:50 are within a preset time threshold 4 (for example, 2 hours) and detects that a distance between a current geographic location and a geographic location of an airport is within a preset geographic threshold (for example, 1 km or above), the electronic device 100 may display a notification bar 515 on the lock screen 510. The notification bar 515 may include: a time difference between the current time and the flight boarding time: "3 hours before departure", and text information of a departure reminder: "Please set off as soon as possible".

When the electronic device 100 receives and responds to user input (which may also be referred to as a second operation, for example, input of swiping from bottom to top on the lock screen), the electronic device 100 may display an unlock screen. When the electronic device 100 displays the unlock screen, the electronic device 100 may verify an identity of the user in a biometric authentication manner. The biometric authentication manner may include one or more of password verification, face verification, fingerprint verification, iris verification, voiceprint verification, and the like.

The unlock screen may be the unlock screen 320 shown in FIG. 3C. For descriptions of the unlock screen 320, refer to the descriptions in the embodiment shown in FIG. 3C. Details are not described herein again.

When the electronic device 100 receives and responds to unlock input based on the unlock screen, the electronic device 100 may display the desktop. When the electronic device 100 displays the desktop, if a difference between a current time and a flight boarding time is within a preset time threshold 4 (for example, 2 hours) and a distance between a current geographic location and a geographic location of an airport is within a preset geographic threshold (for example, 1 km or above), the electronic device 100 may display a flight card on the desktop. The flight card may display flight schedule information and departure prompt information. The flight schedule information may include one or more of a flight departure place, a flight destination, a flight departure time, a flight landing time, or the like. The departure prompt information may include one or more of a time difference between the current time and the flight boarding time, a departure reminder, or the like.

Figure 5O:
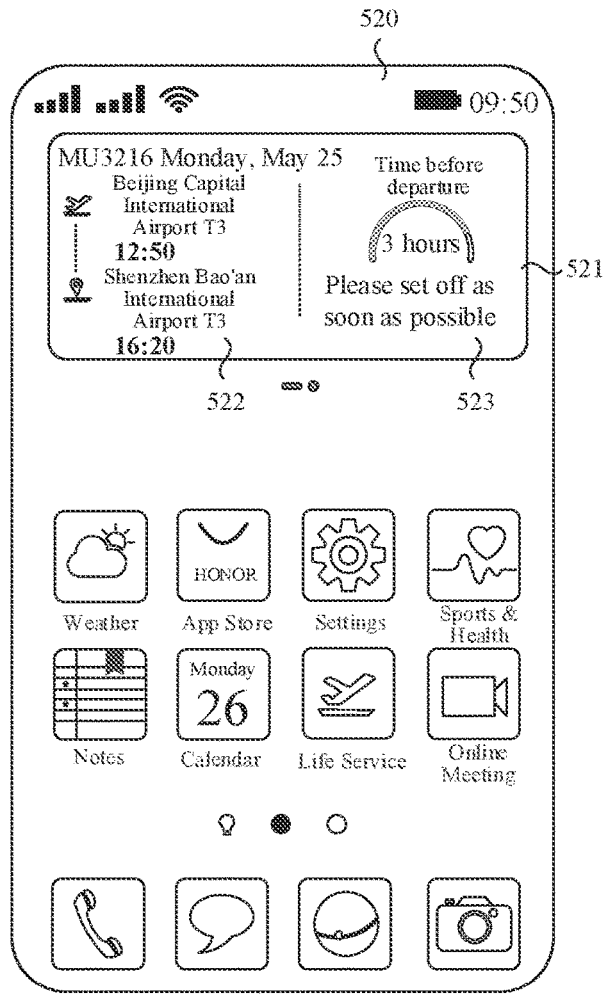

As shown in FIG. 5O, the electronic device 100 may display a desktop 520, and the desktop 520 may include a flight card 521. The flight card 521 may display a left area 522 and a right area 523. The left area 522 may include flight schedule information. For descriptions of this part, refer to the related descriptions in the embodiment shown in FIG. 5C. Details are not described herein again. The right area 523 may display departure reminder information, for example, a time difference between a current time and a flight boarding time: "3 hours before departure"; and text information of a departure reminder: "Please set off as soon as possible".

In a possible implementation, if a difference between a current time and a flight boarding time is within a preset time threshold 4 (for example, 2 hours) and a distance between a current geographic location and a geographic location of an airport is within a preset geographic threshold (for example, 1 km or above), the electronic device 100 may display, within preset duration (for example, 5 seconds), a short-term prompt notification bar on a second application screen displayed when the second application is run and/or on the desktop. The short-term prompt notification bar may include departure prompt information, for example, one or more of a time difference between the current time and the flight boarding time, a departure reminder, or the like.

Figure 5P:
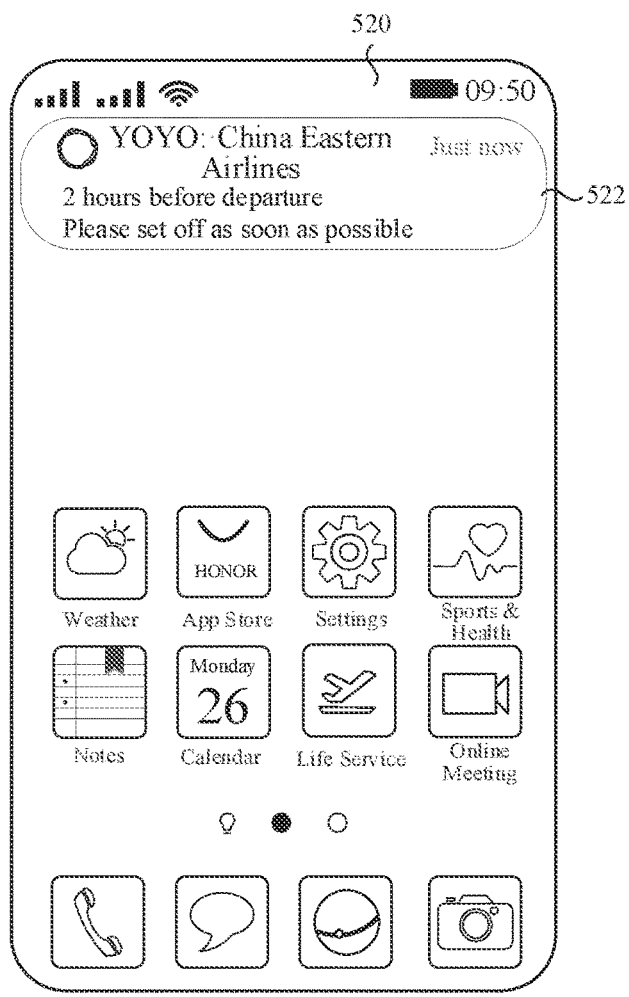

As shown in FIG. 5P, the electronic device 100 may display a short-term prompt notification bar 522 on the desktop 520 within preset duration (for example, 5 seconds). The short-term prompt notification bar 522 may include departure prompt information, for example, a time difference between the current time and the flight boarding time: "3 hours before departure", and a departure reminder: "Please set off as soon as possible".

In a possible implementation, when the electronic device 100 detects that a difference between a current time and a flight departure time is within a preset time threshold 4 (for example, within 2 hours) and a distance between a current geographic location and a geographic location of an airport is within a preset geographic threshold (for example, 1 km or above), the electronic device 100 may display, in response, a strong reminder notification about a departure prompt on the lock screen, on the desktop, or in a floating window of an immersive application screen. For example, one or more of the following is performed: The electronic device 100 displays a flight card including flight schedule information and an option corresponding to an electronic boarding pass; the electronic device 100 performs a vibration reminder; or the like.

Figure 5Q:
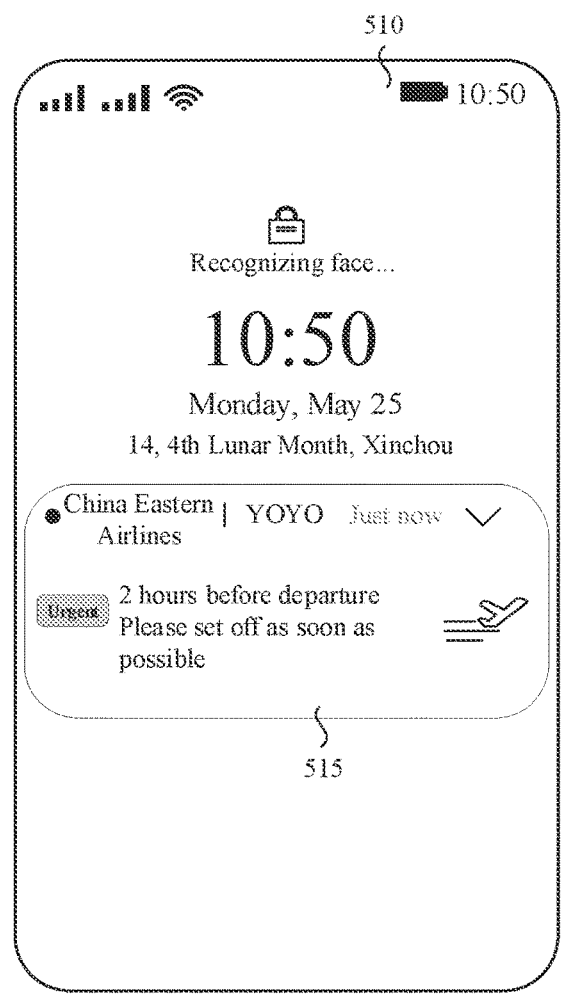

As shown in FIG. 5Q, when the electronic device 100 detects that a difference between a current time and a flight departure time is within a preset time threshold 4 (for example, within 2 hours) and a distance between a current geographic location and a geographic location of an airport is within a preset geographic threshold (for example, 1 km or above), the electronic device 100 may display a notification bar 515 with a preset size on the lock screen 510. A display size of the notification bar 515 may be greater than that of the notification bar 511 in the embodiment shown in FIG. 5N. The notification bar 515 may include departure prompt information, for example, a time difference between the current time and the flight boarding time: "2 hours before departure": and a departure reminder: "Please set off as soon as possible".

Optionally, the notification bar 515 may display prompt information for strongly prompting the user to set off, for example, an emergency icon.

In a possible implementation, when the electronic device 100 detects that a difference from a flight departure time is within a preset time threshold 4 (for example, within 2 hours) and a distance between a current geographic location and a geographic location of an airport is within a preset geographic threshold (for example, 1 km or above), the electronic device 100 may display different prompt notifications on a currently displayed screen (for example, the AOD screen, the lock screen, or the desktop) at a preset time interval (for example, every 30 minutes), to better prompt the user to set off and take a flight.

For example, the currently displayed screen is the lock screen. When the electronic device 100 detects that a difference between a current time and a schedule starting time of a specified schedule task is 2 hours, the electronic device 100 may display, on the lock screen, the notification bar 515 shown in FIG. 5Q. When the electronic device 100 detects that a difference between a current time and a schedule starting time of a specified schedule task is 1 hour and 30 minutes, the electronic device 100 may display, on the lock screen in a flashing manner, the notification bar 515 shown in FIG. 5Q. When the electronic device 100 detects that a difference between a current time and a schedule starting time of a specified schedule task is 1 hour, the electronic device 100 may change a background color of the notification bar 515 for display (for example, in red). When the electronic device 100 detects that a difference between a current time and a schedule starting time of a specified schedule task is 30 minutes, the electronic device 100 may display a notification bar with a larger size than that of the notification bar 515.

In a possible implementation, when the electronic device 100 is in an always on display state, the electronic device 100 may output audio data and/or a vibration reminder to prompt the user to set off as soon as possible. Alternatively, the electronic device 100 may automatically turn on the screen (which may also be referred as a first operation) and display a departure reminder notification on the lock screen. This is not limited in this application.

In a possible manner, the electronic device 100 may alternatively display a flight card at an archival location. The archival location is a user interface on the electronic device 100 on which one or more cards (for example, a flight card, a schedule card, and a weather card) may be displayed. The archival location may be a separate user interface that is displayed on the screen and that is different from other screens, or may be set on a minus one screen displayed on a leftmost page of the screen. The electronic device 100 may receive an operation of swiping, by the user, from left to right on the desk-top, and display the archival location in response to the operation.

Figure 5R:
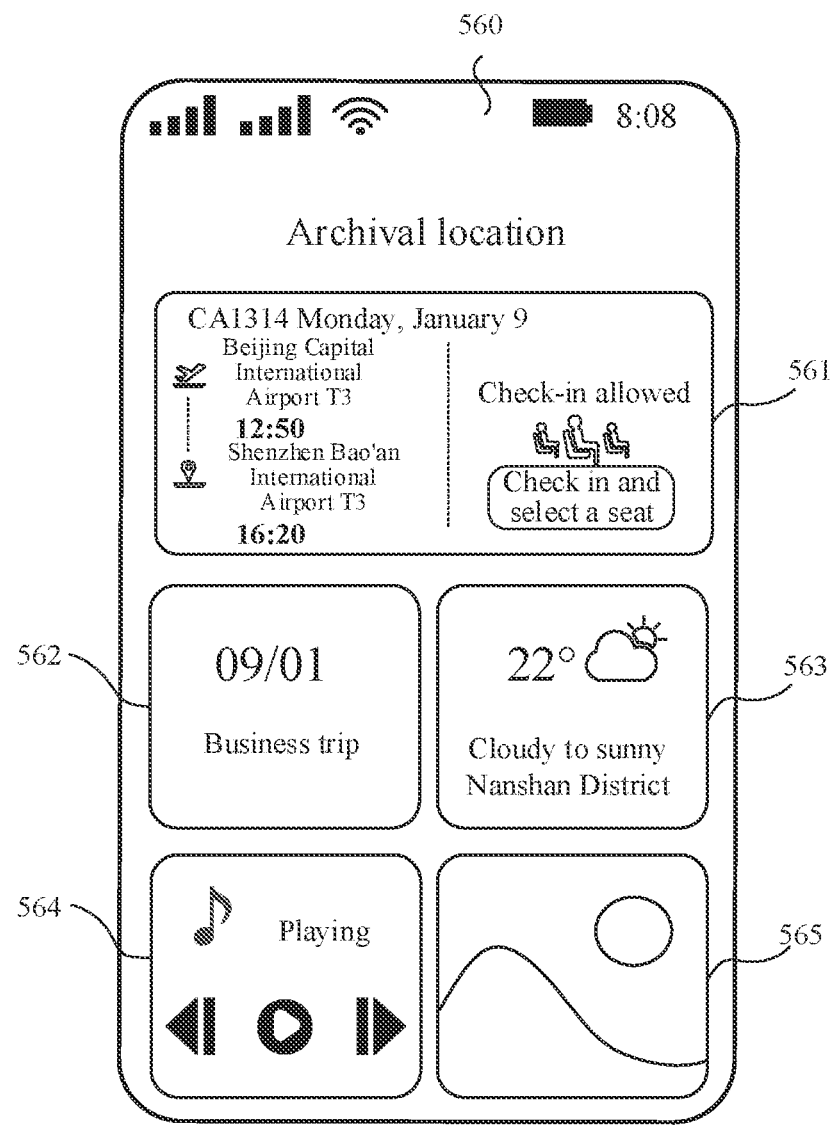

As shown in FIG. 5R, the electronic device 100 may receive an operation of swiping, by the user, from left to right on a the desktop 520, and display an archival location screen 560 in response to the operation. The archival location screen may include a flight card 561, a schedule card 562, a weather card 563, a music card 564, a gallery card 565, and the like. When it is detected that check-in for a flight of the user has started, the flight card 561 may display a prompt message indicating that check-in is allowed, for example, "Check-in allowed".

In addition to the prompt indicating that check-in is allowed, the flight card at the archival location may also display other reminder notifications in a flight travel scenario, for example, an electronic boarding pass reminder, ticketing feedback, or baggage claim. Information included in the flight card at the archival location is the same as the information of the flight card displayed on the desktop.

In a possible implementation, the flight card at the archival location and the flight card on the desktop are optional. To be specific, the electronic device 100 may display the flight card both at the archival location and on the desktop, or may display the card at the archival location or on the desktop.

For example, the first application may be an application that provides subway schedule information (for example, an Alipay® application). The electronic device 100 may obtain notification information delivered by the application. The notification information includes schedule information about taking a subway by the user. The electronic device 100 may output a subway travel notification prompt based on a preset time condition and/or a preset geographic location condition. The electronic device 100 may output different types of prompt notifications based on different screens currently displayed on the electronic device 100.

When the electronic device 100 detects that a current geographic location of the electronic device 100 is within an area of a subway station, the electronic device 100 may receive subway travel information delivered by the first application. The subway travel information may include one or more of data information of the subway station, an option corresponding to a subway ride code, or the like. If the electronic device 100 displays the lock screen, the electronic device 100 may display a notification bar on the lock screen. The notification bar may include the subway travel information.

Figure 6A:
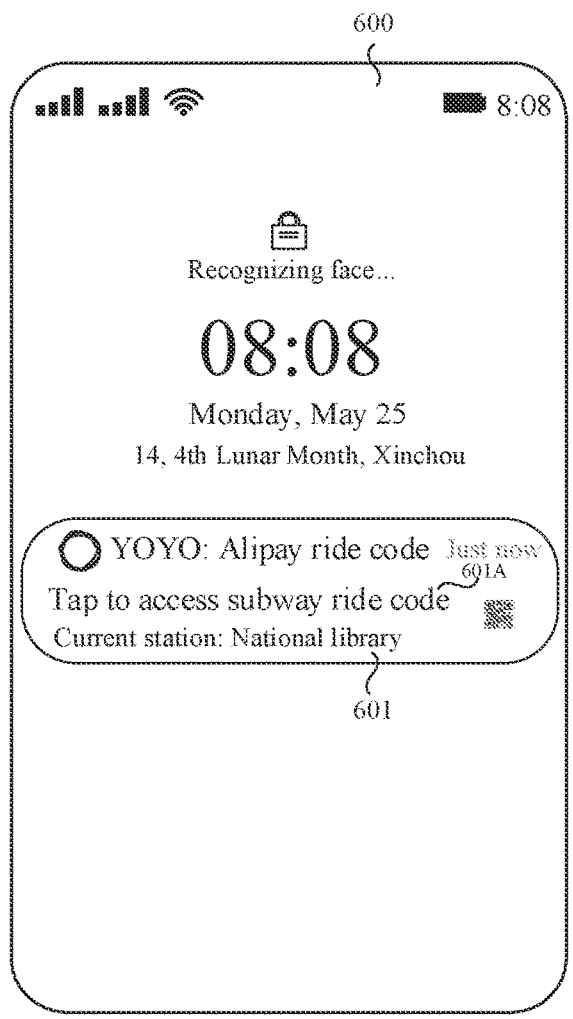

As shown in FIG. 6A, the electronic device 100 may display a lock screen 600. When the electronic device 100 detects that a current geographic location of the electronic device 100 is within an area of a subway station, the electronic device 100 may receive data information, delivered by the first application, of the subway station. The electronic device 100 may display a notification bar 601 on the lock screen 600. The notification bar 601 may include the data information, delivered by the first application, of the subway station, and an option 601A corresponding to a subway ride code. The data information of the subway station may be text information: "Current station: National library". The option 601A may be used for receiving a touch operation (for example, tapping) performed by the user on the option 601A, so that the electronic device 100 displays a user interface including the subway ride code in response to the touch operation. The user interface including the subway ride code is described in detail in subsequent embodiments. Details are not described herein. For descriptions of other display elements on the lock screen 600, refer to the descriptions in the embodiment shown in FIG. 3B. Details are not described herein again.

When the electronic device 100 receives and responds to user input (which may also be referred to as a second operation, for example, input of swiping from bottom to top on the lock screen), the electronic device 100 may display an unlock screen. When the electronic device 100 displays the unlock screen, the electronic device 100 may verify an identity of the user in a biometric authentication manner. The biometric authentication manner may include one or more of password verification, face verification, fingerprint verification, iris verification, voiceprint verification, and the like.

The unlock screen may be the unlock screen 320 shown in FIG. 3C. For descriptions of the unlock screen 320, refer to the descriptions in the embodiment shown in FIG. 3C. Details are not described herein again.

When the electronic device 100 receives unlock input based on the unlock screen, and when the electronic device 100 receives and responds to unlock input based on the unlock screen, the electronic device 100 may display the desktop (which may also be referred to as the desktop screen). When the electronic device 100 displays the desktop, if a current geographic location is within an area of a subway station, the electronic device 100 may display a subway card (which may also be referred to as a first card) on the desktop. The subway card may include one or more of data information of the subway station, an option corresponding to a subway ride code, or the like.

Figure 6B:
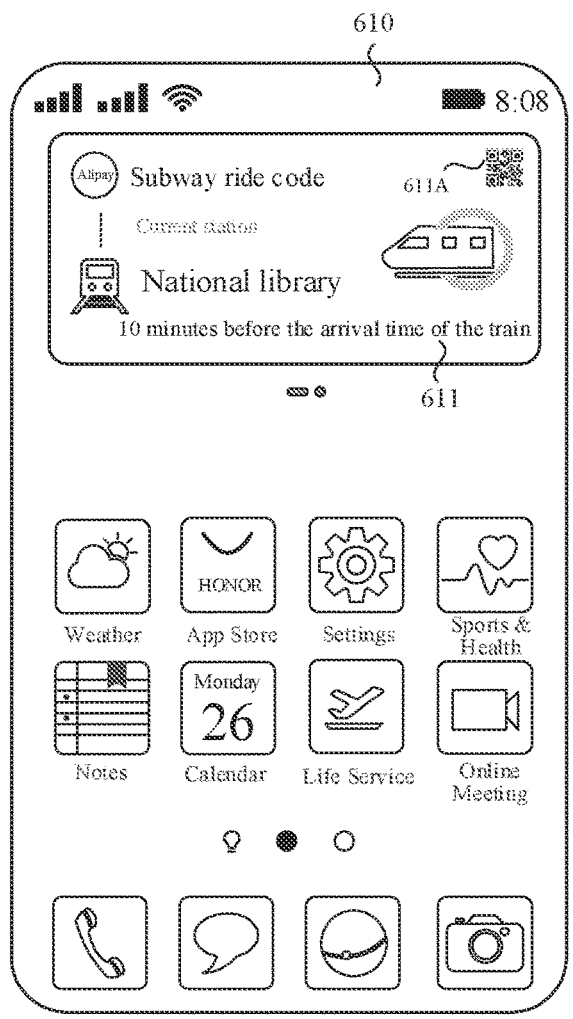

As shown in FIG. 6B, the electronic device 100 may display a desktop 610. If a current geographic location is within a geographic area of a subway sation, the electronic device 100 may display a subway card 611 on the desktop. The subway card 611 may include data information of the subway station, train time information, and an option 611A corresponding to a subway ride code. The data information of the subway station may be text information: "Current station: National library". The train time information may be text information: "10 minutes before the arrival time of the train". The option 611A may be used for receiving a touch operation (for example, tapping) performed by the user on the option 611A, so that the electronic device 100 displays a user interface including the subway ride code in response to the touch operation. The user interface including the subway ride code is described in detail in subsequent embodiments. Details are not described herein.

With reference to the examples of FIG. 6A and FIG. 6B, it can be learned that the electronic device 100 may display, on different display screens, notification prompts with different levels of details for subway travel information. For example, when the electronic device 100 displays the AOD screen, the electronic device 100 may display, on the AOD screen, a prompt icon for indicating subway travel information. When the electronic device 100 displays the lock screen, the electronic device 100 may display a part of subway travel information in a notification bar of the lock screen. When the electronic device 100 displays the desktop, the electronic device 100 may display, on the desktop, a subway card with more subway travel information than that in the notification bar of the lock screen.

When the electronic device 100 receives and responds to a touch operation (which may also be referred to as a third operation, for example, tapping) performed by the user on the option corresponding to the subway ride code, the electronic device 100 may display a user interface including subway ride code information (which may also be referred to as third content). The subway ride code information may include one or more of a two-dimensional subway ride code, information indicating a region in which the two-dimensional subway ride code can be used, or the like.

Figure 6C:
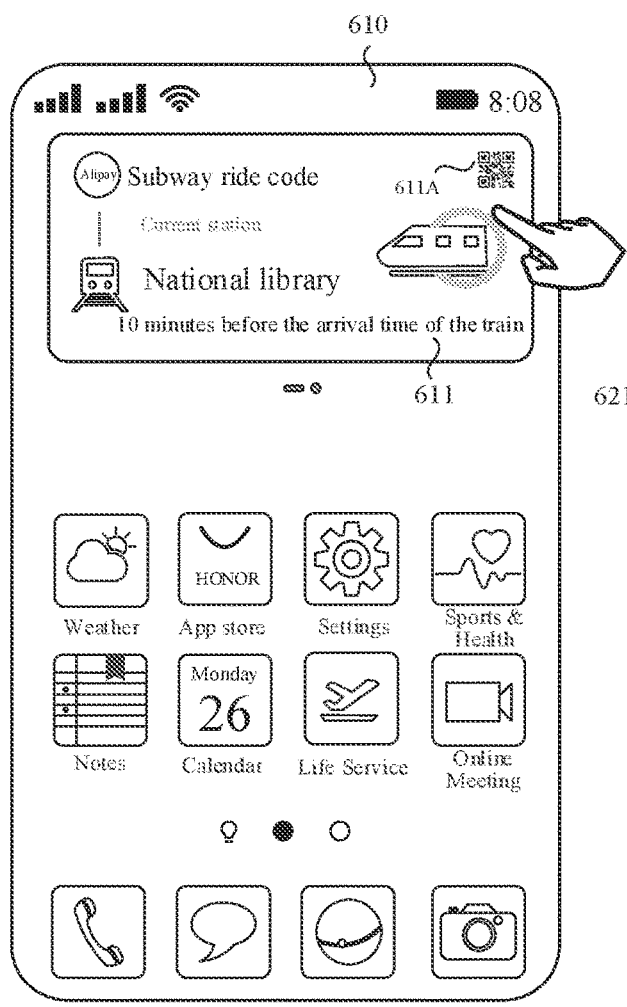
Figure 6D:
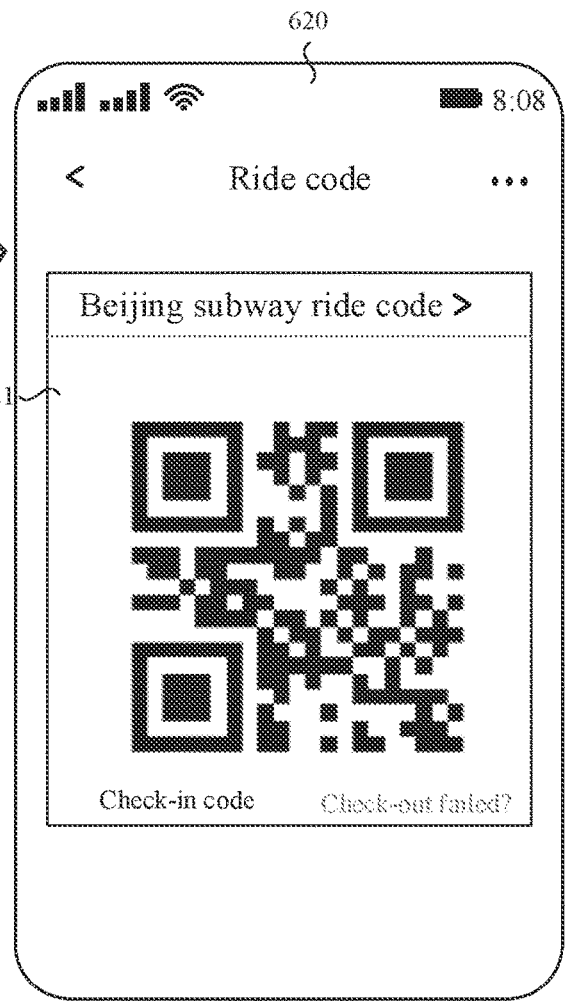

As shown in FIG. 6C and FIG. 6D, when the electronic device 100 receives and responds to a touch operation (for example, tapping) acting on the option 611A in the subway card 611, the electronic device 100 may display a user interface 620. The user interface 620 may include subway ride code information, for example, a two-dimensional subway ride code 621, and text information indicating a region in which the subway ride code can be used: "Beijing subway ride code".

In a possible implementation, when the electronic device 100 detects that a current geographic location of the electronic device 100 is within an area of a subway station, the electronic device 100 may display, within preset duration (for example, 5 seconds), a short-term prompt notification bar on a second application screen displayed w % ben the second application is run and/or on the desktop. The short-term prompt notification bar may include subway ride code information, for example, one or more of data information of the subway station, an option corresponding to a subway ride code, or the like.

Figure 6E:
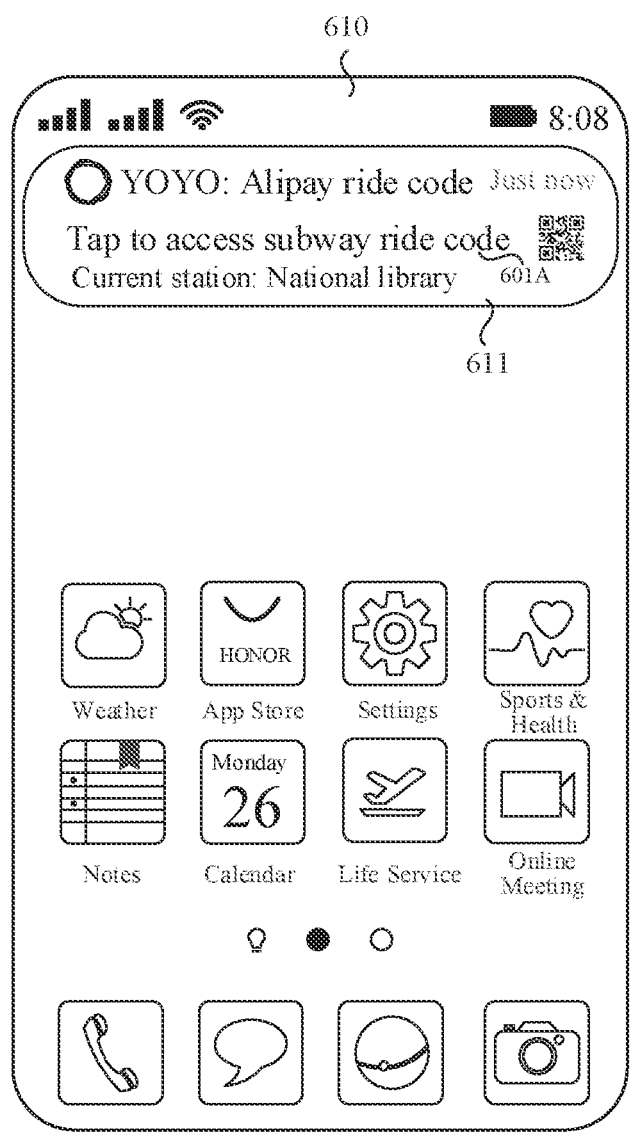

As shown in FIG. 6E, the electronic device 100 may display a desktop 610. When the electronic device 100 detects that a current geographic location of the electronic device 100 is within an area of a subway station, the electronic device 100 may display, within preset duration (for example, 5 seconds), a short-term prompt notification bar 611 on the desktop 610. The short-term prompt notification bar 611 may include data information of the subway station, and an option 601A corresponding to a subway ride code. The data information of the subway station may be text information: "Current station: National library". The option 601A may be used for receiving a touch operation (for example, tapping) performed by the user on the option 601A, so that the electronic device 100 displays a user interface including the subway ride code in response to the touch operation. For the user interface including the subway ride code, refer to the descriptions in the embodiment shown in FIG. 6D. Details are not described herein again.

In a possible implementation, the electronic device 100 may receive and respond to a touch operation (for example, tapping) performed by the user on an option corresponding to a subway ride code (for example, the option 601A shown in FIG. 6A) in a notification bar (for example, the notification bar 601 shown in FIG. 6A) on a lock screen (for example, the lock screen 600 shown in FIG. 6A), and may display a user interface (for example, the user interface 620 shown in FIG. 6D) including subway ride code information.

In a possible implementation, subway travel information may be displayed in a fixed area of a drop-down screen within a preset time period (for example, before the electronic device 100 detects that the user gets on a subway). When the electronic device 100 detects that a current time is beyond a preset time period (for example, the electronic device 100 detects that the user has got on a subway), and/or the electronic device 100 receives and responds to input of for the subway travel information, the subway travel information may no longer be displayed in the fixed area of the drop-down screen.

As shown in FIG. 6F and FIG. 6Q when the electronic device 100 detects a swipe-down gesture acting on the desktop 610, the electronic device 100 may display a drop-down screen 620 in response to the swipe-down gesture. The drop-down screen 620 may include a notification window 621 and a control 622. The notification window 621 may be displayed in a notification center area of the drop-down screen 620 before the electronic device 100 detects that the user gets on a subway. The notification window 621 may include subway travel information and an option 601A corresponding to a subway ride code. The subway travel information may include data information of a subway station: "Current station: National library". For descriptions of the option 601A, refer to the related descriptions in the embodiment shown in FIG. 6A. Details are not described herein again. The control 622 may receive a touch operation (for example, tapping) acting on the control 622, so that the electronic device 100 clears all notifications on the drop-down screen in response to the touch operation.

In a possible implementation, the electronic device 100 may further display a floating window on the desktop and/or when running the second application and displaying a user interface of the second application. The floating window may include prompt information and a control for displaying subway ride code information. When the electronic device 100 runs an immersive application, the electronic device 100 may display a floating window on a user interface of the application. The immersive application may be an application that provides video play and runs a game, for example, a video application (for example, TikTok® or Honor Video®) or a game application (for example, Honor of Kings® or Subway Surfers®).

Figure 6H:
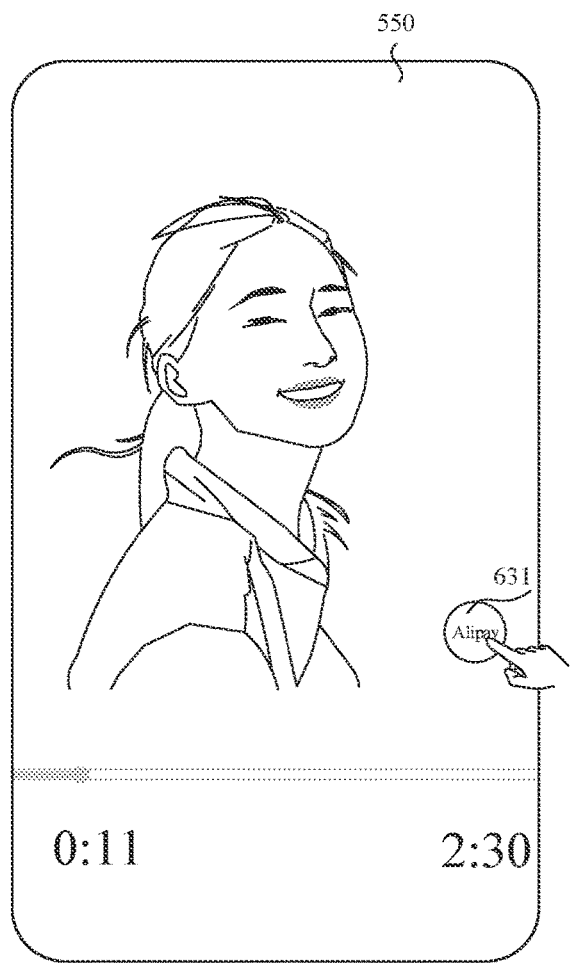
Figure 6I:
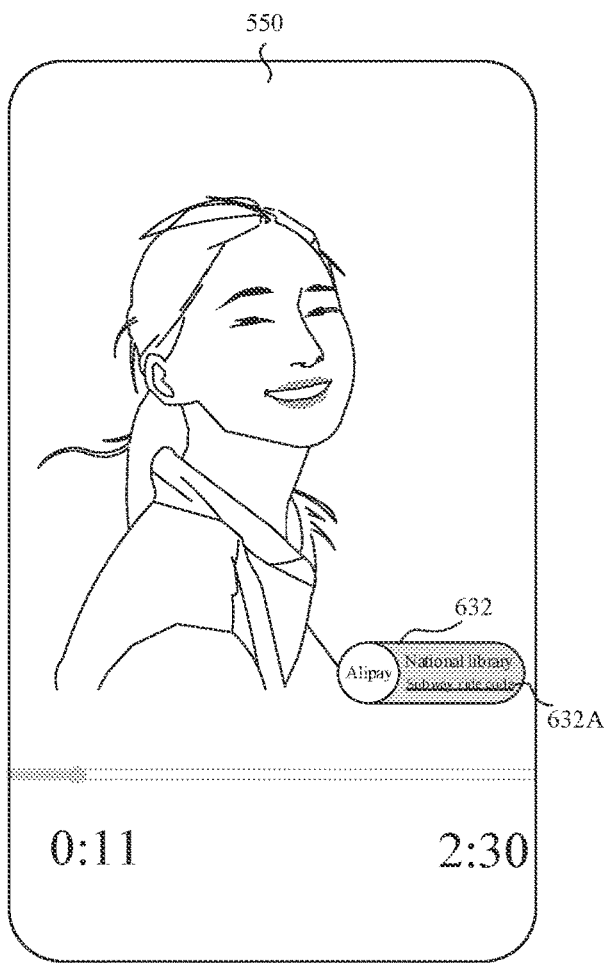

As shown in FIG. 6H and FIG. 6I, when the electronic device 100 runs a video application, the electronic device 100 may display a video play screen 550. The video play screen 550 may include a floating ball 631. The floating ball 631 may be used for notifying the user that there is a subway ride item to be dealt with. The floating ball may receive input acting on the floating ball, so that the electronic device 100 displays a floating window in response to the input. When the electronic device 100 detects a touch operation (for example, tapping) acting on the floating ball 631, the electronic device 100 may display a floating window 632 in response to the touch operation. The floating window 632 may include a control 632A and subway station prompt information: "National library". When the electronic device 100 detects a touch operation (for example, tapping) acting on the control 632A, the electronic device 100 may display a user interface including subway ride code information (for example, the user interface 620 shown in the FIG. 6D). For descriptions of other screen elements the video play screen 550, refer to the descriptions in the embodiment shown in FIG. 5L and FIG. 5M. Details are not described herein again. Optionally, the floating window displays more information than that in the floating ball. Both the floating window and the floating ball are display windows located at a top layer of screen display layers. A display priority of the floating window is higher than those of others application, and a display priority of the floating ball is lower only than that of the floating window; or a display priority of the floating ball is higher than those of other applications, and a display priority of the floating window is lower only than that of the floating ball; or the floating window and the floating ball cannot be displayed at a same location on the screen.

In a possible manner, the electronic device 100 may alternatively display a subway card at an archival location. The archival location is a user interface on the electronic device 100 on which one or more cards (for example, a flight card, a schedule card, and a weather card) may be displayed. The electronic device 100 may receive an operation of swiping, by the user, from left to right on the desktop, and display the archival location in response to the operation.

Figure 6J:
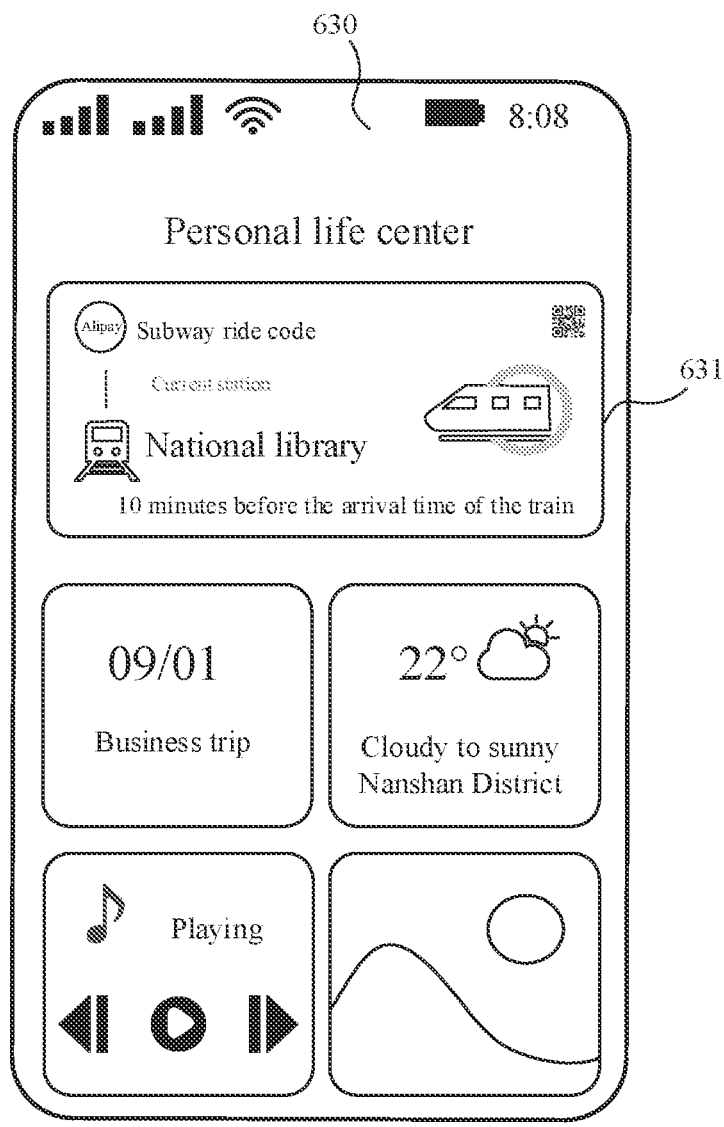

As shown in FIG. 6J, the electronic device 100 may receive an operation of swiping, by the user, from left to right on a user interface 610, and display an archival location screen 630 in response to the operation. The archival location screen 630 may display a subway card 631. Information included in the subway card at the archival location is the same as the information of the subway card 611 displayed on the desktop 610. For another card displayed at the archival location, refer to the embodiment shown in FIG. 5R. Details are not described herein again.

In a possible implementation, the subway card at the archival location and the subway card on the desktop are optional. To be specific, the electronic device 100 may display the subway card both at the archival location and on the desktop, or may display the card at the archival location or on the desktop.

Figure 7:
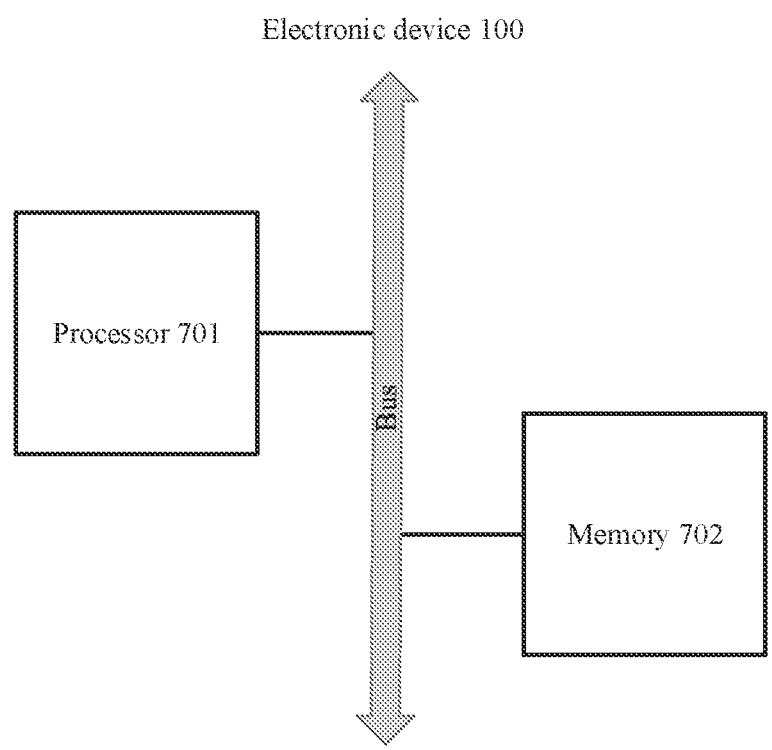
FIG. 7 is a schematic structural diagram of another electronic device according to an embodiment of this application.

FIG. 7 is an example schematic structural diagram of another electronic device according to an embodiment of this application.

As shown in FIG. 7, the electronic device 100 may include a processor 701, a memory 702, and a bus.

The processor 701 may include one or more processing cores. The processor 701 runs software programs and modules, to perform operations such as delivering notification information related to a first application, and displaying different prompt notifications on different screens (for example, an AOD screen, a lock screen, and a desktop) based on the notification information and different preset conditions (for example, a preset time conditions and/or a preset geographic location condition), and perform information processing.

The memory 702 is connected to the processor 701 through the bus. The memory 702 may be configured to store at least one program instruction, so that the processor 702 executes the at least one program instruction, to implement technical solutions of the foregoing embodiments. An implementation principle and a technical effect thereof are similar to those of the foregoing related method embodiments. Details are not described herein again.

As used in the foregoing embodiments, the term "when" may be interpreted as a meaning of "if", "after", "in response to determining", or "in response to detecting" based on the context. Similarly, based on the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, all or some of the processes or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line) or a wireless manner (for example, infrared, radio, or microwave). The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art can understand that all or some of the processes of the methods in the foregoing embodiments may be implemented by a computer program instructing related hardware. The program may be stored in a computer-readable storage medium. When the program is executed, the processes in the foregoing method embodiments may be included. The storage medium includes any medium that can store computer program code, for example, a ROM, a random access memory RAM, a magnetic disk, or an optical disc.

What is claimed is:

1. A notification display method, comprising:
receiving, by an electronic device, a first operation of a user, and adding a first schedule task to a first application, wherein a starting date of the first schedule task is a current day, and a reminder time of the first schedule task is a first time;
displaying a first icon when a current time of the electronic device is the first time and an always on display screen is displayed, wherein the first icon is an icon of the first application, and the always on display screen is in a lock screen state and some areas on the screen remain on for displaying information;
displaying a lock screen interface in response to a second operation of the user after the always on display screen is displayed, wherein the lock screen interface comprises first information of the first schedule task;
displaying a desktop interface in response to an unlock input of the user, wherein a first area of the desktop interface comprises a first card, and the first card comprises the first information of the first schedule task and information indicating a quantity of scheduled tasks for the current day;
receiving a third operation of the user on the first card, and displaying an interface of the first application; and receiving, after the first interface of the first application is displayed, a fourth operation of adding a second schedule task to the first application by the user, wherein the first area comprises a second card and does not comprise the first card, and the second card comprises information indicating a quantity of scheduled tasks for a next day and second information of the second schedule task.

2. The method of claim 1, wherein a difference between the current time of the electronic device and a starting time of the first schedule task is less than a first time threshold, the method further comprising displaying an alarm clock reminder interface and outputting audio data and/or a vibration reminder, wherein the alarm clock reminder interface comprises one or more of a name of the first schedule task, the starting time of the first schedule task, an ending time of the first schedule task, and a location of the first schedule task, wherein the alarm clock reminder interface further comprises a third control, wherein the method further comprises receiving a seventh operation performed by the user on the third control at a second time, and cancelling display of the alarm clock reminder interface and stopping outputting the audio data or the vibration reminder, and wherein the alarm clock reminder interface is displayed and the audio data is output at a third time later than the second time.

3. The method of claim 1, wherein the first card is not displayed when the scheduled tasks for the current day are all indicated as complete by a user, or wherein the first card is not displayed when the current time of the electronic device exceeds an ending time of a latest schedule in the scheduled tasks for the current day.

4. The method of claim 1, wherein the first information and the second information each comprise one or more of a name of a schedule task, a starting time of the schedule task, an ending time of the schedule task, and a schedule location.

5. The method of claim 1, further comprising:
receiving an eighth operation input by the user to the desktop interface;
displaying a first notification interface is displayed, wherein the first notification interface comprises a first notification window and a fourth control, and the first notification window comprises a name of the first schedule task, a starting time of the first schedule task, and an ending time of the first schedule task; and
receiving a ninth operation input by the user to the fourth control, wherein all notifications of the first notification interface are cleared.

6. The method of claim 1, further comprising receiving schedule information delivered by the first application before the first card is displayed.

7. The method of claim 1, further comprising receiving a fifth operation performed by the user on the first card, and switching the first card to a third card for display in the first area, wherein the third card corresponds to a second application, and the first application is different from the second application.

8. The method of claim 7, wherein the third card is any one of a flight card, a weather card, a music card, and a gallery card.

9. The method of claim 1, wherein the scheduled tasks for the current day comprise a third schedule task, a starting time of the first schedule task is later than the current time of the electronic device, and a starting time of the third schedule task is later than the starting time of the first schedule task, and wherein the first information of the first schedule task and third information of the third schedule task are arranged and displayed in the first card based on a starting time sequence of the tasks.

10. The method of claim 9, wherein the scheduled tasks for the current day comprise a fourth schedule task, a starting time of the fourth schedule task is later than the starting time of the third schedule task, fourth information of the fourth schedule task is not displayed in the first card, and the first card further comprises a second control, wherein in response to a sixth operation performed by the user on the second control, the third information of the third schedule task is not displayed in the first card, and wherein the fourth information of the fourth schedule task is displayed in the first card after the third information of the third schedule task is not displayed in the first card.

11. The method of claim 10, further comprising displaying an animation effect before the third information of the third schedule task is not displayed in the first card, wherein the animation effect is used to notify the user that the third information is not to be displayed in the first card.

12. The method of claim 10, wherein the quantity of scheduled tasks for the current day is a total quantity of scheduled tasks whose starting dates are the current day, and wherein a quantity of scheduled tasks of the scheduled tasks for the next day is a total quantity of scheduled tasks whose starting dates are the next day.

13. The method of claim 12, wherein when the third information of the third schedule task is displayed in the first card, the quantity of scheduled tasks for the current day is a first number, wherein after the sixth operation is received, the quantity of scheduled tasks for the current day is a second number, and wherein the second number is a number obtained by subtracting one from the first number.

14. An electronic device, comprising:
one or more processors;
a display coupled to the one or more processors;
a transceiver coupled to the one or more processors; and
a memory coupled to the one or more processors, wherein the memory stores computer instructions that, when executed by the one or more processors, cause the electronic device to be configured to:
receive a first operation of a user and add a first schedule task to a first application, wherein a starting date of the first schedule task is a current day, and a reminder time of the first schedule task is a first time;
display a first icon when a current time of the electronic device is the first time and an always on display screen is displayed, wherein the first icon is an icon of the first application, and the always on display screen is in a lock screen state and some areas on the screen remain on for displaying information;
display a lock screen interface in response to a second operation of the user after the always on display screen is displayed, wherein the lock screen interface comprises first information of the first schedule task;
display a desktop interface in response to an unlock input of the user, wherein a first area of the desktop interface comprises a first card, and the first card comprises the first information of the first schedule task and information indicating a quantity of scheduled tasks for the current day;
receive a third operation of the user on the first card, and display an interface of the first application; and
receive, after the first interface of the first application is displayed, a fourth operation of adding a second schedule task to the first application by the user, wherein the first area comprises a second card and does not comprise the first card, and the second card comprises information indicating a quantity of scheduled tasks for a next day and second information of the second schedule task.

15. The electronic device of claim 14, wherein the electronic is further configured to:
receive a fifth operation performed by the user on the first card; and
switch the first card to a third card for display in the first area, wherein the third card corresponds to a second application, and the first application is different from the second application.

16. The electronic device of claim 15, wherein the third card is any one of a flight card, a weather card, a music card, and a gallery card.

17. The electronic device of claim 14, wherein the scheduled tasks for the current day comprise a third schedule task, a starting time of the first schedule task is later than the current time of the electronic device, and a starting time of the third schedule task is later than the starting time of the first schedule task, and wherein the first information of the first schedule task and third information of the third schedule task are arranged and displayed in the first card based on a starting time sequence of the tasks.

18. The electronic device of claim 17, wherein the scheduled tasks for the current day comprise a fourth schedule task, a starting time of the fourth schedule task is later than the starting time of the third schedule task, fourth information of the fourth schedule task is not displayed in the first card, and the first card further comprises a second control, wherein when a sixth operation performed by the user on the second control is received, the third information of the third schedule task is not displayed in the first card, and wherein the fourth information of the fourth schedule task is displayed in the first card after the third information of the third schedule task is not displayed in the first card.

19. The electronic device of claim 18, wherein the quantity of scheduled tasks for the current day is a total quantity of scheduled tasks whose starting dates are the current day, and wherein a quantity of scheduled tasks of the scheduled tasks for the next day is a total quantity of scheduled tasks whose starting dates are the next day.

20. The electronic device of claim 19, wherein when the third information of the third schedule task is displayed in the first card, the quantity of scheduled tasks for the current day is a first number, wherein after the sixth operation is received, the quantity of scheduled tasks for the current day is a second number, and wherein the second number is a number obtained by subtracting one from the first number.

* * * * *